US012705606B2

(12) United States Patent
McDonough et al.

(10) Patent No.: US 12,705,606 B2
(45) Date of Patent: Aug. 11, 2026

(54) TRANSFER TRANSACTION BLOCKCHAIN WITH CLAWBACK APPARATUSES, PROCESSES AND SYSTEMS

(71) Applicant: FMR LLC, Boston, MA (US)

(72) Inventors: John McDonough, Nahant, MA (US); Kieran Flesk, Galway (IE); Feina Niu, Cambridge, MA (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/367,440

(22) Filed: Sep. 12, 2023

(65) Prior Publication Data

US 2024/0338685 A1 Oct. 10, 2024

Related U.S. Application Data

(63) Continuation-in-part of application No. 18/130,803, filed on Apr. 4, 2023, and a continuation-in-part of
(Continued)

(51) Int. Cl.
*G06Q 20/00* (2012.01)
*G06Q 20/38* (2012.01)

(52) U.S. Cl.
CPC ... *G06Q 20/38215* (2013.01); *G06Q 2220/10* (2013.01)

(58) Field of Classification Search
CPC ......... G06Q 20/38215; G06Q 2220/10; G06Q 20/401; G06Q 20/02
(Continued)

(56) References Cited

U.S. PATENT DOCUMENTS

| | | | |
|---|---|---|---|
| 10,102,526 | B1 | 10/2018 | Madisetti |
| 2015/0356523 | A1 | 12/2015 | Madden |

(Continued)

FOREIGN PATENT DOCUMENTS

| | | |
|---|---|---|
| CN | 113407640 | 9/2021 |

OTHER PUBLICATIONS

U.S. Appl. No. 63/439,616 (Year 2023).
(Continued)

*Primary Examiner* — John W Hayes
*Assistant Examiner* — Christina Owen Sherr
(74) *Attorney, Agent, or Firm* — Hanchuk Kheit LLP.; Walter G. Hanchuk

(57) ABSTRACT

The Transfer Transaction Blockchain with Clawback Apparatuses, Processes and Systems ("NBSA") transforms authenticating NFT generation input, NFT authentication input, document publishing input, NFT document access input, transfer transaction input, clawback transaction input datastructure/inputs via NBSA components into authenticating NFT generation output, NFT authentication output, document publishing output, NFT document access output, transfer transaction output, clawback transaction output outputs. A transfer transaction processing request datastructure structured as specifying a transaction requestor blockchain address, a transfer transaction identifier, and authorization data is obtained. The authorization data is evaluated to verify control over the transaction requestor blockchain address. A clawback post transaction is submitted to a blockchain. A clawback post transaction notification is sent to a transfer transaction handling smart contract that validates the clawback post transaction by checking compliance with a set of predefined clawback rules, and transfers cryptographic assets to sender of a transfer transaction associated with the transfer transaction identifier.

18 Claims, 30 Drawing Sheets

NBSA ARCHITECTURE

Related U.S. Application Data application No. 18/130,809, filed on Apr. 4, 2023, now Pat. No. 12,489,629.

(58) Field of Classification Search
USPC .......................... 705/16, 21, 59; 380/44, 262
See application file for complete search history.

(56) References Cited

U.S. PATENT DOCUMENTS

| | | | | |
|---|---|---|---|---|
| 2018/0227131 | A1 | 8/2018 | Ebrahimi | |
| 2020/0027089 | A1 * | 1/2020 | Kuchar | H04L 9/0637 |
| 2022/0253813 | A1 | 8/2022 | Pospieszalski | |
| 2023/0186291 | A1 | 6/2023 | Haddad | |
| 2023/0351369 | A1 | 11/2023 | Lee | |
| 2024/0202721 | A1 | 6/2024 | Hu | |
| 2024/0232858 | A1 | 7/2024 | Tax | |

OTHER PUBLICATIONS

"What CPAs need to know about NFTs: NFTs are unique, immutable, and auditable records of the ownership of both physical and digital assets", Ferris Stacey, American Institute of CPAs. Oct. 2022.

* cited by examiner

NBSA ARCHITECTURE

NBSA SCREENSHOT

NBSA SCREENSHOT

NBSA SCREENSHOT

NBSA SCREENSHOT

NBSA SCREENSHOT

NBSA ARCHITECTURE

NBSA ARCHITECTURE

NBSA IMPLEMENTATION CASE

NBSA IMPLEMENTATION CASE

| Use Case Description | Data and/or Process Utilized | Notes |
| --- | --- | --- |
| **Example cases** | Utilizes a NFT capable wallet, the associates badge number or identifier more | |
| **# 1 Public Filing Notification via NFT:**<br>Sending an NFT to the Wallet of subscribed Wallet addresses to notify subscribers or government reviewers that there is a new document for review<br>The NFT may or not have a QR code attached | Connection Blockchain Node (/node/updated document record) + subscriber list (wallet address + document title or ID that the wallet is subscribed to {date/date of publication) + NFT minting instruction to Smart Contract + Link to act<br>Other standard Meta data or dates, times, block addresses can be embedded in the NFT as well | The user or actor holds a device (phone or chrome browser) that has a Wallet, the wallet receives a NFT as a push notification and the NFT holds a key (the NFT, QR Code or NFC embedded id) to unlock access to the published document. For example, the actor is a government official being alerted to a confidential document |
| **# 2 Public Filing Notification via NFT: with NFC**<br>Sending an NFT to the Wallet of subscribed Wallet addresses to notify subscribers or government reviewers that there is a new document for review<br>The NFT may or not have a QR code attached , in this example the NFT has a NFC code embedded in for identification purposes - | Connection Blockchain Node (/node/updated document record) + subscriber list (wallet address + document title or ID that the wallet is subscribed to {date/date of publication) + NFT minting instruction to Smart Contract + Link to act<br>Other standard Meta data or dates, times, block addresses can be embedded in the NFT as well<br>In this instance a Smart contract Creates an Embedded NFC code as an alternate method of authentication | Same as above but with NFC code Embedded in NFT |
| **#3 External Auditors Review Timely & Accurate Publication or Sharing of Required Internal Documents**<br>External Auditor holds a copy of the Blockchain that records the publication of the document | The same as # 1 but the subscriber list is Outside Auditors –<br>List of ID's (Auditor badge + wallet address) – push notification of documents (link+version+title) Chain Record<br>Also, the node or copy of the Chain the Auditor Operates may be just for 1 company or a shared chain filesystem - records hold a prefix of the company name or identifier (prefix + file id + rights + version) =<br>(fido+prospectusmagellan08182022+(list=wallets)+v.0011 | The document could be destined for just the external auditors, or governments or the public<br>It too could have embedded NFC authenticator |

FIG. 19A

NBSA IMPLEMENTATION CASE

| Use Case Description | Data and/or Process Utilized | Notes |
|---|---|---|
| **Example cases** | Utilizes a NFT capable wallet, the associates badge number or identifier more | |
| **# 4 Integrity Nodes:**<br>Additional nodes or copies of the chain holding the documents can be operated and held by the following: External auditors, regulators, independent watch dog groups (e.g., Greenpeace), and/or the like.<br>For groups who are Watchdogs, access may be allowed under granted permissions conditions – thus Greenpeace cannot see the documents or get a record of the updated versioning | Connection Blockchain Node (/node/updated document record) + subscriber list (wallet address + document title or ID that the wallet is subscribed to (date/date of publication) + NFT minting instruction to Smart Contract + Link to act<br>Other standard Meta data or dates, times, block addresses can be embedded in the NFT as well<br>In this case, the NFT may be sent using a management console command to List=(NFT watchdog List(Wallet address) this allows in less frequent cases for the NFT to go to a wallet as an ad hoc push, with a QR code and/or NFC authenticator | The user or actor holds a device (phone or chrome browser) that has a Wallet, the wallet receives a NFT as a push notification and the NFT holds a key (the NFT, QR Code or NFC embedded id) to unlock access to the published document. |

FIG. 19B

NBSA ARCHITECTURE

NBSA IMPLEMENTATION CASE

| Node | Quality | Rights |
|---|---|---|
| Silver | Can initiate and receive transfers, and have one level or transaction as part of the verification<br>Dollar limit of up to $1million | None |
| Gold | Can initiate and receive transfers, and have one level or more or transactions as part of the verification<br>Dollar limit of up to $100million<br>Allowed to launch Clawbacks | Can allow reporting access |
| Platinum | Can initiate and receive transfers, and have one level or more or transactions as part of the verification<br>Dollar limit of up to $500million<br>Allowed to launch Clawbacks and perform these services for other intuitions | Can allow reporting access<br>Can create and execute Smart Contracts.<br>Can allow access to transaction history – can initiate transactions for Clawbacks |
| Bitcoin (Better than Platinum) | Can initiate and receive transfers, and have one level or more or transactions as part of the verification<br>Dollar limit of up to No Limit<br>Allowed to launch Clawbacks and perform these services for other institutions<br>Can create Smart Contracts – for themselves and other institutions | Can create and execute Smart Contracts. Can be a Super Node ( 2 SuperNodes can complete the transaction)<br>Federal Reserve Bank of New York and the Tresor public |

FIG. 24

NBSA IMPLEMENTATION CASE

| Case # | Description | Data Elements |
|---|---|---|
| 1 | Clawback or funds after all nodes required verify | {amount}{send account info}{recipient account info}{smartcontract name}{time}{date}{node name(s)} {send currency}{receive currency}{fees} |
| 2 | Review partial transaction before close and finalize | {amount}{send account info}{recipient account info}{smartcontract name}{time}{date}{node name(s)} {send currency}{receive currency}{fees} *{smart contract instruction that this does a verify after start of nodes doing verification – but before completion }{number of nodes to verify before review}* |
| 3 | SmartContracts | Same as #2 plus {SmartContract Parameters} {Smart contract expiration date}{self expiring smart contract after ***n*** executions} |

FIG. 25

NBSA IMPLEMENTATION CASE

| Matrix of Clawbacks | Time Since First Transaction | Time Since Last Transaction | Dollar Amounts |
|---|---|---|---|
| Requires a certified node or bank level | Clawback can be performed if less than 60 seconds has elapsed since first transaction , but not more than 2 | Clawback can be performed if less than 600 seconds has elapsed since last transaction | > 100,000USD |
| Requires a certified node or bank level Platinum or higher | Clawback can be performed if less than 60 seconds has elapsed since first transaction but not more than 2 | Clawback can be performed if less than 600 seconds has elapsed since last transaction | < 10,000,000USD |

FIG. 26

TRANSFER TRANSACTION BLOCKCHAIN WITH CLAWBACK APPARATUSES, PROCESSES AND SYSTEMS

PRIORITY CLAIM

Applicant hereby claims benefit to priority under 35 USC § 120 as a continuation-in-part of: U.S. patent application Ser. No. 18/130,803, filed Apr. 4, 2023, entitled "NFT Based Secure Authentication and Notification Apparatuses, Processes and Systems".

Applicant hereby claims benefit to priority under 35 USC § 120 as a continuation-in-part of: U'S patent application Ser. No. 18/130,809, filed Apr. 4, 2023, entitled "NFT Based Secure Authentication and Notification Apparatuses, Processes and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address information technology, and more particularly, include Transfer Transaction Blockchain with Clawback Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Ethereum is an open source software application and a shared protocol. It allows users to anonymously and instantaneously transact Ether, a digital currency, without needing to trust counterparties or separate intermediaries. Ethereum achieves this trustless anonymous network using public/private key pairs, a popular encryption technique.

BRIEF DESCRIPTION OF THE DRAWINGS

Appendices and/or drawings illustrating various, non-limiting, example, innovative aspects of the Transfer Transaction Blockchain with Clawback Apparatuses, Processes and Systems (hereinafter "NBSA") disclosure, include:

FIG. 19A, 19B (hereinafter collectively FIG. 19) shows non-limiting, example embodiments of implementation case (s) for the NBSA;

FIG. 24 shows non-limiting, example embodiments of implementation case(s) for the NBSA;

FIG. 25 shows non-limiting, example embodiments of implementation case(s) for the NBSA;

FIG. 26 shows non-limiting, example embodiments of implementation case(s) for the NBSA;

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Transfer Transaction Blockchain with Clawback Apparatuses, Processes and Systems (hereinafter "NBSA") transforms authenticating NFT generation input, NFT authentication input, document publishing input, NFT document access input, transfer transaction input, clawback transaction input datastructure/inputs, via NBSA components (e.g., ANG, NAP, DPP, NDAP, TTP, etc. components), into authenticating NFT generation output, NFT authentication output, document publishing output, NFT document access output, transfer transaction output, clawback transaction output outputs. The NBSA components, in various embodiments, implement advantageous features as set forth below.

INTRODUCTION

The NBSA provides unconventional features (e.g., an authenticating NFT that utilizes a master hash of source asset data hashes to facilitate user authentication, a notification NFT that utilizes a document hash to facilitate access to a published document for a set of subscribers, ability to claw back a transfer transaction via a smart contract) that were never before available in information technology.

NBSA

Figure 1:
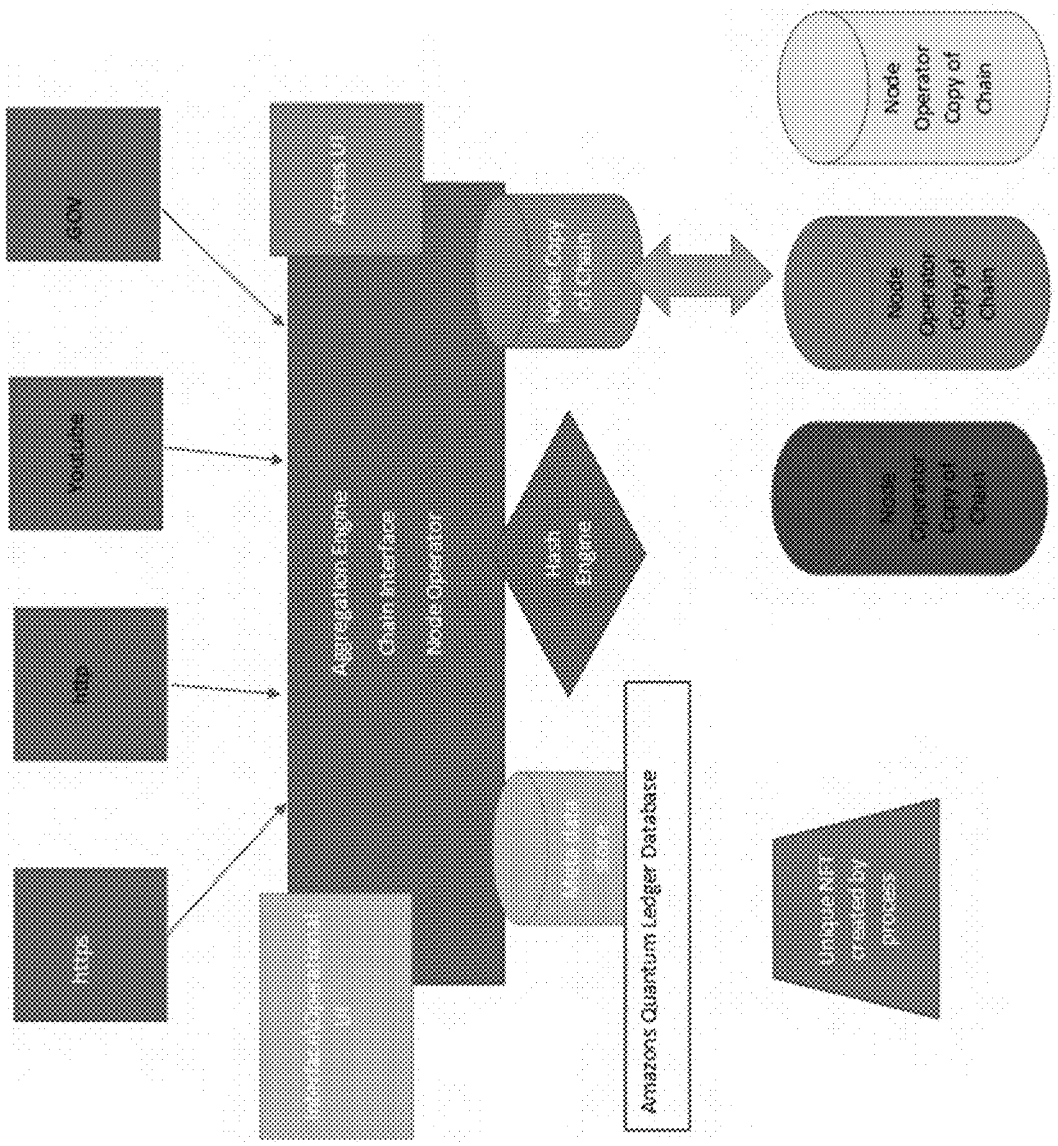
FIG. 1 shows non-limiting, example embodiments of an architecture for the NBSA.

FIG. 1 shows non-limiting, example embodiments of an architecture for the NBSA. In FIG. 1, components of an exemplary architecture that may be utilized to facilitate NBSA operation are illustrated.

In one embodiment, using common extraction and/or scanning mechanisms the NBSA may connect to objects, documents, meta data and/or the like (e.g., through http and/or https connections, etc.) and create NFT's from the objects (e.g., with or without metadata).

In one embodiment, using Solana, Ethereum, Polygon or other available Blockchain technologies the NBSA may create an NFT that may be used to perform a myriad of functions such as creating a unique image, creating a signed object for security access, a new secure object for indexing purposes, and/or the like.

In one implementation, the NBSA may be used to collect available information such as passports, identifiers, driver's license, photos, and/or the like to create an immutable identifier that cannot be tampered with and that will assure NFT may be used as a key for access and/or verification to other systems and/or access to locations. For instance, the NFT may be used as an identifier for border access since it combines assured authentication using a passport and/or other verified sources. In this example, the NFT may be used to access a Blockchain that holds the person's passport information (e.g., to replace or augment passports at borders). This may result in heightened security (e.g., using the obfuscation of the source data).

In another example, the data, images and metadata from patent databases may be hashed and then used to create an NFT that has the proper meta data attached, but in this case an image from the application may be used to create an NFT that looks like a patent image.

In another example, a similar process may be used to create NFT's to represent a driver's license, certificate of title or registration.

In one embodiment, agreed upon node operators may hold the source documents (e.g., in an adjunct database), while a hash of each source field may be used to create a master hash—this may then be synced and/or verified when the NFT is presented.

In one embodiment, using the NBSA may help reduce or eliminate gas fees for operational effects and minting on the blockchain. By agreement of node operators and/or using more efficient methods of extracting data from http and/or https resources gas fees could be lowered (e.g., by using an adjunct or off-chain database).

In one embodiment, the NFT may be used to create a Bluetooth, NFC, and/or the like signal that may be scanned in addition to scanning the NFT. These items may be carried in a smart phone, or other active object (e.g., both powered and unpowered).

For instance, users could carry a physical token that looks like a credit card, but once scanned they can produce the NFT, link to the NFT or signal from the token that resolves to an identity token.

In one implementation, the NFT within a wallet may be used to resolve to an identity (e.g., passport, driver's license, or other identity item).

In another implementation, the NFT could be used as a replacement for logging into a computer, or accessing a physical location, or entry into a room.

With the NFT within a wallet a user would not need the work badge, driver id or passport.

Depending on the usage, the holder of the NFT\Wallet may have to enter, speak or indicate a secret (e.g., password) to open the NFT from the wallet to present it to gain entry to a more secure device or location.

In another implementation, the NBSA may facilitate offering a low cost form of id that is easily available on a smartphone, to present to authorities that cannot be copied. For instance, if a country was accepting a large number of sudden refugees, they may want a unique NFT-based ID system in a wallet, in a smart phone or on a smart card that cannot be copied since it resolves to an NFT—that is bound to certain identifiers and access places or methods.

In one embodiment, a sufficient number of inputs to create the NFT (e.g., which cannot be copied) may be used to assure users and authentication authorities that the holder of the NFT (e.g., who may have to open it with a secret) is the person they claim to be with the rights embedded in the NFT.

For example, a low gas or gas-free approach may be used, where the cost of the NFT may be borne by the creator authority or the node operators, as it may be in the best interest of the people using it.

In one embodiment, smart contracts may be utilized by the NBSA, where passing of said governance gate would pass or fail depending on predefined rules outlined and enforced by one or more smart contracts. A non-exhaustive set of examples may include smart contracts administering fee limits, maximum exposure to an asset, security or sector, constitution of a portfolio, trading authorization and fiduciary compliance, access control rules (e.g., being in a certain user group (e.g., administrators, employee of a specific department), time of day restrictions on access, number of allowed accesses), and/or the like.

Figure 2:
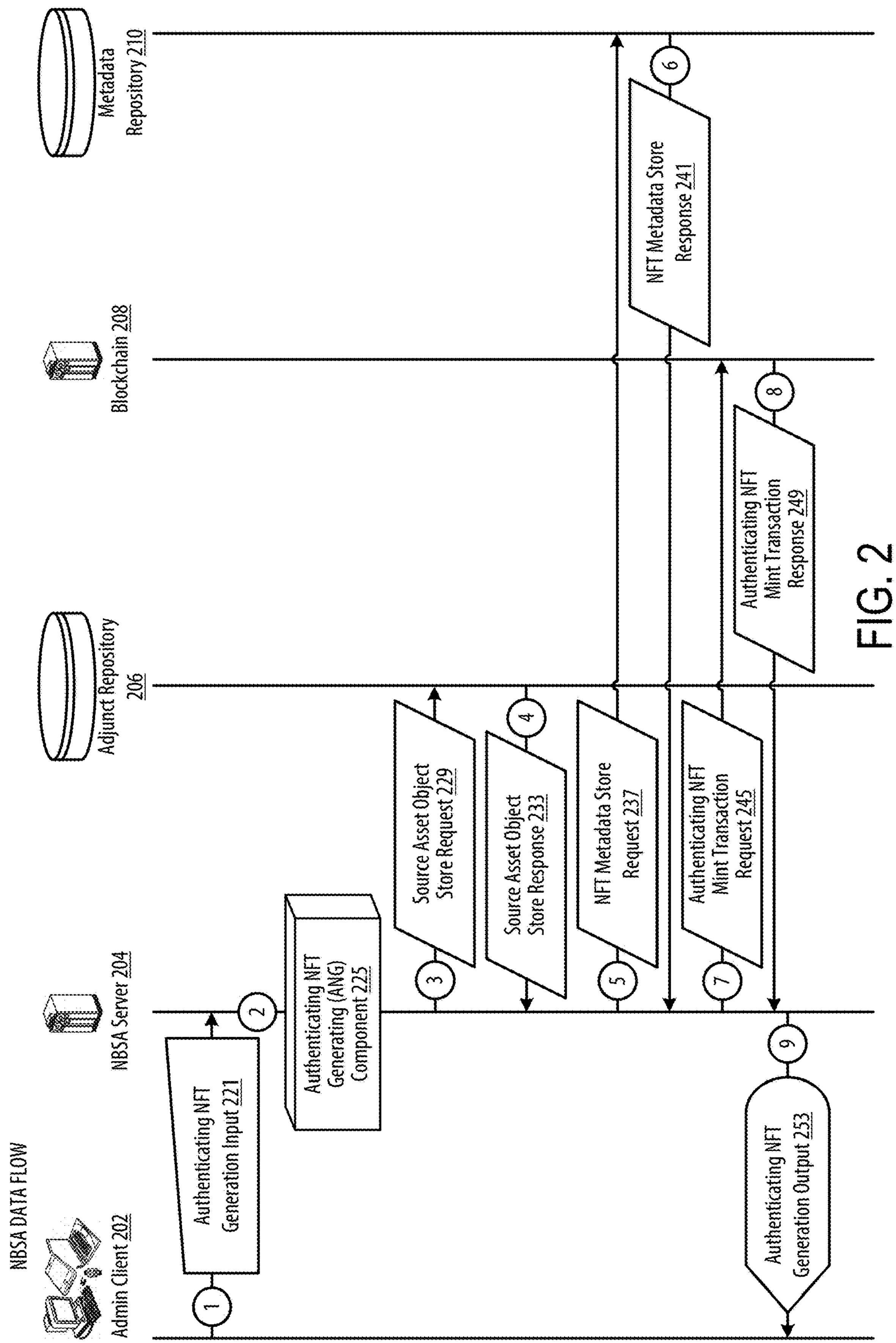
FIG. 2 shows non-limiting, example embodiments of a datagraph illustrating data flow(s) for the NBSA.

FIG. 2 shows non-limiting, example embodiments of a datagraph illustrating data flow(s) for the NBSA. In FIG. 2, an admin client 202 (e.g., of an administrator associated with an authority entity (e.g., a government agency, a regulator)) may send an authenticating NFT generation input 221 to an NBSA server 204 to request generation of an authenticating NFT for a user. For example, the admin client may be a desktop, a laptop, a tablet, a smartphone, a smartwatch, and/or the like that is executing a client application. In one implementation, the authenticating NFT generation input may include data such as a request identifier, a user identifier (e.g., of the intended owner of the authenticating NFT), a user's blockchain address (e.g., wallet address), an NFT type, an NFT description, source assets, and/or the like. In one embodiment, the admin client may provide the following example authenticating NET generation input, substantially in the form of a (Secure) Hypertext Transfer Protocol ("HTTP(S)") POST message including extensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth__request>
  <timestamp>2020-12-31 23:59:59</timestamp>
  <user__accounts__details>
      <user__account__credentials>
          <user__name>JohnDaDoeDoeDoooe@gmail.com</user__name>
          <password>abc123</password>
          //OPTIONAL <cookie>cookieID</cookie>
          //OPTIONAL <digital__cert__link>www.mydigitalcertificate.com/
JohnDoeDaDoeDoe@gmail.com/mycertifcate.dc</digital__cert__link>
          //OPTIONAL <digital__certificate>__DATA __< /digital__certificate>
      </user__account__credentials>
  </user__accounts__details>
  <client__details> //iOS Client with App and Webkit
          //it should be noted that although several client details
          //sections are provided to show example variants of client
          //sources, further messages may include only one to save
          //space
      <client__IP>10.0.0.123</client__IP>
      <user__agent__string>Mozilla/5.0 (iPhone; CPU iPhone OS 7__1__1 like Mac
OS X) AppleWebKit/537.51.2 (KHTML, like Gecko) Version/7.0 Mobile/11D201
Safari/9537.53</user__agent__string>
      <client__product__type>iPhone6,1</client__product__type>
      <client__serial__number>DNXXX1X1XXXX</client__serial__number>
      <client__UDID>3XXXXXXXXXXXXXXXXXXXXXXXXD</client__UDID>
      <client__OS>iOS</client__OS>
      <client__OS__version>7.1.1</client__OS__version>
      <client__app__type>app with webkit</client__app__type>
      <app__installed__flag>true</app__installed__flag>
      <app__name>NBSA.app</app__name>
      <app__version>1.0 </app__version>
      <app__webkit__name>Mobile Safari</client__webkit__name>
      <client__version>537.51.2</client__version>
  </client__details>
  <client__details> //iOS Client with Webbrowser
      <client__IP>10.0.0.123</client__IP>
      <user__agent__string>Mozilla/5.0 (iPhone; CPU iPhone OS 7__1__1 like Mac
OS X) AppleWebKit/537.51.2 (KHTML, like Gecko) Version/7.0 Mobile/11D201
Safari/9537.53</user__agent__string>
      <client__product__type>iPhone6,1</client__product__type>
      <client__serial__number>DNXXX1X1XXXX</client__serial__number>
      <client__UDID>3XXXXXXXXXXXXXXXXXXXXXXXXD</client__UDID>
      <client__OS>iOS</client__OS>
      <client__OS__version>7.1.1</client__OS__version>
      <client__app__type>web browser</client__app__type>
      <client__name>Mobile Safari</client__name>
      <client__version>9537.53</client__version>
  </client__details>
  <client__details> //Android Client with Webbrowser
      <client__IP>10.0.0.123</client__IP>
      <user__agent__string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user__agent__string>
      <client__product__type>Nexus S</client__product__type>
      <client__serial__number>YXXXXXXXXZ</client__serial__number>
      <client__UDID>FXXXXXXXXX-XXXX-XXXX-XXXX-XXXXXXXXXXXXX</client__UDID>
      <client__OS>Android</client__OS>
      <client__OS__version>4.0.4</client__OS__version>
      <client__app__type>web browser</client__app__type>
      <client__name>Mobile Safari</client__name>
      <client__version>534.30</client__version>
  </client__details>
  <client__details> //Mac Desktop with Webbrowser
      <client__IP>10.0.0.123</client__IP>
      <user__agent__string>Mozilla/5.0 (Macintosh; Intel Mac OS X 10__9__3)
AppleWebKit/537.75.14 (KHTML, like Gecko) Version/7.0.3
Safari/537.75.14</user__agent__string>
      <client__product__type>MacPro5,1</client__product__type>
      <client__serial__number>YXXXXXXXXZ</client__serial__number>
      <client__UDID>FXXXXXXXXX-XXXX-XXXX-XXXX-XXXXXXXXXXXXX</client__UDID>
```

-continued

```
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <authenticating_NFT_generation_input>
      <request_identifier>ID_request_1</request_identifier>
      <user_identifier>ID_user_1</user_identifier>
      <wallet_address>
        3NUiMqW49ToKdnUiK8044fetBUngSZm8iD9hdb5Rpg6Z
      </wallet_address>
      <NFT_type>Border access identifier</NFT_type>
      <NFT_description>Border access identifier for user</NFT_description>
      <source_assets>
        <source_asset>
          <asset_type>Passport</asset_type>
          <asset_URI>https://passport_agency.gov/passport/user1</asset_URI>
        </source_asset>
        <source_asset>
          <asset_type>Driver's License</asset_type>
          <asset_URI>drivers_license_OCR_scan.png</asset_URI>
        </source_asset>
        <source_asset>
          <asset_type>Social Network Photo</asset_type>
          <asset_URI>http://social_network.com/user1/photo.png</asset_URI>
        </source_asset>
      </source_assets>
    </authenticating_NFT_generation_input>
</auth_request>
```

An authenticating NFT generating (ANG) component 225 may utilize data provided in the authenticating NFT generation input to generate an authenticating NFT for the user. See FIG. 3 for additional details regarding the ANG component.

The NBSA server 204 may send a source asset object store request 229 to an adjunct repository 206 (e.g., Amazon S3) to facilitate storing source asset information for a source asset in the adjunct repository. It is to be understood that, in some embodiments, multiple source asset object store requests may be sent (e.g., one for each source asset). In one implementation, the source asset object store request may include data such as a request identifier, source asset object key, source asset type, source asset data, source asset hash, associated owner, and/or the like. In one embodiment, the NBSA server may provide the following example source asset object store request, substantially in the form of a HTTP(S) POST message including XML-formatted data, as provided below:

```
POST /source_asset_object_store_request.php HTTP/1.1
Host: www.server.com
Content-Type: Application/XML
Content-Length: 667
<?XML version = "1.0" encoding = "UTF-8"?>
<source_asset_object_store_request>
  <request_identifier>ID_request_2</request_identifier>
  <source_asset_object_key>passport_ID_user_1</source_asset_object_key>
  <source_asset_type>Passport</source_asset_type>
  <source_asset_data>
    Passport data (e.g., passport number, birthdate, chip info)
  </source_asset_data>
  <source_asset_hash>d056025fbea3c4700729c5b96b0ff97b</source_asset_hash>
  <associated_owner>ID_user_1</associated_owner>
</source_asset_object_store_request>
```

The adjunct repository 206 may send a source asset object store response 233 to the NBSA server 204 to confirm that the source asset information for the source asset was stored successfully. In one implementation, the source asset object store response may include data such as a response identifier, a status, and/or the like. In one embodiment, the adjunct repository may provide the following example source asset object store response, substantially in the form of a HTTP(S) POST message including XML-formatted data, as provided below:

```
POST /source_asset_object_store_response.php HTTP/1.1
Host: www.server.com
Content-Type: Application/XML
Content-Length: 667
<?XML version = "1.0" encoding = "UTF-8"?>
<source_asset_object_store_response>
  <response_identifier>ID_response_2</response_identifier>
  <status>OK</status>
</source_asset_object_store_response>
```

The NBSA server 204 may send an NFT metadata store request 237 to a metadata repository 210 (e.g., Arweave) to facilitate storing metadata for the authenticating NFT in the metadata repository. In one implementation, the NFT metadata store request may include data such as a request identifier, an NFT metadata identifier, NFT metadata, and/or the like. In one embodiment, the NBSA server may provide the following example NFT metadata store request, substantially in the form of a HTTP(S) POST message including XML-formatted data, as provided below:

```
POST /NFT__metadata__store__request.php HTTP/1.1
Host: www.server.com
Content-Type: Application/XML
Content-Length: 667
<?XML version = "1.0" encoding = "UTF-8"?>
<NFT__metadata__store__request>
  <request__identifier>ID__request__3</request__identifier>
  <NFT__metadata__ID>ID__NFT__metadata__1</NFT__metadata__ID>
  <NFT__metadata>
    <name>Border access identifier</name>
    <description>Border access identifier for user</description>
    <image>URI of image for border access identifier</image>
    <properties>
      <master__hash>1229f58b2ae34e6afa13a0073ed1a5874</master__hash>
      <source__assets>
        <source__asset>
          <source__asset__object__key>
            passport__ID__user__1
          </source__asset__object__key>
          <source__asset__type>Passport</source__asset__type>
        </source__asset>
        <source__asset>
          <source__asset__object__key>
            drivers__license__ID__user__1
          </source__asset__object__key>
          <source__asset__type>Drivers__License</source__asset__type>
        </source__asset>
        ...
      </source__assets>
    </properties>
  </NFT__metadata>
</NFT__metadata__store__request>
```

The metadata repository 210 may send an NFT metadata store response 241 to the NBSA server 204 to confirm that the metadata for the authenticating NFT was stored successfully. In one implementation, the NFT metadata store response may include data such as a response identifier, a status, and/or the like. In one embodiment, the metadata repository may provide the following example NFT metadata store response, substantially in the form of a HTTP(S) POST message including XML-formatted data, as provided below:

```
POST /NFT__metadata__store__response.php HTTP/1.1
Host: www.server.com
Content-Type: Application/XML
Content-Length: 667
<?XML version = "1.0" encoding = "UTF-8"?>
<NFT__metadata__store__response>
  <response__identifier>ID__response__3</response__identifier>
  <status>OK</status>
</NFT__metadata__store__response>
```

The NBSA server 204 may send an authenticating NFT mint transaction request 245 to an authenticating NFT smart contract deployed on a blockchain 208 (e.g., a new blockchain implemented via Amazon Quantum Ledger Database; an existing blockchain such as Solana, Ethereum, Polygon, and/or the like) to facilitate minting the authenticating NFT (e.g., including transferring ownership of the authenticating NFT to the intended owner). It is to be understood that, in some alternative embodiments, multiple transaction requests may be sent (e.g., one for a minting transaction and another for an ownership transfer transaction). In one implementation, the authenticating NFT mint transaction request may include data such as a request identifier, transaction data (e.g., including authenticating NFT details and a transaction signature of the authority entity), and/or the like. In one embodiment, the NBSA server may provide the following example authenticating NFT mint transaction request, substantially in the form of a HTTP(S) POST message including XML-formatted data, as provided below:

```
POST /authenticating__NFT__mint__transaction__request.php HTTP/1.1
Host: www.server.com
Content-Type: Application/XML
Content-Length: 667
<?XML version = "1.0" encoding = "UTF-8"?>
<authenticating__NFT__mint__transaction__request>
  <request__identifier>ID__request__4</request__identifier>
  <transaction__data>
    <NFT__details>
      <NFT_ID>
        tv3z7uzd7sitrexts4ljt3rm4azrce6y3q62fmeht3virqqc7rkq
      </NFT_ID>
      <owner__address>
        3NUiMqW49ToKdnUiK8Q44fetBUngSZm8iD9hdb5Rpg6Z
      </owner__address>
      <metadata__URI>link to authenticating NFT
      metadata</metadata__URI>
    </NFT__details>
    <transaction__signature>
      signature of the authority entity
    </transaction__signature>
  </transaction__data>
</authenticating__NFT__mint__transaction__request>
```

The authenticating NFT smart contract deployed on the blockchain 208 may send an authenticating NFT mint transaction response 249 to the NBSA server 204 to confirm that the transaction was processed. In one implementation, the authenticating NFT mint transaction response may include data such as a response identifier, a status, and/or the like. In one embodiment, the authenticating NFT smart contract deployed on the blockchain may provide the following example authenticating NFT mint transaction response, substantially in the form of a HTTP(S) POST message including XML-formatted data, as provided below:

```
POST /authenticating_NFT_mint_transaction_response.php HTTP/1.1
Host: www.server.com
Content-Type: Application/XML
Content-Length: 667
<?XML version = "1.0" encoding = "UTF-8"?>
<authenticating_NFT_mint_transaction_response>
  <response_identifier>ID_response_4</response_identifier>
  <status>OK</status>
</authenticating_NFT_mint_transaction_response>
```

The NBSA server 204 may send an authenticating NFT generation output 253 to the admin client 202 to inform the administrator whether the authenticating NFT was generated successfully. In one implementation, the authenticating NFT generation output may include data such as a response identifier, a status, and/or the like. In one embodiment, the NBSA server may provide the following example authenticating NFT generation output, substantially in the form of a HTTP(S) POST message including XML-formatted data, as provided below:

```
POST /authenticating_NFT_generation_output.php HTTP/1.1
Host: www.server.com
Content-Type: Application/XML
Content-Length: 667
<?XML version = "1.0" encoding = "UTF-8"?>
<authenticating_NFT_generation_output>
  <response_identifier>ID_response_1</response_identifier>
  <status>OK</status>
</authenticating_NFT_generation_output>
```

Figure 3:
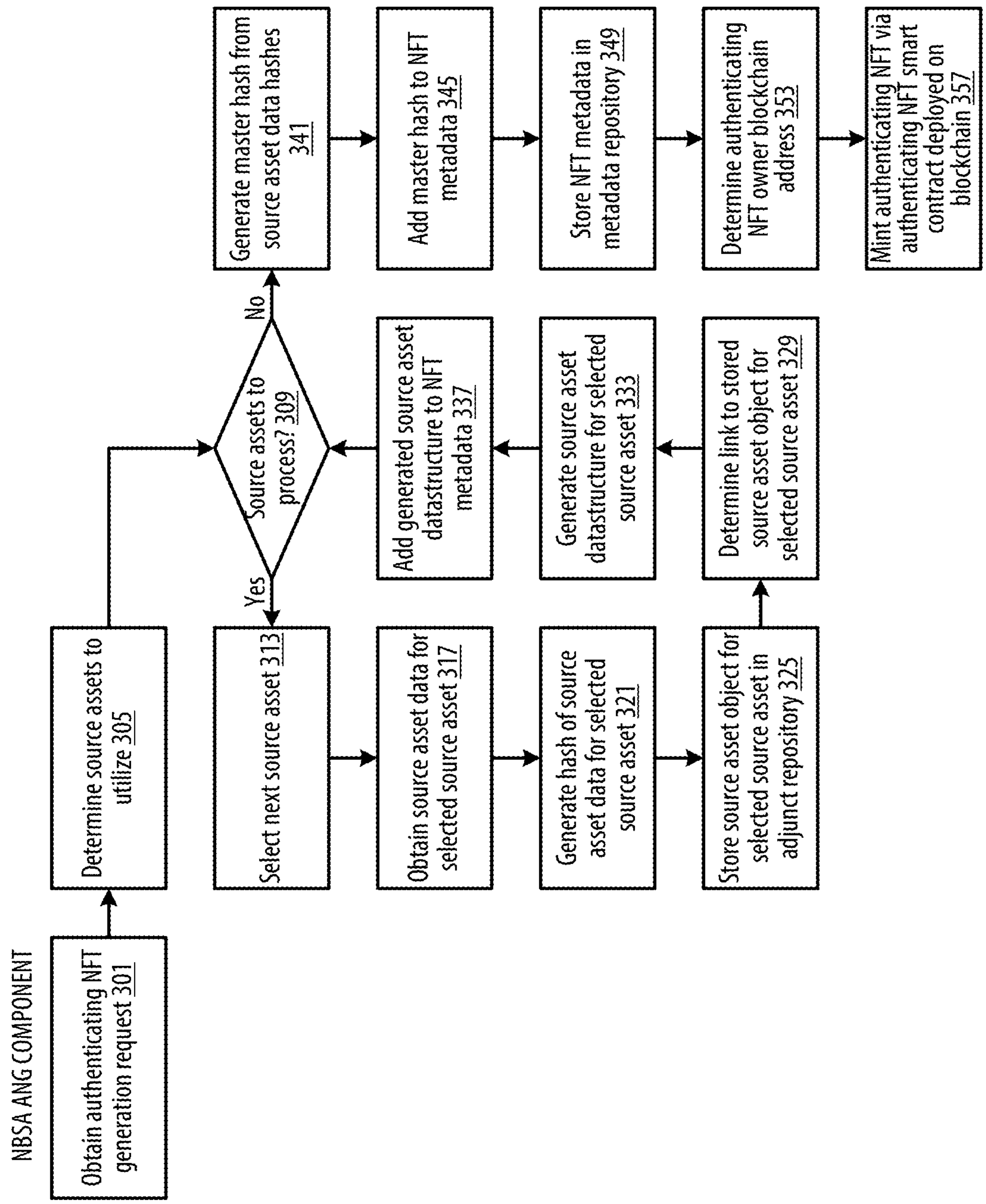
FIG. 3 shows non-limiting, example embodiments of a logic flow illustrating an authenticating NFT generating (ANG) component for the NBSA.

FIG. 3 shows non-limiting, example embodiments of a logic flow illustrating an authenticating NFT generating (ANG) component for the NBSA. In FIG. 3, an authenticating NFT generation request may be obtained at 301. For example, the authenticating NFT generation request may be obtained as a result of an input request from an administrator associated with an authority entity to generate an authenticating NFT for a user (e.g., the intended owner of the authenticating NFT). In another example, the authenticating NFT generation request may be obtained from the user.

Source assets to utilize may be determined at 305. In one embodiment, source assets may comprise verifiable data elements such as a driver's license, a passport, a TSA id, a Global Entry card, a RealID, a birth certificate, an affadavit, a credit card, a photo, an employee id badge, and/or the like. In one implementation, the authenticating NFT generation request may be parsed (e.g., using PHP commands) to determine the source assets to utilize (e.g., based on the value of the source_assets field). In another implementation, the source assets to utilize may be specified (e.g., by the administrator, by the user) via the user interface of the NBSA. See FIG. 11 for an example of the user interface that may be utilized.

A determination may be made at 309 whether there remain source assets to process. In one implementation, each of the determined source assets may be processed. If there remain source assets to process, the next source asset may be selected for processing at 313.

Source asset data for the selected source asset may be obtained at 317. For example, source asset data for a passport may comprise a set of constituent data elements including at least one of: a passport number, a name specified by the passport, a birthdate specified by the passport, a photo specified by the passport, chip info associated with the passport, and/or the like. In one implementation, the source asset data may be obtained from a Uniform Resource Identifier (URI) associated with the selected source asset (e.g., specified via the asset_URI field associated with the selected source asset). For example, the source asset data may be downloaded from a third party website (e.g., by making HTTP(S) requests to the website) and/or processed (e.g., via optical character recognition (OCR), via parsing) to extract desired constituent data elements. In another implementation, the source asset data may be obtained via the user interface of the NBSA (e.g., specified by the administrator, specified by the user). For example, the source asset data may be uploaded and/or processed (e.g., via OCR, via parsing) to extract desired constituent data elements. See FIG. 11 for an example of the user interface that may be utilized. In another implementation, the source asset data may be obtained (e.g., from the administrator, from the user) via a smart contract. For example, the source asset data may be obtained via a smart contract implemented as follows:

Smart Contract

```
pragma solidity ^0.6.0;
contract DocumentRegulator {
  // The address of the regulator
  address regulator;
  // The documents that have been submitted to the regulator
  mapping(bytes32 => bool) public submittedDocuments;
  // The document hashes that have been approved by the regulator
  mapping(bytes32 => bool) public approvedDocuments;
  // The document hashes that have been rejected by the regulator
  mapping(bytes32 => bool) public rejectedDocuments;
  // The document hashes that are currently under review by the regulator
  mapping(bytes32 => bool) public pendingDocuments;
  constructor(address _regulator) public {
    regulator = _regulator;
  }
  // Allows the sender to submit a document to the regulator for review
  function submitDocument(bytes32 documentHash) public {
    require(!submittedDocuments[documentHash], "This document has
already been submitted.");
    submittedDocuments[documentHash] = true;
```

-continued

| Smart Contract |
|---|

```
    pendingDocuments[documentHash] = true;
  }
  // Allows the regulator to approve a submitted document
  function approveDocument(bytes32 documentHash) public {
    require(pendingDocuments[documentHash], "This document is not
currently under review.");
    pendingDocuments[documentHash] = false;
    approvedDocuments[documentHash] = true;
  }
  // Allows the regulator to reject a submitted document
  function rejectDocument(bytes32 documentHash) public {
    require(pendingDocuments[documentHash], "This document is not
currently under review.");
    pendingDocuments[documentHash] = false;
    rejectedDocuments[documentHash] = true;
  }
}
```

Notes

This smart contract has a mapping for each state of the document submission process: submitted, approved, rejected, and pending. It also has functions for each action that can be taken on a document: submitting it, approving it, and rejecting it.

To use this contract, an instance of it may be deployed on the blockchain, and the regulator's address may be passed as an argument to the constructor. Then, users can submit documents for review by calling the submitDocument function and passing in the hash of the document. The regulator can then review the document and either approve or reject it by calling the approveDocument or rejectDocument functions, respectively.

A hash of the source asset data for the selected source asset may be generated at 321. In one embodiment, the hash of the source asset data may be generated using a hash function such as MD5, SHA-2, CRC32, and/or the like. In one implementation, the source asset data (e.g., for a passport this may be a tuple of constituent data elements such as {passport number, birthdate, chip info}) may be hashed using the hash function to generate the hash of the source asset data for the selected source asset. For example, for a passport the hash may be d056025fbea3c4700729c5b96b0ff97b. In another example, for a driver's license the hash may be 52495652ef91223f9a103aba820a5ef9.

A source asset object for the selected source asset may be stored in an adjunct repository at 325. In various embodiments, the adjunct repository may be Amazon S3 object store, MySQL database, IPFS, directly on the blockchain, and/or the like. In one implementation, the source asset object may store source asset information for the selected source asset such as an identifier (e.g., a key), source asset data (e.g., content data such as an image scan of a passport, an OCR version of the passport, constituent data elements of the passport, and/or the like), source asset metadata (e.g., name, description, type, owner, and/or the like), a source asset hash, and/or the like. For example, the source asset object for the selected source asset may be stored in the adjunct repository via a call to Amazon S3 API that facilitates storing objects in a bucket similar to the following:

```
POST / HTTP/1.1
Host: nbts.s3.amazonaws.com
User-Agent: browser_data
Accept: file_types
Accept-Language: Regions
Accept-Encoding: encoding
Accept-Charset: character_set
Keep-Alive: 300
Connection: keep-alive
```

-continued

```
Content-Type: multipart/form-data; boundary=9431149156168
Content-Length: length
Content-Disposition: form-data; name="key"
Content-Disposition: form-data; name="tagging"
<Tagging>
  <TagSet>
    <Tag>
      <Key>sourceAssetID</Key>
      <Value>passport_ID_user_1</Value>
      <Key>sourceAssetType</Key>
      <Value>Passport</Value>
      <Key>sourceAssetData</Key>
      <Value>"{passport number, birthdate, chip info}"</Value>
      <Key>sourceAssetHash</Key>
      <Value>d056025fbea3c4700729c5b96b0ff97b</Value>
      <Key>sourceAssetOwner</Key>
      <Value>ID_user_1</Value>
    </Tag>
  </TagSet>
</Tagging>
signature=9431149156168
Content-Disposition: form-data; name="file"; filename="passport.pdf"
Content-Type: pdf
```

In another example, the source asset object for the selected source asset may be stored in the adjunct repository via a MySQL database command similar to the following:

```
INSERT INTO SourceAssets (sourceAssetID, sourceAssetType,
  sourceAssetData, sourceAssetHash, sourceAssetOwner)
VALUES (passport_ID_user_1, "Passport", "{passport number,
  birthdate, chip info}", "d056025fbea3c4700729c5b96b0ff97b",
  ID_user_1);
```

A link to the stored source asset object for the selected source asset may be determined at 329. In one embodiment, the link may be structured to allow determination of the hash of the source asset data for the selected source asset. For example, the link may be utilized to expose the stored hash (e.g., to authorized users). In another example, the link may be utilized to expose the stored constituent data elements (e.g., to authorized users) that may be utilized to recalculate the hash. In one implementation, the link may be the identifier (e.g., the key) of the stored source asset object in the adjunct repository. In another implementation, the link may be a URI to the exposed data (e.g., the stored hash, the stored constituent data elements) in the adjunct repository (e.g., https://s3/nbts/d056025fbea3c4700729c5b96b0ff97b).

A source asset datastructure for the selected source asset may be generated at 333. In one embodiment, the source asset datastructure may be structured to comprise a set of data fields that describe properties of the selected source asset. In one implementation, the source asset datastructure may be generated in JSON format as part of NFT metadata. For example, a source asset datastructure similar to the following may be generated:

```
"source__asset": {
  "source__asset__object__key": "passport__ID__user__1",
  "source__asset__type": "Passport"
}
```

The generated source asset datastructure may be added to NFT metadata at 337. In one embodiment, the NFT metadata may be structured to comprise a set of data fields that describe properties of the authenticating NFT. In one implementation, the generated source asset datastructure may be added to the set of properties datastructures of the NFT metadata. For example, a portion of NFT metadata similar to the following may be generated:

```
"properties": {
  "source__asset": {
    "source__asset__object__key": "passport__ID__user__1",
    "source__asset__type": "Passport"
  },
  "source__asset": {
    "source__asset__object__key": "drivers__license__ID__user__1",
    "source__asset__type": "Drivers__License"
  },
  ...
}
```

A master hash may be generated from the source asset data hashes at 341. In one embodiment, the master hash may be calculated by combining the source asset data hashes. In various implementations, the master hash may be calculated by summing the source asset data hashes, by using a hash function such as MD5, SHA-2, CRC32, and/or the like on a tuple comprising the source asset data hashes, and/or the like. For example, the master hash may be generated from the source asset data hashes as follows:

```
Passport hash: d056025fbea3c4700729c5b96b0ff97b
Driver's License hash: 52495652ef91223f9a103aba820a5ef9
Master hash = Passport hash + Driver's License hash
Master hash = d056025fbea3c4700729c5b96b0ff97b +
  52495652ef91223f9a103aba820a5ef9
Master hash = 1229f58b2ae34e6afa13a0073ed1a5874
```

The master hash may be added to the NFT metadata at 345. In one embodiment, the NFT metadata may be structured to comprise a set of data fields that describe properties of the authenticating NFT. In one implementation, the master hash may be added to the set of properties datastructures of the NFT metadata. For example, a portion of NFT metadata similar to the following may be generated:

```
"properties": {
  "master__hash": "1229f58b2ae34e6afa13a0073ed1a5874",
  "source__asset": {
    "source__asset__object__key": "passport__ID__user__1",
    "source__asset__type": "Passport"
  },
  "source__asset": {
    "source__asset__object__key": "drivers__license__ID__user__1",
    "source__asset__type": "Drivers__License"
  },
  ...
}
```

In an alternative embodiment, instead of storing the entire master hash, a plurality of authenticating NFT's may be generated and a portion of the master hash may be stored in NFT metadata of each of the plurality of authenticating NFTs. For example, such portions of the master hash may operate as a multi-sig like key, such that all or m-of-n (e.g., 2 out of 3) portions of the master hash may be utilized to obtain access. In one implementation, the source asset data hashes may be utilized as portions of the master hash. In another implementation, the master hash may be split (e.g., via Shamir's secret sharing) to generate portions of the master hash.

The NFT metadata may be stored in a metadata repository at 349. In one implementation, the NFT metadata may be in JSON format. For example, NFT metadata similar to the following may be stored:

```
{
  "name": "Border access identifier",
  "description": "Border access identifier for user",
  "image": "URI of image for border access identifier",
  "properties": {
    "master__hash": "1229f58b2ae34e6afa13a0073ed1a5874",
    "source__asset": {
      "source__asset__object__key": "passport__ID__user__1",
      "source__asset__type": "Passport"
    },
    "source__asset": {
      "source__asset__object__key": "drivers__license__ID__user__1",
      "source__asset__type": "Drivers__License"
    },
    ...
  }
}
```

In various embodiments, the metadata repository may be Arweave network, MySQL database, IPFS, directly on the blockchain, and/or the like. For example, the NFT metadata may be stored in the metadata repository via a call to Arweave API that facilitates storing data on the Arweave network similar to the following:

```
URL: /tx
Method: POST
Pay load:
{
  "last__tx": "63KntvNNxLWm3oos7HciFNa8ToRGqyikf1oF9aKTcibJ",// Base64 encoded
```

-continued

```
ID of the last transaction made by this wallet. Empty if this is the first one.
  "transaction."owner": "C6d3jyzPfCyEKY3wfwvs791sreLC1WgPpcU4ZFsuv7uA",// The
public key making this transaction.
  "transactions."quantity": "",// Decimal string representation of the amount
of sent AR in winston. Empty for data transactions.
  "data":"ewoJCeKAnG1hc3Rlc19oYXNo4oCd0iDigJwxMjI5ZjU4YjJhZTM0ZTZhZ...",// The
Base64 encoded data being store in the transaction.
  "reward": "0.0025",// Decimal string representation of the mining reward AR
amount in winston.
  "signature": "C6d3jyzPfCyEKY3wfwvs791sreLC1WgPpcU4ZFsuv7uA"// Base64 encoded
signature of the transaction.
}
```

In another example, the NFT metadata may be stored in the metadata repository via a MySQL database command similar to the following:

```
INSERT INTO Metadata (NFT_metadata_ID, NFT_metadata_name,
  NFT_metadata_description, NFT_metadata_image,
  NFT_metadata_properties)
VALUES (ID_NFT_metadata_1, "Border access identifier", "Border
  access identifier for user", "URI of image for border access identifier",
  "properties data");
```

An owner blockchain address associated with the authenticating NFT may be determined at 353. In one implementation, the authenticating NFT generation request may be parsed (e.g., using PHP commands) to determine the owner blockchain address (e.g., based on the value of the wallet_address field). For example, the owner blockchain address may be a blockchain wallet address (e.g., 3NUiMqW49ToKdnUiK8Q44fetBUngSZm8iD9hdb5Rpg6Z).

The authenticating NFT may be minted via an authenticating NFT smart contract deployed on a blockchain (e.g., a new blockchain implemented via Amazon Quantum Ledger Database; an existing blockchain such as Solana, Ethereum, Polygon, and/or the like) at 357. In one implementation, a blockchain address of the authenticating NFT smart contract may be specified via a configuration setting (e.g., specific to a usage application (e.g., border access, computer authentication, smart locks)). For example, an authenticating NFT smart contract structured similar to the following may be utilized:

```
Smart Contract
pragma solidity ^0.7.0;
import "https://github.com/polygon-network/polygon-sdk-
solidity/contracts/libraries/SafeMath.sol";
import "https://github.com/polygon-network/polygon-sdk-
solidity/contracts/interfaces/IComparable.sol";
import "https://github.com/polygon-network/polygon-sdk-
solidity/contracts/interfaces/INFT.sol";
import "https: //github.com/polygon-network/polygon-sdk-
solidity/contracts/interfaces/IForwarder.sol";
import "https: //github.com/polygon-network/polygon-sdk-
solidity/contracts/interfaces/ISecured.sol";
import "https://github.com/polygon-network/polygon-sdk-
solidity/contracts/interfaces/ICollection.sol";
import "https: //github.com/polygon-network/polygon-sdk-
solidity/contracts/interfaces/IForwarderReceiver.sol";
import "https: //github.com/polygon-network/polygon-sdk-
solidity/contracts/interfaces/ICollectionReceiver.sol";
import "https: //github.com/polygon-network/polygon-sdk-
solidity/contracts/interfaces/ICollectionRole.sol";
import "https: //github.com/polygon-network/polygon-sdk-
solidity/contracts/interfaces/IForwarderRole.sol";
import "https: //github.com/polygon-network/polygon-sdk-
solidity/contracts/interfaces/ICollectionReceiverRole.sol";
```

-continued

```
import "https: //github.com/polygon-network/polygon-sdk-
solidity/contracts/interfaces/IForwarderReceiverRole.sol";
import "https: //github.com/polygon-network/polygon-sdk-
solidity/contracts/libraries/Identity.sol";
import "https: //github.com/polygon-network/polygon-sdk-
solidity/contracts/libraries/NFTCore.sol";
import "https: //github.com/polygon-network/polygon-sdk-
solidity/contracts/libraries/NFTRoles.sol";
import "https: //github.com/polygon-network/polygon-sdk-
solidity/contracts/libraries/NFTs.sol";
// Set up the contract to use the SafeMath library
using SafeMath for uint256;
// Define the structure of the NFT
contract MyNFT is IComparable, INFT, ISecured, ICollection,
IForwarder, ICollectionReceiver, ICollectionRole, IForwarderRole,
ICollectionReceiverRole, IForwarderReceiverRole {
  // Define variables to store the data for the NFT
  string public name;
  string public description;
  uint256 public price;
  // Define the constructor for the NFT
  constructor( ) public {
    // Set
// Other variables may include parts of metadata such as {publication
date}{artist name}{date}{mint cap}{location}{GPS coordinates}{email
address}{consortium or member id}{node address}{document type}
// Other functions may include a safeMint( ) function for minting an
authenticating NFT
```

In one implementation, a blockchain transaction may be sent to the authenticating NFT smart contract (e.g., via an authenticating NFT mint transaction request) to mint the authenticating NFT. For example, the authenticating NFT may be minted via a call to a safeMint( . . . ) function of an ERC-721 compliant authenticating NFT smart contract (e.g., signed by the authority entity). In one embodiment, minting the authenticating NFT may comprise associating (e.g., via an NFT identifier of the authenticating NFT) the NFT metadata and/or the owner blockchain address with the authenticating NFT.

Figure 4:
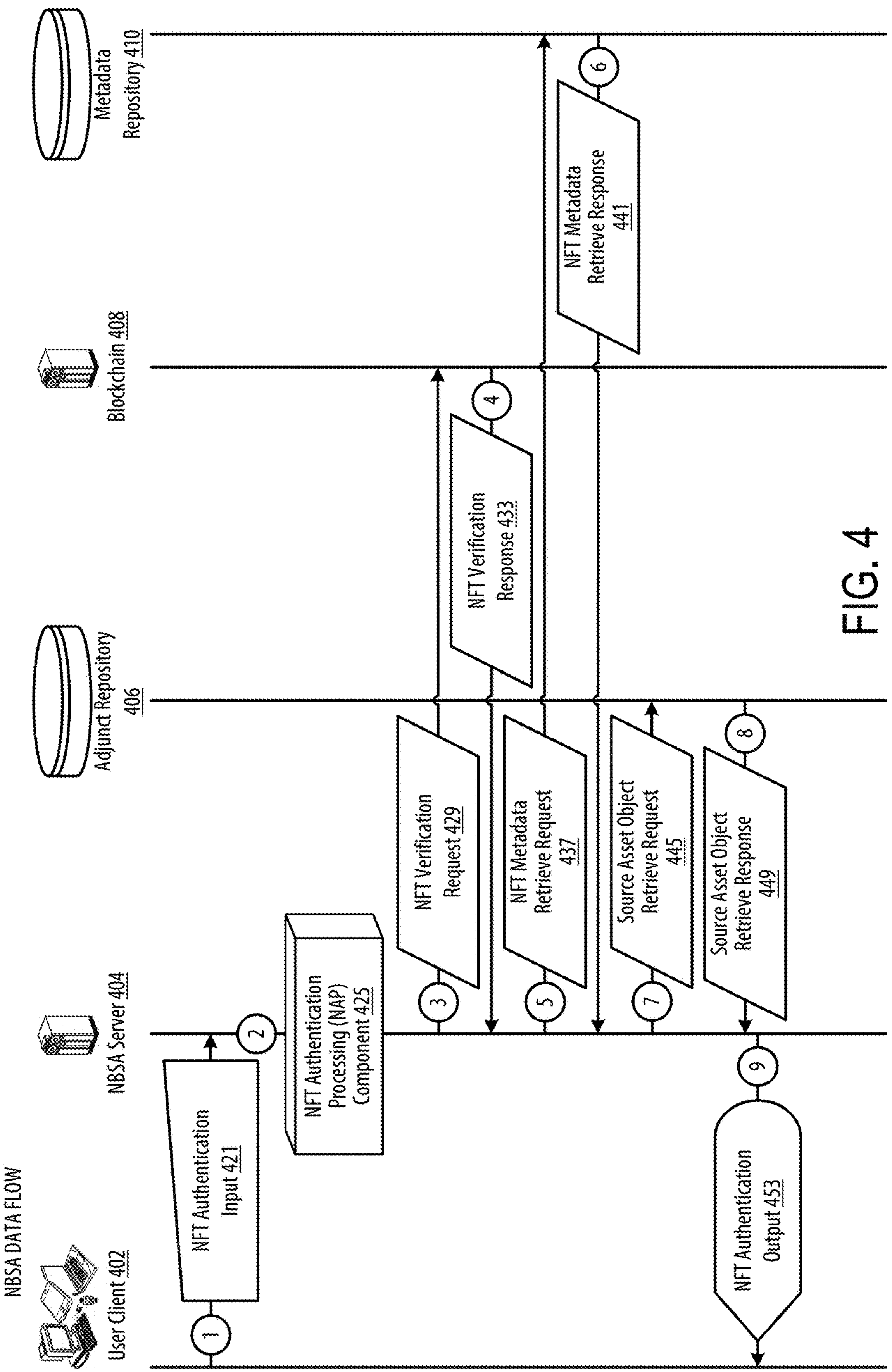
FIG. 4 shows non-limiting, example embodiments of a datagraph illustrating data flow(s) for the NBSA.

FIG. 4 shows non-limiting, example embodiments of a datagraph illustrating data flow(s) for the NBSA. In FIG. 4, a user client 402 (e.g., of a user owner of an authenticating NFT, of an authentication application and/or device that obtained an authenticating NFT from a user owner) may send an NFT authentication input 421 to an NBSA server 404 to facilitate authentication of the user via the authenticating NFT. For example, the user client may be a desktop, a laptop, a tablet, a smartphone, a smartwatch, and/or the like that is executing a client application. In one implementation, the NFT authentication input may include data such as a request identifier, a user identifier (e.g., a name, a phone number, a wallet address, an identification number (e.g., SSN, employee id)), an NFT identifier, an NFT type, authorization data (e.g., a password allowing access to a cryptocurrency wallet, a cryptographic signature proving ownership of a blockchain address), and/or the like. In one embodiment, the user client may provide the following example NFT authentication input, substantially in the form of a HTTP(S) POST message including XML-formatted data, as provided below:

```
POST /NFT_authentication_input.php HTTP/1.1
Host: www.server.com
Content-Type: Application/XML
Content-Length: 667
<?XML version = "1.0" encoding = "UTF-8"?>
<NFT_authentication_input>
  <request_identifier>ID_request_11</request_identifier>
  <user_identifier>ID_user_1</user_identifier>
  <NFT_ID>
    tv3z7uzd7sitrexts4ljt3rm4azrce6y3q62fmeht3virqqc7rkq
  </NFT_ID>
  <NFT_type>Border access identifier</NFT_type>
  <authorization_data>
    cryptographic signature valid for owner address associated with the
    authenticating NFT (e.g., a signed message generated by a wallet)
  </authorization_data>
</NFT_authentication_input>
```

An NFT authentication processing (NAP) component 425 may utilize data provided in the NFT authentication input to authenticate the user via the authenticating NFT. See FIG. 5 for additional details regarding the NAP component.

The NBSA server 404 may send an NFT verification request 429 to an authenticating NFT smart contract deployed on a blockchain 408 (e.g., a new blockchain implemented via Amazon Quantum Ledger Database; an existing blockchain such as Solana, Ethereum, Polygon, and/or the like) to facilitate verifying that the user authorized the request to authenticate via the authenticating NFT. For example, the NFT verification request may be utilized to determine an owner blockchain address (e.g., a wallet address) and/or metadata (e.g., a metadata datastructure stored on the blockchain, a URI link to metadata stored off-chain) associated with the authenticating NFT. It is to be understood that, in some embodiments, multiple NFT verification requests may be sent (e.g., one to obtain the owner blockchain address and another to obtain the metadata). In one implementation, the NFT verification request may include data such as a request identifier, a smart contract address, function call details, and/or the like. In one embodiment, the NBSA server may provide the following example NFT verification request, substantially in the form of a HTTP(S) POST message including XML-formatted data, as provided below:

```
POST /NFT_verification_request.php HTTP/1.1
Host: www.server.com
Content-Type: Application/XML
Content-Length: 667
<?XML version = "1.0" encoding = "UTF-8"?>
<NFT_verification_request>
  <request_identifier>ID_request_12</request_identifier>
  <smart_contract_address>
    address of the authenticating NFT smart contract
  </smart_contract_address>
  <function_call_details>
    <function_name>ownerOf</function_name>
    <NFT_ID>
      tv3z7uzd7sitrexts4ljt3rm4azrce6y3q62fmeht3virqqc7rkq
    </NFT_ID>
  </function_call_details>
  <function_call_details>
```

-continued

```
    <function_name>tokenURI</function_name>
    <NFT_ID>
      tv3z7uzd7sitrexts4ljt3rm4azrce6y3q62fmeht3virqqc7rkq
    </NFT_ID>
  </function_call_details>
</NFT_verification_request>
```

The authenticating NFT smart contract deployed on the blockchain 408 may send an NFT verification response 433 to the NBSA server 404 with the requested authenticating NFT data. In one implementation, the NFT verification response may include data such as a response identifier, the requested authenticating NFT data, and/or the like. In one embodiment, the authenticating NFT smart contract deployed on the blockchain may provide the following example NFT verification response, substantially in the form of a HTTP(S) POST message including XML-formatted data, as provided below:

```
POST /NFT_verification_response.php HTTP/1.1
Host: www.server.com
Content-Type: Application/XML
Content-Length: 667
<?XML version = "1.0" encoding = "UTF-8"?>
<NFT_verification_response>
  <response_identifier>ID_response_12</response_identifier>
  <owner_address>
    3NUiMqW49ToKdnUiK8Q44fetBUngSZm8iD9hdb5Rpg6Z
  </owner_address>
  <metadata_URI>link to authenticating NFT metadata</metadata_URI>
</NFT_verification_response>
```

The NBSA server 404 may send an NFT metadata retrieve request 437 to a metadata repository 410 (e.g., via the metadata URI) to facilitate retrieving metadata associated with the authenticating NFT from the metadata repository. In one implementation, the NFT metadata retrieve request may include data such as a request identifier, an NFT metadata identifier, and/or the like. In one embodiment, the NBSA server may provide the following example NFT metadata retrieve request, substantially in the form of a HTTP(S) POST message including XML-formatted data, as provided below:

```
POST /NFT_metadata_retrieve_request.php HTTP/1.1
Host: www.server.com
Content-Type: Application/XML
Content-Length: 667
<?XML version = "1.0" encoding = "UTF-8"?>
<NFT_metadata_retrieve_request>
  <request_identifier>ID_request_13</request_identifier>
  <NFT_metadata_ID>ID_NFT_metadata_1</NFT_metadata_ID>
</NFT_metadata_retrieve_request>
```

The metadata repository 410 may send an NFT metadata retrieve response 441 to the NBSA server 404 with the requested metadata. In one implementation, the NFT metadata retrieve response may include data such as a response identifier, the requested metadata datastructure, and/or the like. In one embodiment, the metadata repository may provide the following example NFT metadata retrieve response, substantially in the form of a HTTP(S) POST message including XML-formatted data, as provided below:

```
POST /NFT_metadata_retrieve_response.php HTTP/1.1
Host: www.server.com
Content-Type: Application/XML
Content-Length: 667
<?XML version = "1.0" encoding = "UTF-8"?>
<NFT_metadata_retrieve_response>
  <response_identifier>ID_response_13</response_identifier>
  <NFT_metadata>
    <name>Border access identifier</name>
    <description>Border access identifier for user</description>
    <image>URI of image for border access identifier</image>
    <properties>
      <master_hash>1229f58b2ae34e6afa13a0073ed1a5874</master_hash>
      <source_assets>
        <source_asset>
          <source_asset_object_key>
            passport_ID_user_1
          </source_asset_object_key>
          <source_asset_type>Passport</source_asset_type>
        </source_asset>
        <source_asset>
          <source_asset_object_key>
            drivers_license_ID_user_1
          </source_asset_object_key>
          <source_asset_type>Drivers_License</source_asset_type>
        </source_asset>
        ...
      </source_assets>
    </properties>
  </NFT_metadata>
</NFT_metadata_retrieve_response>
```

The NBSA server 404 may send a source asset object retrieve request 445 to an adjunct repository 406 to facilitate retrieving source asset information (e.g., hash, constituent data elements), for a source asset specified in the NFT metadata, from the adjunct repository. It is to be understood that, in some embodiments, multiple source asset object retrieve requests may be sent (e.g., one for each specified source asset). In one implementation, the source asset object retrieve request may include data such as a request identifier, source asset object key, source asset type, specification of requested source asset data, and/or the like. In one embodiment, the NBSA server may provide the following example source asset object retrieve request, substantially in the form of a HTTP(S) POST message including XML-formatted data, as provided below:

```
POST /source_asset_object_retrieve_request.php HTTP/1.1
Host: www.server.com
Content-Type: Application/XML
Content-Length: 667
<?XML version = "1.0" encoding = "UTF-8"?>
<source_asset_object_retrieve_request>
  <request_identifier>ID_request_14</request_identifier>
  <source_asset_object_key>passport_ID_user_1</source_asset_object_key>
  <source_asset_type>Passport</source_asset_type>
  <requested_source_asset_data>source_asset_hash</requested_source_asset_data>
</source_asset_object_retrieve_request>
```

The adjunct repository 406 may send a source asset object retrieve response 449 to the NBSA server 404 with the requested source asset data. In one implementation, the source asset object retrieve response may include data such as a response identifier, the requested source asset data, and/or the like. In one embodiment, the adjunct repository may provide the following example source asset object retrieve response, substantially in the form of a HTTP(S) POST message including XML-formatted data, as provided below:

```
POST /source_asset_object_retrieve_response.php HTTP/1.1
Host: www.server.com
Content-Type: Application/XML
Content-Length: 667
<?XML version = "1.0" encoding = "UTF-8"?>
<source_asset_object_retrieve_response>
  <response_identifier>ID_response_14</response_identifier>
  <source_asset_hash>d056025fbea3c4700729c5b96b0ff97b</source_asset_hash>
</source_asset_object_retrieve_response>
```

The NBSA server 404 may send an NFT authentication output 453 to the user client 402 to inform the user client whether authentication of the user's authenticating NFT was successful. In one implementation, the NFT authentication output may include data such as a response identifier, a status, and/or the like. In one embodiment, the NBSA server may provide the following example NFT authentication output, substantially in the form of a HTTP(S) POST message including XML-formatted data, as provided below:

```
POST /NFT_authentication_output.php HTTP/1.1
Host: www.server.com
Content-Type: Application/XML
Content-Length: 667
<?XML version = "1.0" encoding = "UTF-8"?>
<NFT_authentication_output>
  <response_identifier>ID_response_11</response_identifier>
  <status>OK</status>
</NFT_authentication_output>
```

Figure 5:
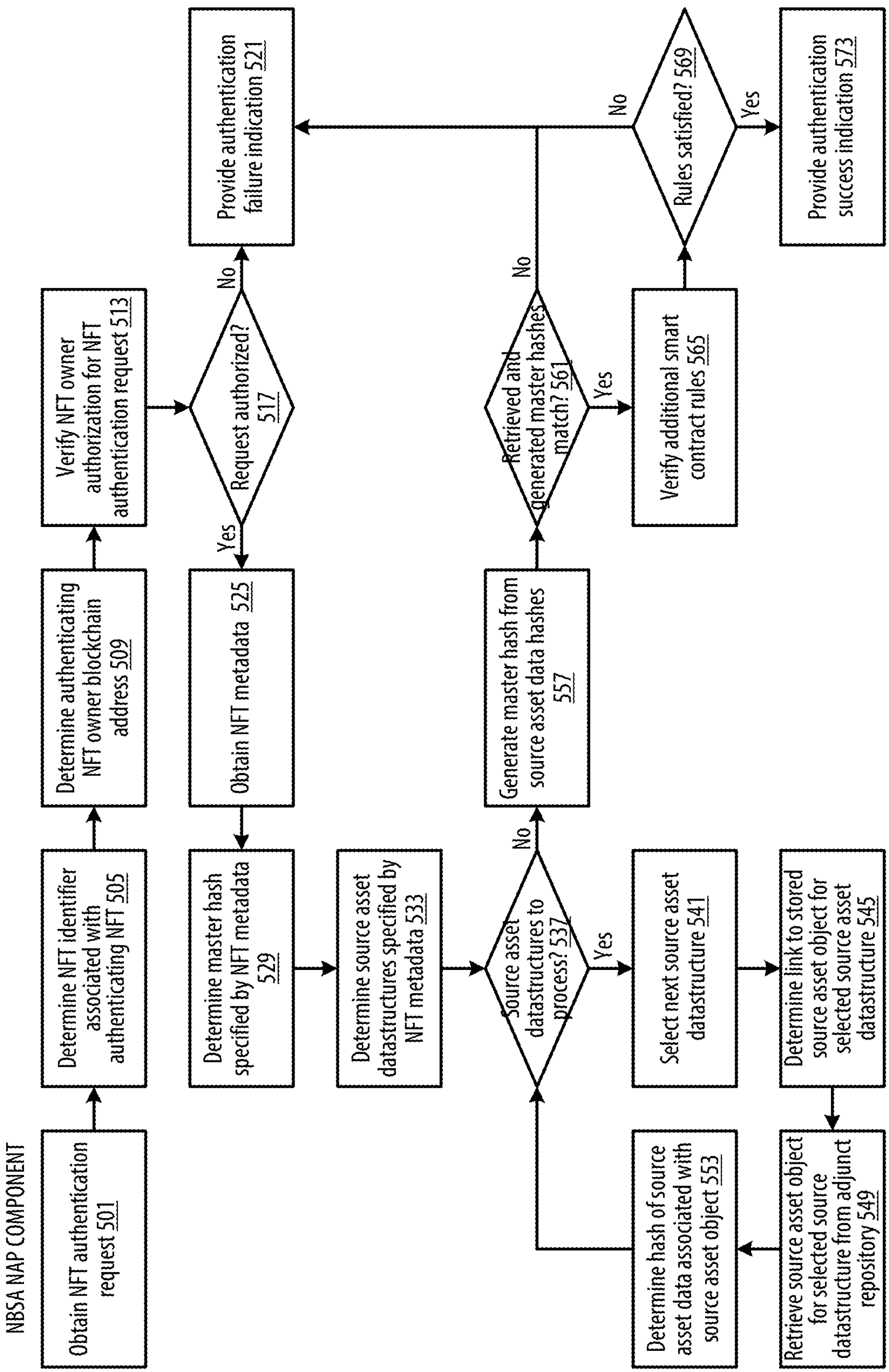
FIG. 5 shows non-limiting, example embodiments of a logic flow illustrating an NFT authentication processing (NAP) component for the NBSA.

FIG. 5 shows non-limiting, example embodiments of a logic flow illustrating an NFT authentication processing (NAP) component for the NBSA. In FIG. 5, an NFT authentication request may be obtained at 501. For example, the NFT authentication request may be obtained as a result of a request from a user (e.g., via the user's mobile device) owner of an authenticating NFT to authenticate. In another example, the NFT authentication request may be obtained as a result of a request from an authentication application and/or device (e.g., a computer login authentication application, a lock securing access to a secure location or room, a border control authentication device) to authenticate the user (e.g., upon receiving NFT authentication input from the user via a GUI, a QR code, a Bluetooth signal, an NFC signal, and/or the like).

An NFT identifier associated with the authenticating NFT may be determined at 505. In one implementation, the NFT authentication request may be parsed (e.g., using PHP commands) to determine the NFT identifier of the authenticating NFT (e.g., based on the value of the NFT_ID field).

An owner blockchain address associated with the authenticating NFT may be determined at 509. In one embodiment, the owner blockchain address associated with the authenticating NFT may be determined via an authenticating NFT smart contract deployed on a blockchain (e.g., a new blockchain implemented via Amazon Quantum Ledger Database; an existing blockchain such as Solana, Ethereum, Polygon, and/or the like). In one implementation, a blockchain address of the authenticating NFT smart contract may be specified via a configuration setting (e.g., specific to a usage application (e.g., border access, computer authentication, smart locks)). In one implementation, a blockchain transaction may be sent to the authenticating NFT smart contract (e.g., via an NFT verification request) to determine the associated owner blockchain address. For example, the owner blockchain address may be determined via a function call to the ownerOf( . . . ) function of an ERC-721 compliant authenticating NFT smart contract.

NFT owner authorization for the NFT authentication request may be verified at 513. In one embodiment, the NFT owner authorization may be verified via authorization data proving control over (e.g., ownership of) the owner blockchain address associated with the authenticating NFT. For example, the authorization data may comprise a password to a cryptographic wallet corresponding to the owner blockchain address. In another example, the authorization data may comprise a message signed with the user's private key (e.g., via a cryptographic wallet of the user) proving ownership of the owner blockchain address. In one implementation, the NFT authentication request may be parsed (e.g., using PHP commands) to determine the authorization data (e.g., based on the value of the authorization_data field). For example, the user's password may be verified to confirm that the user controls the cryptographic wallet corresponding to the owner blockchain address associated with the authenticating NFT. In another example, the cryptographically signed message may be verified using the user's public key to confirm that the user controls the owner blockchain address associated with the authenticating NFT. In some implementations, a check may be performed to verify that the user identifier provided by the user matches a user identifier associated with the owner blockchain address associated with the authenticating NFT. For example, if the user identifier is a phone number, a check may be performed (e.g., via accounts table 2719*a*, users table 2719*b*, and/or the like) to verify that the phone number is linked to the cryptographic wallet associated with the owner blockchain address associated with the authenticating NFT.

A determination may be made at 517 whether the NFT owner authorization for the NFT authentication request was verified successfully. If the NFT owner authorization for the NFT authentication request was not verified, an authentication failure indication may be provided at 521. In one implementation, a message may be sent to the requestor with a status field indicating an authentication failure (e.g., via an NFT authentication output).

If the NFT owner authorization for the NFT authentication request was verified, NFT metadata associated with the authenticating NFT may be obtained at 525. In one embodiment, a metadata URI associated with the authenticating NFT may be obtained via the authenticating NFT smart contract. In one implementation, a blockchain transaction may be sent to the authenticating NFT smart contract (e.g., via an NFT verification request) to determine the associated metadata URI. For example, the metadata URI may be determined via a function call to the tokenURI( . . . ) function of an ERC-721 compliant authenticating NFT smart contract. In one embodiment, the metadata URI may directly specify the NFT metadata (e.g., a datastructure in JSON format). In another embodiment, the metadata URI may specify a link (e.g., an identifier of a record in a metadata repository, a URI to a JSON file in a metadata repository) to the NFT metadata (e.g., a datastructure in JSON format). In one implementation, the NFT metadata may be retrieved (e.g., via an NFT metadata retrieve request) from the metadata repository via the link. For example, the NFT metadata may be retrieved from the metadata repository via a call to Arweave API that facilitates retrieving data from the Arweave network similar to the following:

```
URL: /tx/[transaction_id]
Method: GET
Response:
{
  "id": "VvNF3aLS28MXD_o4Lv0lF9_WcxMibFOp166qDqC1Hlw",
  "last_tx": "bUfaJN-KKS1LRh_DlJv4ff1gmdbHP4io-J9x7cLY5is",
  "owner": "1Q7RfP...J2x0xc",
  "data": "3DduMPkwLkE0LjIxM9o",
  "reward": "1966476441",
  "signature": "RwBICn...Rxqi54"
}
```

In another example, the NFT metadata may be retrieved from the metadata repository via a MySQL database command similar to the following:

```
SELECT *
FROM Metadata
WHERE NFT_metadata_ID = ID_NFT_metadata_1;
```

In another embodiment, a footprint or describer of an authenticating NFT that was removed may be obtained (e.g., indicating that the authenticating NFT is no longer valid).

A master hash specified by the NFT metadata may be determined at 529. In one implementation, the NFT metadata may be parsed (e.g., using PHP commands) to determine the retrieved master hash (e.g., based on the value of the master_hash field) associated with the authenticating NFT. In an alternative embodiment, instead of retrieving the entire master hash, a plurality of authenticating NFTs may be obtained and a portion of the master hash may be retrieved from NFT metadata of each of the plurality of authenticating NFTs. For example, such portions of the master hash may operate as a multi-sig like key, such that all or m-of-n (e.g., 2 out of 3) portions of the master hash may be utilized to obtain access. In one implementation, source asset data hashes stored by the plurality of authenticating NFTs may be utilized to calculate the master hash in a similar way as discussed with regard to 557. In another implementation, portions of the master hash stored by the plurality of authenticating NFTs may be utilized to calculate the master hash (e.g., via Shamir's secret sharing).

Source asset datastructures specified by the NFT metadata may be determined at 533. In one implementation, the NFT metadata may be parsed (e.g., using PHP commands) to determine the specified source asset datastructures (e.g., based on the values of the source_asset fields) associated with the authenticating NFT.

A determination may be made at 537 whether there remain source asset datastructures to process. In one implementation, each of the specified source asset datastructures may be processed. If there remain source asset datastructures to process, the next source asset datastructure may be selected for processing at 541.

A link to a stored source asset object for the selected source asset datastructure may be determined at 545. In one embodiment, the link may be an identifier (e.g., a key) of the stored source asset object in an adjunct repository. In another embodiment, the link may be a URI to exposed data (e.g., hash, constituent data elements) of the stored source asset object in an adjunct repository. In one implementation, the selected source asset datastructure may be parsed (e.g., using PHP commands) to determine the link (e.g., based on the value of the source_asset_object_key field).

The stored source asset object for the selected source asset datastructure may be retrieved from the adjunct repository at 549. In one implementation, the stored source asset object for the selected source datastructure may be retrieved from the adjunct repository via the determined link. For example, the source asset object for the selected source asset datastructure may be retrieved from the adjunct repository via a call to Amazon S3 API that facilitates retrieving objects from a bucket similar to the following:

```
GET /S3/apig-demo-5/passport_ID_user_1 HTTP/1.1
Host: nbts.execute-api.east-1.amazonaws.com
Content-Type: application/xml
X-Amz-Date: 20161015T063759Z
Authorization: AWS4-HMAC-SHA256 Credential=access-key-
id/20161015/{region}/execute-api/aws4_request, SignedHeaders=content-
type;host;x-amz-date,
Signature=ba09b72b585acf0e578e6ad02555c00e24b420b59025bc7bb8d3f7aed1471339
Cache-Control: no-cache
Postman-Token: d60fcb59-d335-52f7-0025-5bd96928098a
```

In another example, the source asset object for the selected source asset datastructure may be retrieved from the adjunct repository via a MySQL database command similar to the following:

```
SELECT *
FROM SourceAssets
WHERE sourceAssetID = passport_ID_user_1;
```

It is to be understood that, in some implementations, specific data fields (e.g., hash, constituent data elements) of the source asset object may be retrieved from the adjunct repository (e.g., instead of the entire source asset object). In some alternative implementations, the stored source asset object for the selected source datastructure may be retrieved from a local drive, from a cold storage wallet, and/or the like.

A hash of source asset data associated with the source asset object for the selected source asset datastructure may be determined at 553. In one implementation, the hash may be retrieved as discussed with regard to 549. In another implementation, the hash may be recalculated in a similar way as discussed with regard to 321 from constituent data elements retrieved as discussed with regard to 549.

A master hash may be generated from the determined source asset data hashes at 557. In one embodiment, the master hash may be calculated by combining the determined source asset data hashes. In various implementations, the master hash may be calculated by summing the determined source asset data hashes, by using a hash function such as MD5, SHA-2, CRC32, and/or the like on a tuple comprising the determined source asset data hashes, and/or the like. For example, the master hash may be generated from the determined source asset data hashes as follows:

```
Passport hash: d056025fbea3c4700729c5b96b0ff97b
Driver's License hash: 52495652ef91223f9a103aba820a5ef9
Master hash = Passport hash + Driver's License hash
Master hash = d056025fbea3c4700729c5b96b0ff97b +
  52495652ef91223f9a103aba820a5ef9
Master hash = 1229f58b2ae34e6afa13a0073ed1a5874
```

A determination may be made at 561 whether the retrieved master hash, as discussed with regard to 529, and the generated master hash, as discussed with regard to 557, match. If the retrieved and the generated master hashes are different, an authentication failure indication may be provided at 521. In one implementation, a message may be sent to the requestor with a status field indicating an authentication failure (e.g., via an NFT authentication output).

If the retrieved and the generated master hashes are the same, any additional rules for obtaining authentication may be verified at 565. In one embodiment, a set of predefined rules (e.g., outlined and/or enforced by one or more smart contracts) may be verified. For example, one or more smart contracts administering fee limits, maximum exposure to an asset, security or sector, constitution of a portfolio, trading authorization and fiduciary compliance, access control rules (e.g., being in a certain user group (e.g., administrators, employee of a specific department), time of day restrictions on access, number of allowed accesses), and/or the like may be utilized. In one implementation, each rule in the set of predefined rules may be verified via the corresponding smart contract. It is to be understood that, in some embodiments, the rules may be structured as a directed graph with multiple branches, such that failing to satisfy a rule may transfer the rule verification process to a different branch of the directed graph (e.g., instead of resulting in an authentication failure) and/or may result in a different outcome (e.g., a different set of applications may be made available to the user upon login to a protected computer depending on the branch of the directed graph taken to authenticate the user).

A determination may be made at 569 whether the additional rules, if any exist, are satisfied. If the additional rules are not satisfied, an authentication failure indication may be provided at 521. In one implementation, a message may be sent to the requestor with a status field indicating an authentication failure (e.g., via an NFT authentication output).

If the additional rules are satisfied, an authentication success indication may be provided at 573. In one implementation, a message may be sent to the requestor with a status field indicating an authentication success (e.g., via an NFT authentication output). In one embodiment, the authentication success indication may result in an authentication token being provided to the user's mobile device. For example, the authentication token may be utilized to generate a QR code, a Bluetooth signal, an NFC signal, and/or the like. In another embodiment, the authentication success indication may result in a command to the authentication application and/or device to grant access to the user. For example, such a command may result in logging the user into a protected computer, unlocking of a smart lock, and/or the like. In some implementations, the authentication success indication may include additional data (e.g., identifying information such as the user's name, photo, and/or the like via users table 2719*b*) associated with the user.

Figure 6:
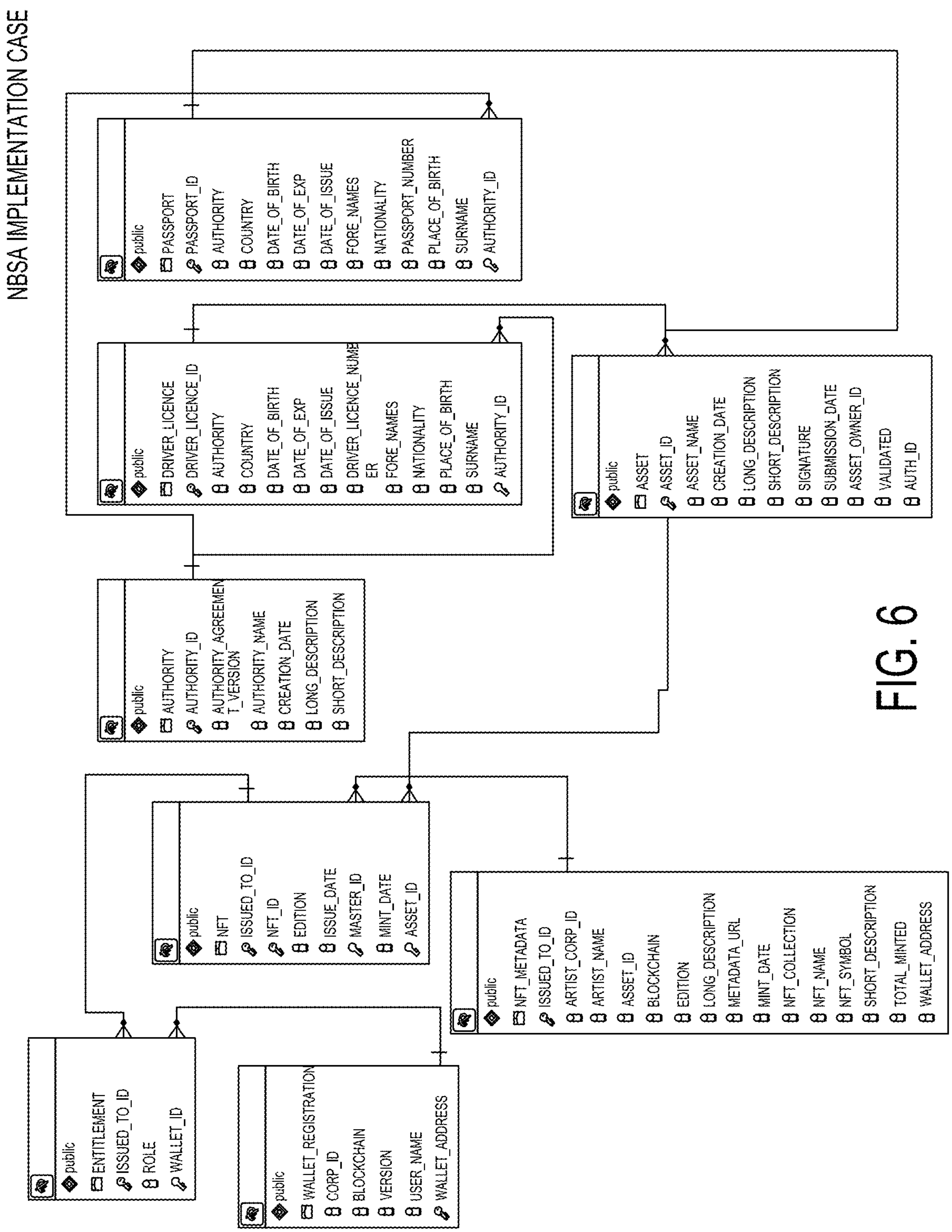
FIG. 6 shows non-limiting, example embodiments of implementation case(s) for the NBSA.

FIG. 6 shows non-limiting, example embodiments of implementation case(s) for the NBSA. In FIG. 6, an exemplary entity relationship (ER) diagram that may be utilized to facilitate NBSA operation is illustrated. In various embodiments, exemplary use cases such as the following may be implemented using database tables discussed in the ER diagram.

Employee Wishes to Register Wallet

- 0107.1. WALLET_REGISTRATION table is queried by CORP_ID to see if a wallet is already registered
- 0107.2. If user has a registered wallet, the wallet registration screen is displayed with their existing wallet address pre-filled in the registration form.
- 0107.3. If the user has more than one wallet registered the latest wallet address is displayed
- 0107.4. If the user has not registered a wallet previously, the wallet registration screen is displayed
- 0107.5. User enters a new wallet address and accepts the user agreement and submits the form, then a new record is created in the WALLET_REGISTRATION table with the following attributes
  - 0107.5.1. corp id
  - 0107.5.2. acceptance date
  - 0107.5.3. blockchain
  - 0107.5.4. disclosure version
  - 0107.5.5. wallet address Admin Wishes to Register an Asset for Minting

- 0108.1. User with appropriate access navigates to the asset upload page of NFT Mgmt. Admin
- 0108.2. User accepts the asset agreement & uploads the asset via the asset registration form
- 0108.3. The asset is stored (e.g., in a S3 bucket)
- 0108.4. A record is entered into the ASSET table with the following attributes
  - 0108.4.1. the asset id (e.g., uniquely generated)
  - 0108.4.2. asset name
  - 0108.4.3. asset description
  - 0108.4.4. asset url
  - 0108.4.5. creators CORP_ID
  - 0108.4.6. creators comments
  - 0108.4.7. submission date
  - 0108.4.8. approved status of false
  - 0108.4.9. reviewed status (e.g., false)
- 0108.5. Administrator navigates to the NFT Mgmt. Admin screen where all assets for approval are displayed including the associated data from the ASSET table.
- 0108.6. On approval or rejection, the ASSETS table is updated with the following attributes
  - 0108.6.1. reviewers a-number (e.g., identifier)
  - 0108.6.2. reviewers comment
  - 0108.6.3. review date
  - 0108.6.4. reviewed flag set to true
  - 0108.6.5. approved flag set to true or false depending on the outcome of the review
  - 0108.6.6. e-review number Admin Wishes to Mint an Asset

- 0109.1. User with appropriate access navigates to the minting page of NFT Mgmt. Admin
- 0109.2. A list of assets from the ASSET table which has
  - 0109.2.1. an approval status of true
  - 0109.2.2. a review status of true 0109.2.3. creators CORP_ID matching the current users CORP_ID 0109.3. User selects the asset (e.g., description and name are pre-filled and un-editable)

0109.4. User selects if the NFT is a master edition or edition (copy of master edition)

0109.5. Request is sent to the NFT Mgmt. API for processing.

0109.5.1. metadata file is created and stored (e.g., on Areweave)

0109.5.2. Transaction is published including to the blockchain with the following attributes 0109.5.2.1. e-review number 0109.5.2.2. recipients address 0109.5.3. Transaction is committed to the NFT-_METADATA table with the following attributes 0109.5.3.1. NFT id (e.g., unique hash of the generated NFT)

0109.5.3.2. asset id 0109.5.3.3. external asset URL (e.g., link to image on decentralize storage)

0109.5.3.4. metadata URL 0109.5.3.5. boolean value to indicate if the asset is a master edition 0109.5.3.6. number of available copies (if it is not a master edition)

Admin Wishes to Distribute Minted Asset to Employee 0110.1. Issuer with appropriate access navigates to the distribution page of NFT Mgmt. Admin 0110.2. A list of NFT's are presented to the issuer (e.g., with the following conditions)

0110.2.1. record is available in the NFT_METADATA table 0110.2.2. an approval status of true from the ASSET table 0110.2.3. a review status of true from the ASSET table 0110.2.4. an e-review number exists with the record in the ASSET table 0110.2.5. available copies >0

0110.3. The issuer can select from a list of a-numbers to distribute the NFT to (e.g., based on the following condition(s))

Figure 7:
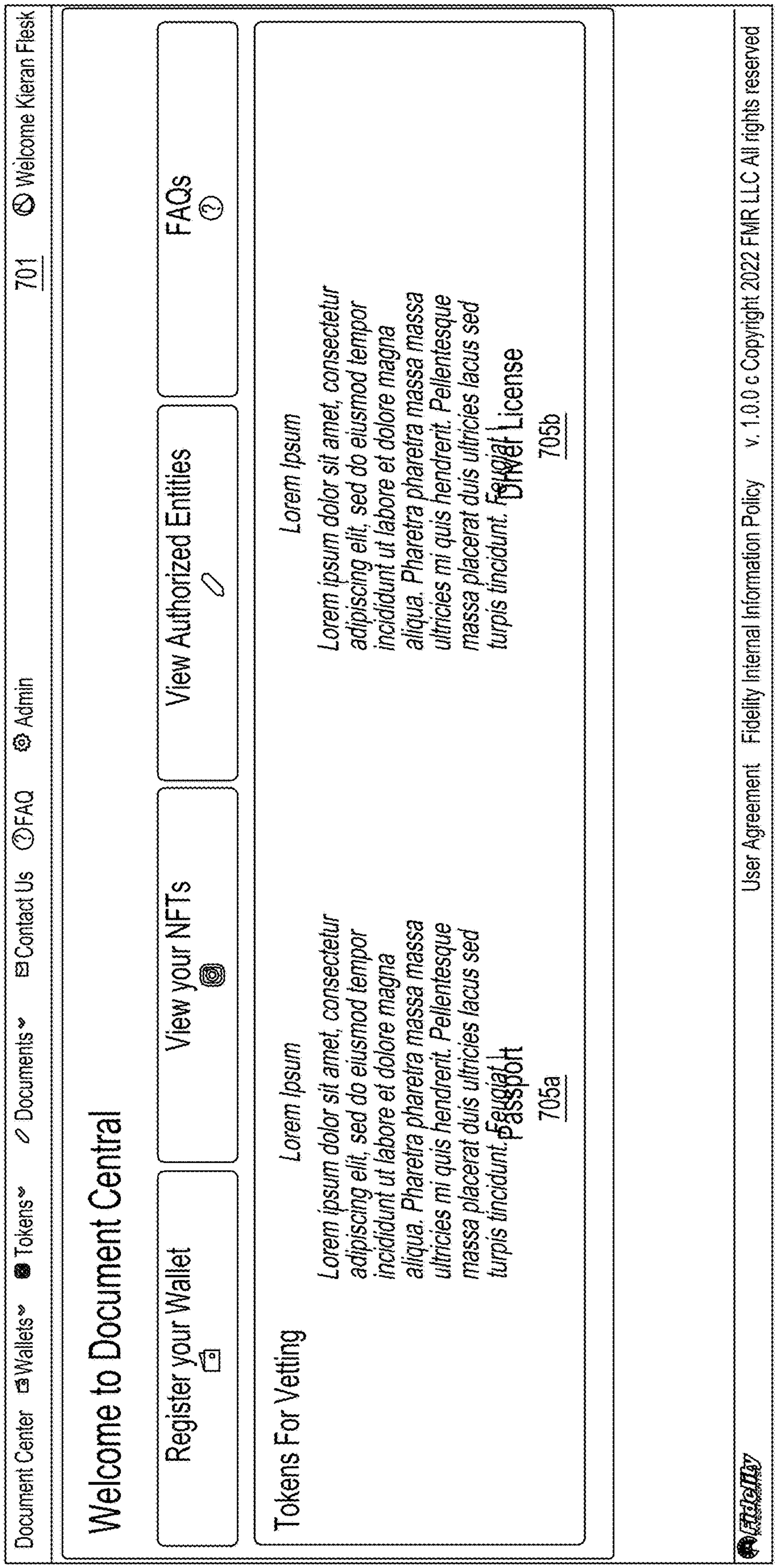
FIG. 7 shows non-limiting, example embodiments of a screenshot illustrating user interface(s) of the NBSA.

0110.3.1. wallets with a record in the WALLET_REGISTRATION table will be displayed 0110.3.2. the blockchain in the WALLET_REGISTRATION table matches the blockchain in the NFT-_METADATA table 0110.3.3. user can select users where the number of users <=the number of available copies in the NFT-_METADATA table 0110.3.4. user may not select their own corp id 0110.4. An issuer submits the request to the NFT Mgmt. API 0110.4.1. A transaction is submitted to the blockchain to move the asset from the treasury wallet to the users wallet 0110.4.2. A new record is created for each employee that received the NFT in the USER_NFT table with the following attributes 0110.4.2.1. a-number 0110.4.2.2. NFT id 0110.4.2.3. displayable flag set to true Rules on when an NFT should be Associated with the User 0111.1. A record(s) exists in the USER_NFT table associated with the corp id contained in the request 0111.2. The creator address matches the treasury wallet address 0111.3. The NFT 0111.3.1. resides in the most recent wallet that the employee registered 0111.3.2. does not have a record in the RECALLED_NFTs table 0111.3.3. has displayable flag in the USER_NFT table set to true Internal Application Wishes to Display NFT(s) Associated with an Employee 0112.1. The 3rd party app requests data from the NFT Mgmt. application (e.g., via Stratum internal gateway) by supplying the employees CORP_ID 0112.2. The NFT Mgmt. application May 0112.2.1. query the USER_NFT and/or NFT_METADATA tables to get a list of ASSET_URLs, NAME, DESCRIPTION of NFT's associated with the user 0112.2.2. Filter the list against the RECALLED_NFT table, removing any items contained in both 0112.2.3. Filter on the displayable flag in the USER_NFT table, removing any items set to false 0112.2.4. Filter on most recent wallet address Employee Wishes for NFT not to be Displayed 0113.1. Employee navigates to the gallery view 0113.2. NFT's are displayed that 0113.2.1. are associated with the users a-number in the USER_NFT table 0113.2.2. are associated with the latest wallet address for the user 0113.2.3. do not have a matching id of a record in the RECALLED NFT table 0113.3. Employee selects NFT(s) they do not wish to be displayed 0113.4. Employee sends request to the NFT Mgmt. API 0113.4.1. the displayable flag on the USER_NFT table is set to false FIG. 7 shows non-limiting, example embodiments of a screenshot illustrating user interface(s) of the NBSA. In FIG. 7, an exemplary user interface (e.g., for a mobile device, for a website) for interacting with the NBSA is illustrated. Screen 701 shows that a user may utilize the user interface to register a wallet, view the user's NFTs, approve NFTs, and/or the like. For example, a passport widget 705A and a drivers license widget 705B show NFTs associated with the user that are awaiting approval.

Figure 8:
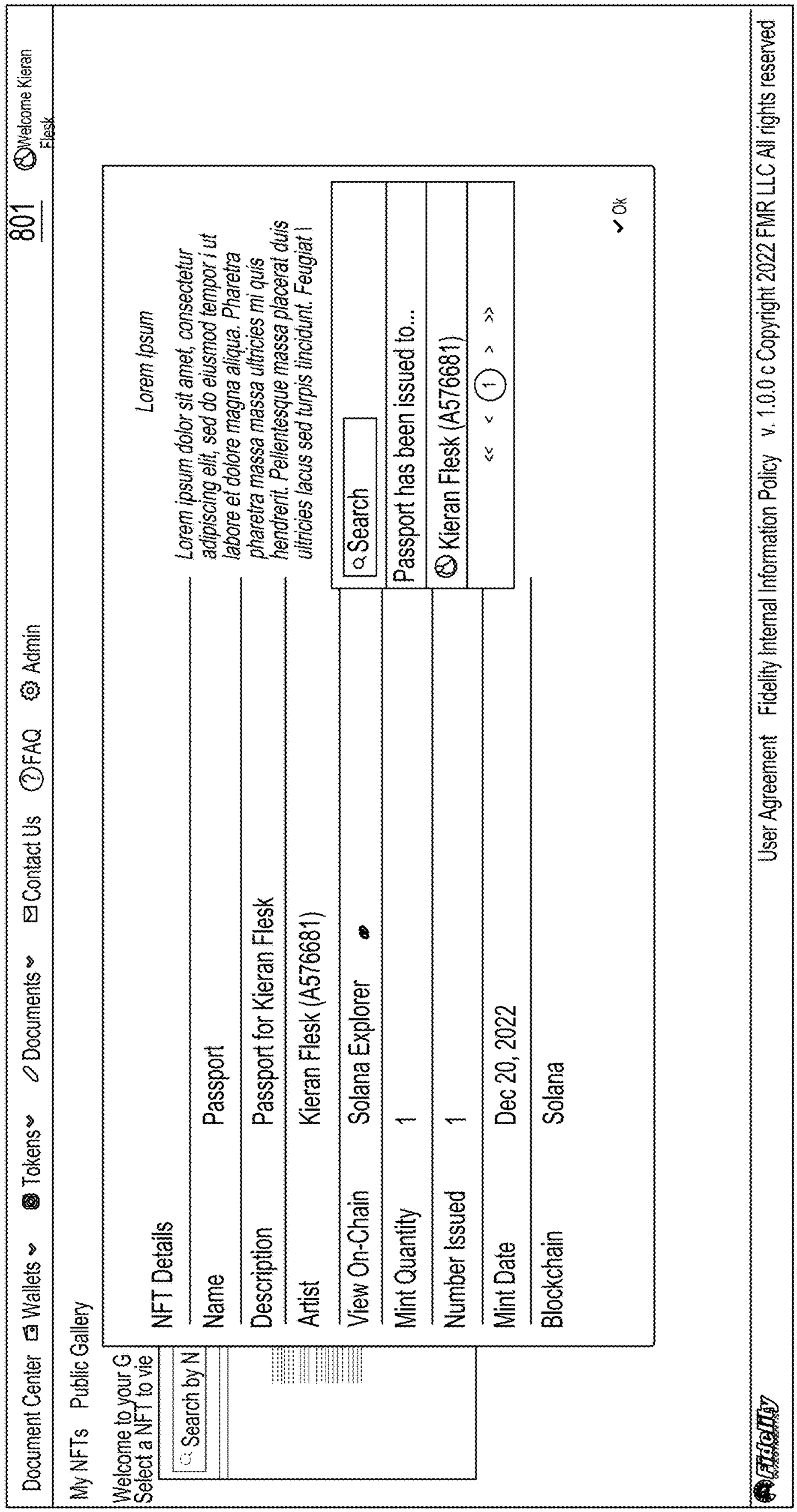
FIG. 8 shows non-limiting, example embodiments of a screenshot illustrating user interface(s) of the NBSA.

FIG. 8 shows non-limiting, example embodiments of a screenshot illustrating user interface(s) of the NBSA. In FIG. 8, an exemplary user interface (e.g., for a mobile device, for a website) for viewing information about an NFT associated with a user is illustrated. Screen 801 shows that the user may utilize an NFT details widget 805 to view data such as the NFT's name, description, artist, blockchain explorer link, mint quantity, number issued, mint date, blockchain, image, and/or the like.

Figure 9:
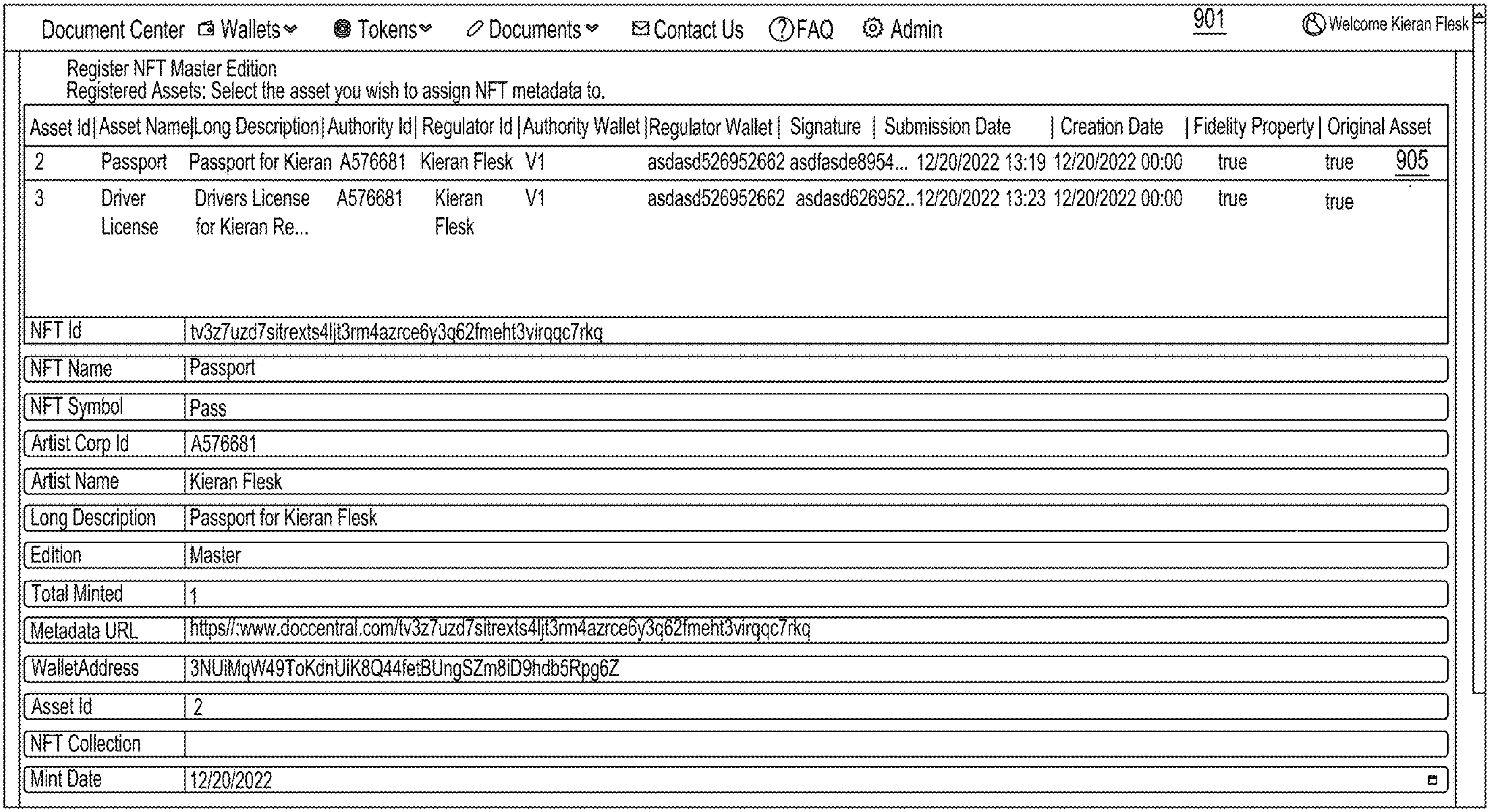
FIG. 9 shows non-limiting, example embodiments of a screenshot illustrating user interface(s) of the NBSA.

FIG. 9 shows non-limiting, example embodiments of a screenshot illustrating user interface(s) of the NBSA. In FIG. 9, an exemplary user interface (e.g., for a mobile device, for a website) for registering an NFT is illustrated. Screen 901 shows that a user may assign NFT metadata such as the NFT's id, name, symbol, artist identifier, artist name, description, edition, metadata URL, wallet address, NFT collection, and/or the like to a passport NFT 905.

Figure 10:
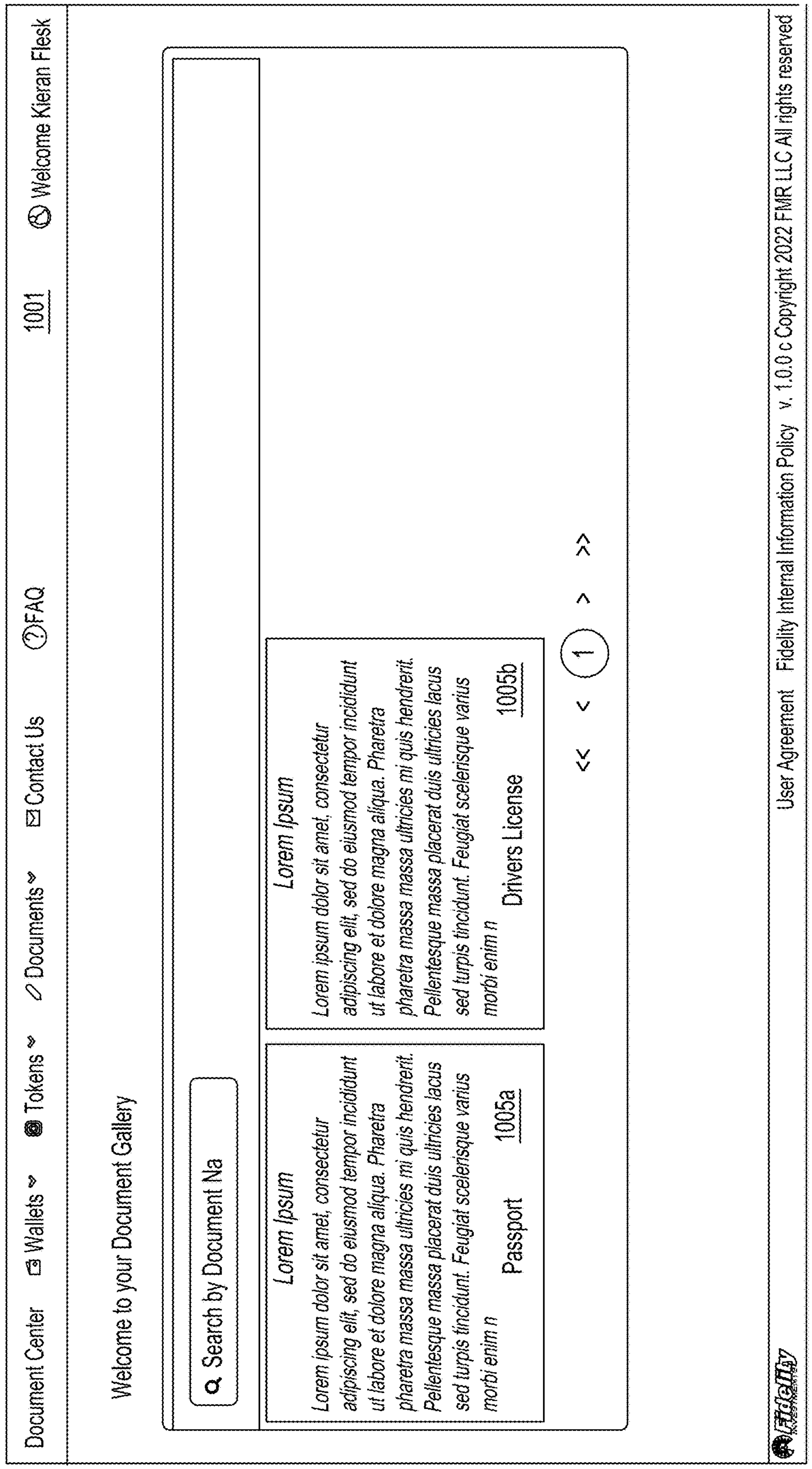
FIG. 10 shows non-limiting, example embodiments of a screenshot illustrating user interface(s) of the NBSA.

FIG. 10 shows non-limiting, example embodiments of a screenshot illustrating user interface(s) of the NBSA. In FIG. 10, an exemplary user interface (e.g., for a mobile device, for a website) for viewing information about source assets (e.g., documents) associated with a user is illustrated. Screen 1001 shows a document gallery that displays the associated source assets. For example, a passport widget 1005A and a drivers license widget 1005B may be utilized to view the respective documents (e.g., passport and driver's license) associated with the user.

Figure 11:
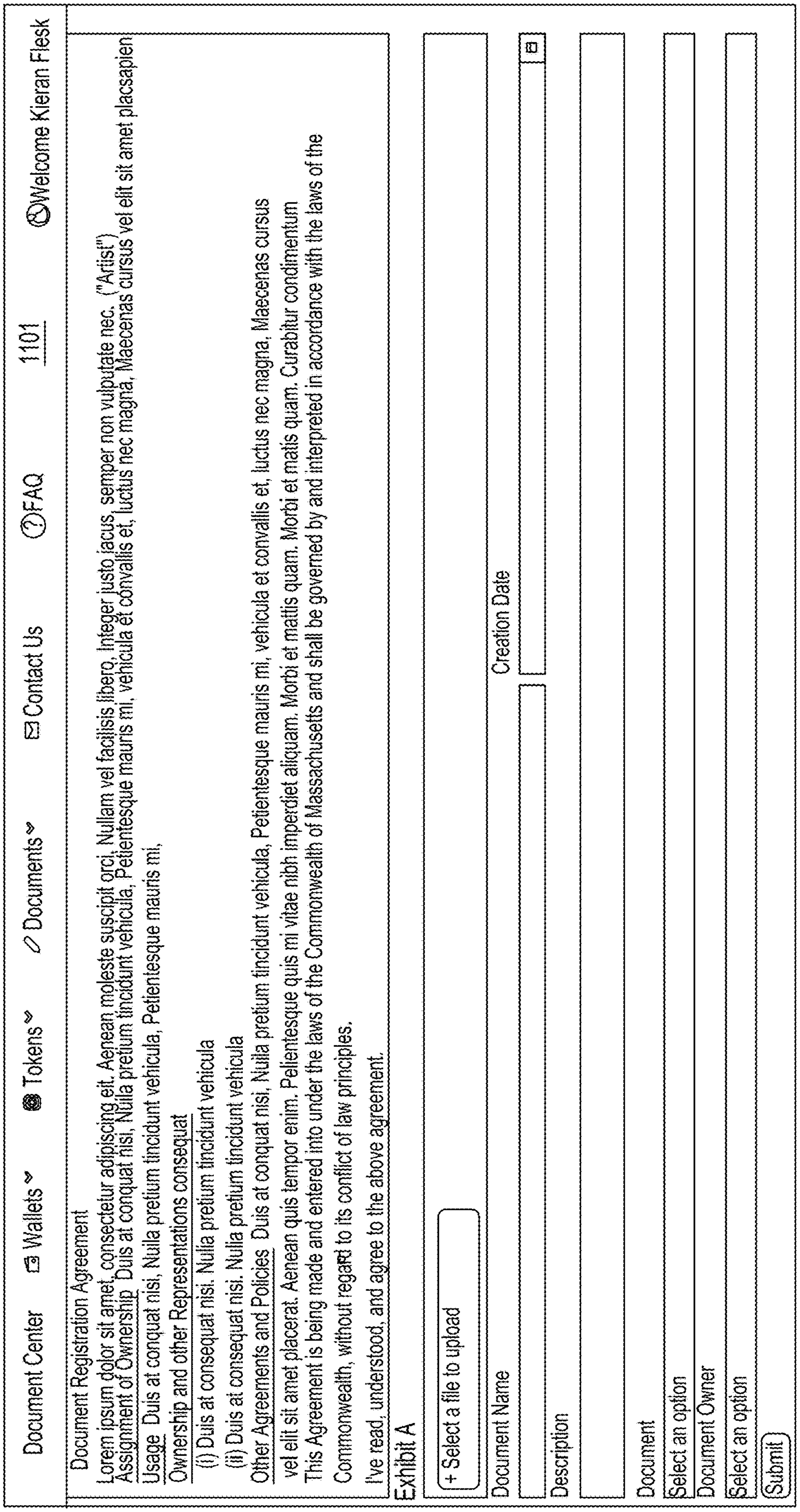
FIG. 11 shows non-limiting, example embodiments of a screenshot illustrating user interface(s) of the NBSA.

FIG. 11 shows non-limiting, example embodiments of a screenshot illustrating user interface(s) of the NBSA. In FIG. 11, an exemplary user interface (e.g., for a mobile device, for a website) for registering a source asset (e.g., a document) and/or for submitting a document for publication is illustrated. Screen 1101 shows that a user may provide data such as the document's data file, name, creation date, description, type, owner, and/or the like.

Figure 12:
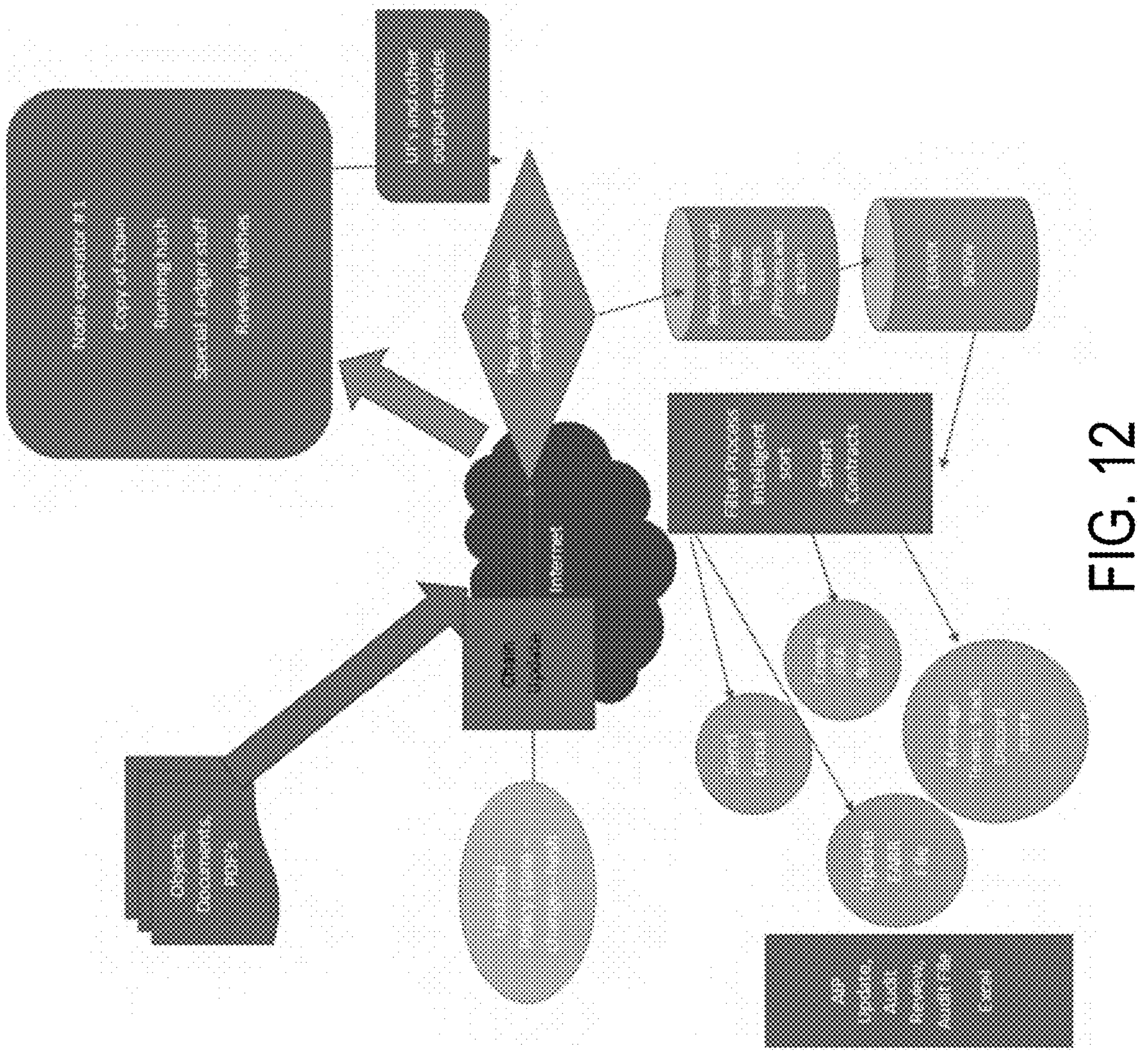
FIG. 12 shows non-limiting, example embodiments of an architecture for the NBSA.
Figure 13:
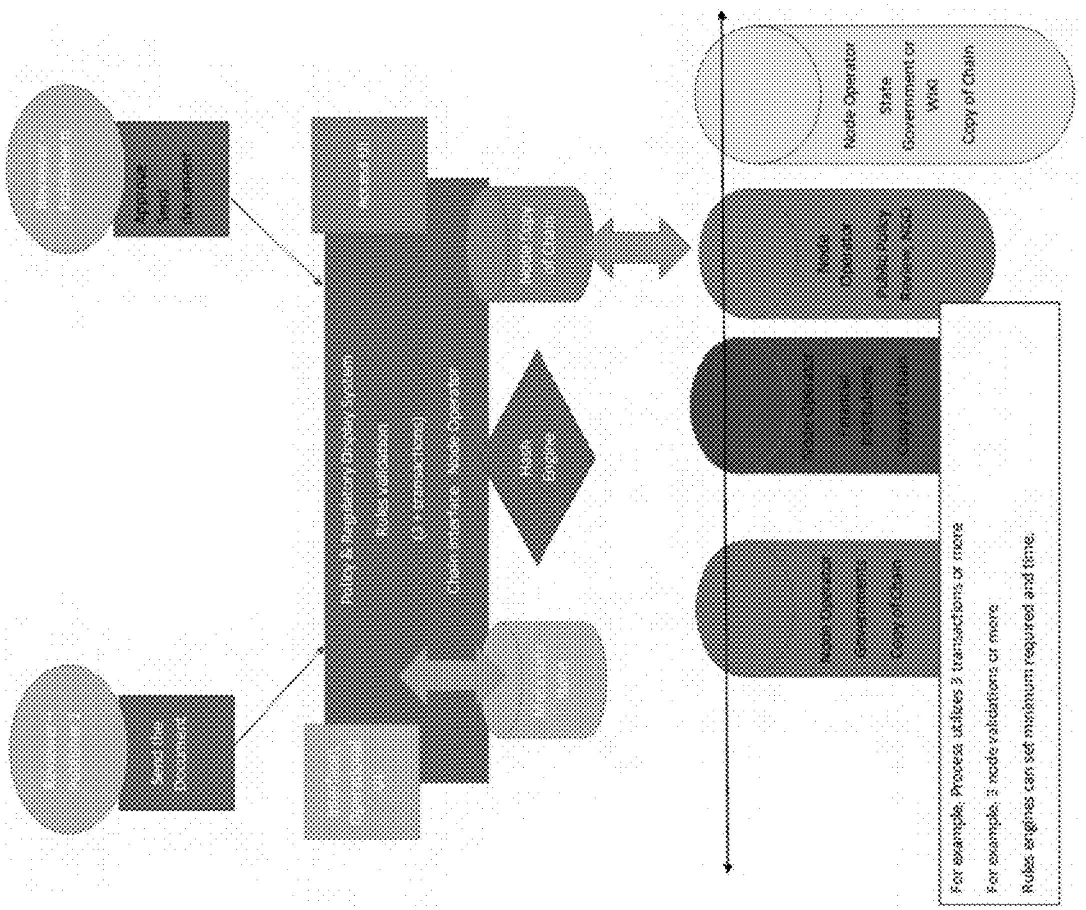
FIG. 13 shows non-limiting, example embodiments of an architecture for the NBSA.

FIGS. 12 and 13 show non-limiting, example embodiments of an architecture for the NBSA. In FIGS. 12 and 13, components of an exemplary architecture that may be utilized to facilitate NBSA operation are illustrated.

In one embodiment, the NBSA may be utilized to improve regulatory reporting systems (e.g., for the United States and other governments), corporate policy reporting systems (e.g., for internal and/or external purposes), document publishing systems, legal document handling systems, and/or the like.

Current reporting systems are often of date, contain incorrect information and can be changed without oversight, accountability, or transparency. Using a Blockchain based system (e.g., a public based chain utilizing Proof of Work, Proof of Stake, and/or the like) transparency and integrity can be enforced as well as making the systems modern with methods of communication that are appropriate for the present and future (e.g., for the next 30 years).

Using a multitransitional process on an existing chain (e.g., BTC, ETH, Solana) or a shared created chain accepted by governments, regulators, the press, and other public advocacy groups the NBSA may ensure that people around the world can have confidence in the communications, data assertions published on a site or held in a publicly accessible location.

In one implementation, the NBSA may be sized for millions of daily transactions or multiple chains may be created to service different aspects of reporting (e.g., by locality—state city, etc., by regulatory area—one for the EPA, one for the Department of Labor, etc.).

In one embodiment, filings may be placed in an IFS style database, creating a hash of each posting of object type (e.g., PDF, excel spreadsheet, NFT), using the hash as the key to the document and storing the hash (e.g., SHA-2, MD5, CRC32) on the Blockchain. The interlocking of the hash as the key to the document may be utilized to help open the document, and the version associated with it.

In one embodiment, the NBSA may be utilized to transparently assure documents have not been deleted or altered on things such as regulatory filings or financial filings for a corporation. Using the Blockchain a revision or update to the object may be stored and/or verified that it is from the prior document version as an initial source.

In one embodiment, the NBSA may be utilized to allow auditors or the press or a government watchdog to be able to transparently see what the changes were, how often they were done and ensure documents were posted or object made available by deadlines or agreed upon times. This in turn may be utilized for sophisticated reporting of the changes to these objects and files, and/or taking a PDF and converting it to an NFT and running a hash on that as well and have a double surety of the item (e.g., for exception cases or chains that have lower volumes).

In one implementation, documents may be stored off chain but connected by hashes and keys. These documents may be rolled back if needed without eliminating them by allowing the pointer to previous versions. Each document may be flagged by 1+n parties to indicate they have been verified, this flag or approval is also logged to the chain with ID of the person who approved (e.g., for accountability). Documents may be marked in multiple states (e.g., ready for review, published, removed from publication, and/or the like).

In one embodiment, policy updates may be improved using a blockchain by utilizing nodes operated within and/or across organizations to provide immutability of records and/or certainty of delivery to required parties.

In one embodiment, using the Blockchain the NBSA may push changes to all or a filtered set of users on an intelligent basis (e.g., by using a Smart Contract system).

In one embodiment, between the changed policy and the notification or push action sits a blockchain that records the dates, text changes, policy changes and/or the like (e.g., it cannot be tampered with) coupled with a Smart Contract system that guarantees actions are carried out at appropriate times to improve the reliability of information, reduce risk for regulatory and/or real actionable changes (e.g., software changes and the NBSA may be utilized to ensure polices are promulgated at the correct time).

In one implementation, notifications may be sent to Email, Slack, Teams, Discord, Open a New JIRA story, a file updated for automated changes EARR, and/or the like.

In one implementation, the NBSA may be used to serve a subpoena with certainty of authentication and/or delivery. The subpoena may be created and logged on the blockchain, then over the chain it may be delivered into a signed and/or authenticated wallet to the recipient. This wallet may be created by a governmental legal authority or 3rd parties for use in legal matters. In much the same way ongoing legal documents, matters and discovery may be delivered with certainty to a wallet that hold the objects used for discovery and legal sharing of documents.

In one implementation, using Solana, Ethereum, Polygon or other available Blockchain technologies a blockchain may be created (e.g., that has some minimum number of nodes (e.g., at least 3, more than 24)) that may be used to perform a myriad of functions such as but not limited to: verification, audit, transparency and making the popular chains available for public reporting.

In various embodiments, other aspects of the NBSA may include the following: creating NFTs, chains of chains, or hashes of hashes, publicly posting the obfuscated transaction trail (e.g., via a public ledger). Creating compound chains with multiple proofs-creating a heavy workload but enabling greater levels of certainly about the provenance of an object file or NFT.

Figure 14A:
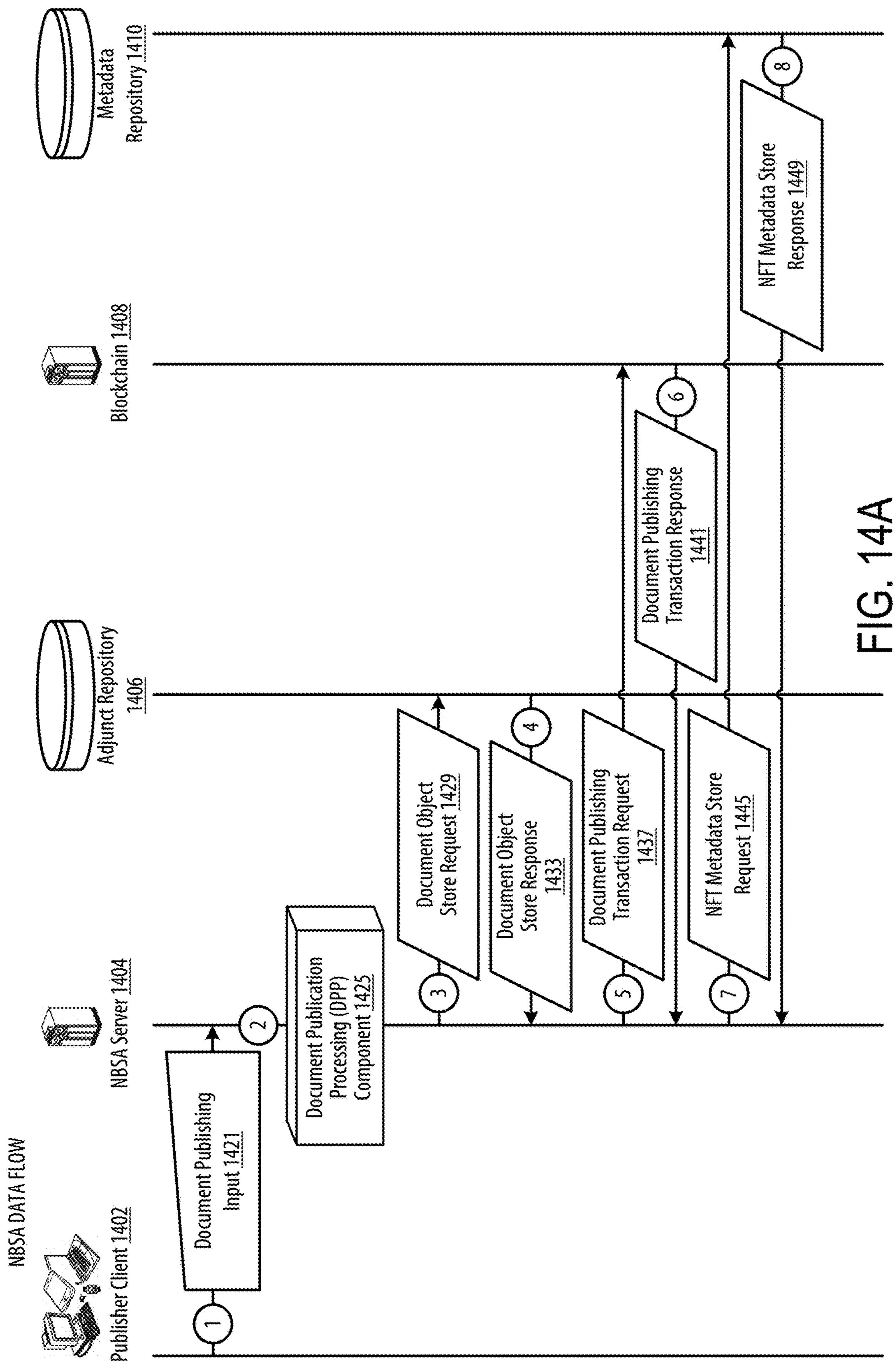
FIGS. 14A, 14B (hereinafter collectively FIG. 14) show non-limiting, example embodiments of a datagraph illustrating data flow(s) for the NBSA.
Figure 14B:
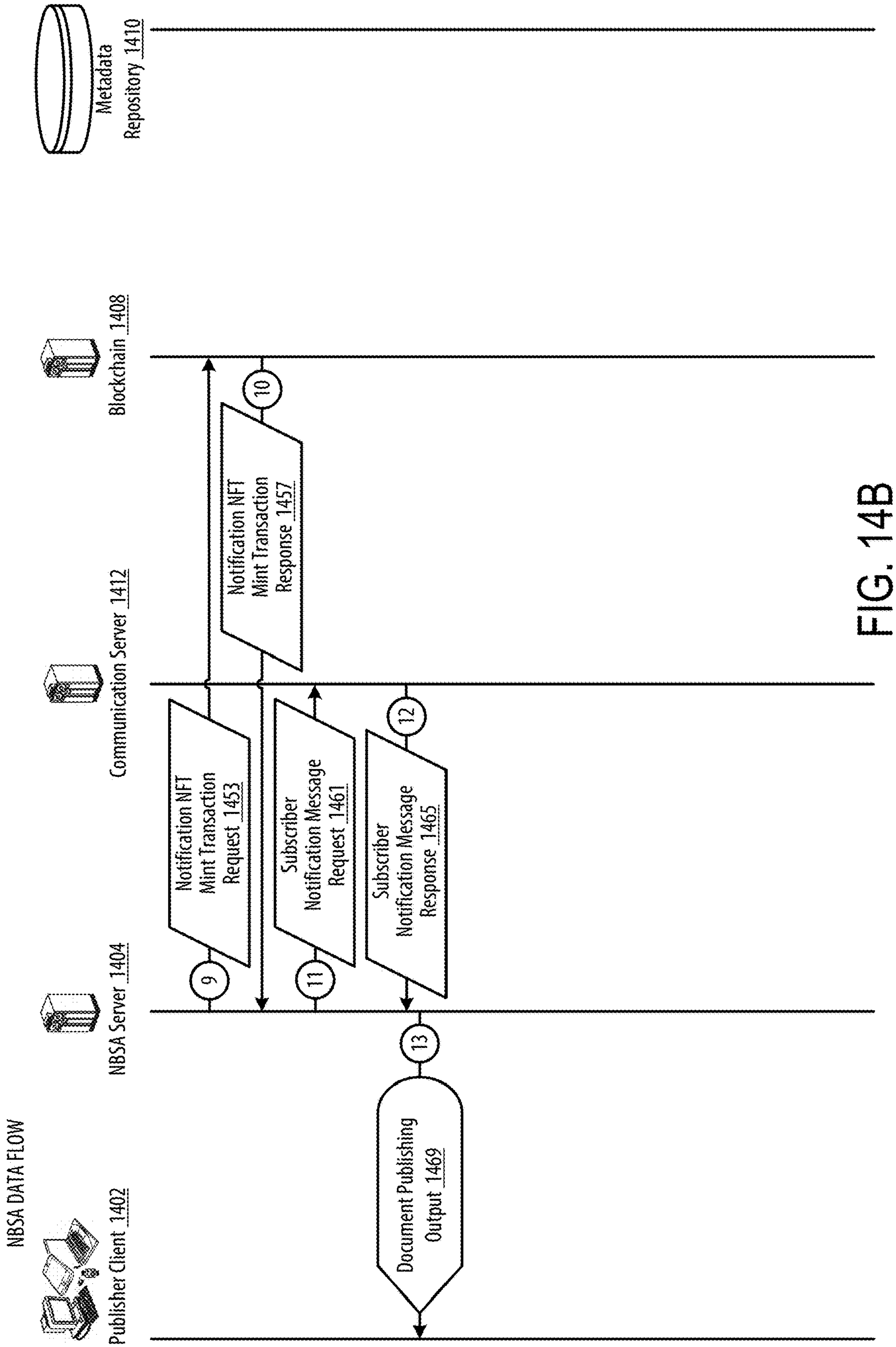

FIGS. 14A-B show non-limiting, example embodiments of a datagraph illustrating data flow(s) for the NBSA. In FIGS. 14A-B, a publisher client 1402 (e.g., of a publisher user) may send a document publishing input 1421 to an NBSA server 1404 to facilitate publishing a document and/or notifying subscribers (e.g., who wish to be notified regarding changes to the document). For example, the publisher client may be a desktop, a laptop, a tablet, a smartphone, a smartwatch, and/or the like that is executing a client application. In one implementation, the document publishing input may include data such as a request identifier, document info, publisher info, and/or the like. In one embodiment, the publisher client may provide the following example document publishing input, substantially in the form of a HTTP(S) POST message including XML-formatted data, as provided below:

```
POST /document_publishing_input.php HTTP/1.1
Host: www.server.com
Content-Type: Application/XML
Content-Length: 667
<?XML version = "1.0" encoding = "UTF-8"?>
<document_publishing_input>
  <request_identifier>ID_request_21</request_identifier>
  <document_info>
    <document_name>policy_21. pdf</document_name>
    <document_data>document contents</document_data>
    <document_version>10</document_version>
    <previous_version>9</previous_version>
    <publication_date>1/1/2024</publication_date>
    <publication_state>Published</publication_state>
  </document_info>
  <publisher_info>
    <publisher_identifier>ID_publisher_21</publisher_identifier>
    <publisher_signature>signature of the publisher</publisher_signature>
    <reviewer_user_identifier>ID_publisher_user_21</reviewer_user_identifier>
    <reviewer_signature>signature of the reviewer</reviewer_signature>
  </publisher_info>
</document_publishing_input>
```

A document publication processing (DPP) component 1425 may utilize data provided in the document publishing input to publish the document and/or to notify the subscribers. See FIG. 15 for additional details regarding the DPP component.

The NBSA server 1404 may send a document object store request 1429 to an adjunct repository 1406 (e.g., Amazon S3) to facilitate storing the document in the adjunct repository. In one implementation, the document object store request may include data such as a request identifier, document object key, document info, document hash, publisher info, and/or the like. In one embodiment, the NBSA server may provide the following example document object store request, substantially in the form of a HTTP(S) POST message including XML-formatted data, as provided below:

```
POST /document_object_store_request.php HTTP/1.1
Host: www.server.com
Content-Type: Application/XML
Content-Length: 667
<?XML version = "1.0" encoding = "UTF-8"?>
<document_object_store_request>
  <request_identifier>ID_request_22</request_identifier>
  <document_object_key>key_21 (e.g., document hash)</document_object_key>
  <document_info>
    <document_name>policy_21. pdf</document_name>
    <document_data>document contents</document_data>
    <document_version>10</document_version>
    <previous_version>9</previous_version>
    <document_changes>changes from previous version</document_changes>
    <publication_date>1/1/2024</publication_date>
    <publication_state>Published</publication_state>
  </document_info>
  <document_hash>f4af8b5789576c000ce9105b25609bd6</document_hash>
  <publisher_info>
    <publisher_identifier>ID_publisher_21</publisher_identifier>
    <publisher_signature>signature of the publisher</publisher_signature>
    <reviewer_user_identifier>ID_publisher_user_21</reviewer_user_identifier>
    <reviewer_signature>signature of the reviewer</reviewer_signature>
  </publisher_info>
</document_object_store_request>
```

The adjunct repository 1406 may send a document object store response 1433 to the NBSA server 1404 to confirm that the document was stored successfully. In one implementation, the document object store response may include data such as a response identifier, a status, and/or the like. In one embodiment, the adjunct repository may provide the following example document object store response, substantially in the form of a HTTP(S) POST message including XML-formatted data, as provided below:

```
POST /document_object_store_response.php HTTP/1.1
Host: www.server.com
Content-Type: Application/XML
Content-Length: 667
<?XML version = "1.0" encoding = "UTF-8"?>
<document_object_store_response>
  <response_identifier>ID_response_22</response_identifier>
  <status>OK</status>
</document_object_store_response>
```

The NBSA server 1404 may send a document publishing transaction request 1437 to a blockchain 1408 (e.g., a new blockchain implemented via Amazon Quantum Ledger Database; an existing blockchain such as Solana, Ethereum, Polygon, and/or the like) to facilitate storing publication information regarding the document on the blockchain. In one implementation, the document publishing transaction request may include data such as a request identifier, document publishing transaction data (e.g., including document details (e.g., a link to the stored document object, a document hash) and a transaction signature of the publisher), and/or the like. In one embodiment, the NBSA server may provide the following example document publishing transaction request, substantially in the form of a HTTP(S) POST message including XML-formatted data, as provided below:

```
POST /document_publishing_transaction_request.php HTTP/1.1
Host: www.server.com
Content-Type: Application/XML
Content-Length: 667
<?XML version = "1.0" encoding = "UTF-8"?>
<document_publishing_transaction_request>
  <request_identifier>ID_request_23</request_identifier>
  <transaction_data>
    <document_object_key>key_21 (e.g., document hash)</document_object_key>
    <document_hash>f4af8b5789576c000ce9105b25609bd6</document_hash>
    <transaction_signature>
      signature of the publisher
    </transaction_signature>
  </transaction_data>
</document_publishing_transaction_request>
```

In some alternative implementations, the document publishing transaction request may be sent to a document publishing smart contract deployed on the blockchain. For example, the document publishing smart contract may be configured to emit a document publication event in response to the document publishing transaction request. The document publication event may be utilized by a document publication notification generating smart contract to generate notification NFTs for the subscribers.

The blockchain 1408 (e.g., via the document publishing smart contract) may send a document publishing transaction response 1441 to the NBSA server 1404 to confirm that the document publishing transaction was processed. In one implementation, the document publishing transaction response may include data such as a response identifier, a status, and/or the like. In one embodiment, the blockchain may provide the following example document publishing transaction response, substantially in the form of a HTTP(S) POST message including XML-formatted data, as provided below:

```
POST /document_publishing_transaction_response.php HTTP/1.1
Host: www.server.com
Content-Type: Application/XML
Content-Length: 667
<?XML version = "1.0" encoding = "UTF-8"?>
<document_publishing_transaction_response>
  <response_identifier>ID_response_23</response_identifier>
  <status>OK</status>
</document_publishing_transaction_response>
```

The NBSA server 1404 may send an NFT metadata store request 1445 to a metadata repository 1410 (e.g., Arweave) to facilitate storing metadata for notification NFTs in the metadata repository. In one implementation, the NFT metadata store request may include data such as a request identifier, an NFT metadata identifier, NFT metadata, and/or the like. In one embodiment, the NBSA server may provide the following example NFT metadata store request, substantially in the form of a HTTP(S) POST message including XML-formatted data, as provided below:

```
POST /NFT_metadata_store_request.php HTTP/1.1
Host: www.server.com
Content-Type: Application/XML
Content-Length: 667
```

-continued

```
<?XML version = "1.0" encoding = "UTF-8"?>
<NFT_metadata_store_request>
  <request_identifier>ID_request_24</request_identifier>
  <NFT_metadata_ID>ID_NFT_metadata_21</NFT_metadata_ID>
  <NFT_metadata>
    <name>Notification NFT metadata</name>
    <description>Notification NFT for document
    subscribers</description>
    <image>URI of image for document</image>
    <properties>
      <document_info>
        <document_name>policy_21.pdf</document_name>
        <document_version>10</document_version>
        <publication_date>1/1/2024</publication_date>
        <publication_state>Published</publication_state>
      </document_info>
      <document_publishing_transaction_identifier>
        Transaction hash of the document publishing transaction
      </document_publishing_transaction_identifier>
    </properties>
  </NFT_metadata>
</NFT_metadata_store_request>
```

The metadata repository 1410 may send an NFT metadata store response 1449 to the NBSA server 1404 to confirm that the metadata for the notification NFTs was stored successfully. In one implementation, the NFT metadata store response may include data such as a response identifier, a status, and/or the like. In one embodiment, the metadata repository may provide the following example NFT metadata store response, substantially in the form of a HTTP(S) POST message including XML-formatted data, as provided below:

```
POST /NFT_metadata_store_response.php HTTP/1.1
Host: www.server.com
Content-Type: Application/XML
Content-Length: 667
<?XML version = "1.0" encoding = "UTF-8"?>
<NFT_metadata_store_response>
  <response_identifier>ID_response_24</response_identifier>
  <status>OK</status>
</NFT_metadata_store_response>
```

The NBSA server 1404 may send a notification NFT mint transaction request 1453 to a document publication notification generating smart contract deployed on the blockchain

1408 to facilitate minting a notification NFT for a subscriber (e.g., including transferring ownership of the notification NFT to the subscriber). It is to be understood that, in some embodiments, multiple transaction requests may be sent (e.g., one for each subscriber associated with the document). In one implementation, the notification NFT mint transaction request may include data such as a request identifier, transaction data (e.g., including notification NFT details and a transaction signature of the publisher), and/or the like. In one embodiment, the NBSA server may provide the following example notification NFT mint transaction request, substantially in the form of a HTTP(S) POST message including XML-formatted data, as provided below:

```
POST /notification_NFT_mint_transaction_request.php HTTP/1.1
Host: www.server.com
Content-Type: Application/XML
Content-Length: 667
<?XML version = "1.0" encoding = "UTF-8"?>
<notification_NFT_mint_transaction_request>
  <request_identifier>ID_request_25</request_identifier>
  <transaction_data>
    <NFT_details>
      <NFT_ID>
        uv3z7uzd7sitrexts4ljt3rm4azrce6y3q62fmeht3virqqc7rkr
      </NFT_ID>
      <owner_address>
        3NUiMqW49ToKdnUiK8Q44fetBUngSZm8iD9hdb5Rpg7A
      </owner_address>
      <metadata_URI>link to notification NFT
      metadata</metadata_URI>
```

-continued

```
    </NFT_details>
    <transaction_signature>
      signature of the publisher
    </transaction_signature>
  </transaction_data>
</notification_NFT_mint_transaction_request>
```

The document publication notification generating smart contract deployed on the blockchain 1408 may send a notification NFT mint transaction response 1457 to the NBSA server 1404 to confirm that the transaction was processed. In one implementation, the notification NFT mint transaction response may include data such as a response identifier, a status, and/or the like. In one embodiment, the blockchain may provide the following example notification NFT mint transaction response, substantially in the form of a HTTP(S) POST message including XML-formatted data, as provided below:

```
POST /notification_NFT_mint_transaction_response.php HTTP/1.1
Host: www.server.com
Content-Type: Application/XML
Content-Length: 667
<?XML version = "1.0" encoding = "UTF-8"?>
<notification_NFT_mint_transaction_response>
  <response_identifier>ID_response_25</response_identifier>
  <status>OK</status>
</notification_NFT_mint_transaction_response>
```

The NBSA server 1404 may send a subscriber notification message request 1461 to a communication server (e.g., an SMTP mail server) 1412 to facilitate sending a subscriber notification message to a subscriber. It is to be understood that, in some embodiments, multiple subscriber notification messages may be sent (e.g., one for each communication method specified for each subscriber associated with the document). In one implementation, the subscriber notification message request may include data such as a request identifier, a subscriber identifier, communication method details, document info, a notification NFT identifier, a document object link, and/or the like. In one embodiment, the NBSA server may provide the following example subscriber notification message request, substantially in the form of a HTTP(S) POST message including XML-formatted data, as provided below:

```
POST /subscriber_notification_message_request.php HTTP/1.1
Host: www.server.com
Content-Type: Application/XML
Content-Length: 667
<?XML version = "1.0" encoding = "UTF-8"?>
<subscriber_notification_message_request>
  <request_identifier>ID_request_26</request_identifier>
  <subscriber_identifier>subscriber name</subscriber_identifier>
  <communication_method_details>email address</communication_method_details>
  <document_info>
    <document_name>policy_21.pdf</document_name>
    <document_version>10</document_version>
    <publication_date>1/1/2024</publication_date>
    <publication_state>Published</publication_state>
  </document_info>
  <NFT_ID>
    uv3z7uzd7sitrexts4ljt3rm4azrce6y3q62fmeht3virqqc7rkr
  </NFT_ID>
</subscriber_notification_message_request>
```

The communication server 1412 may send a subscriber notification message response 1465 to the NBSA server 1404 to confirm that the subscriber notification message was sent to the subscriber. In one implementation, the subscriber notification message response may include data such as a response identifier, a status, and/or the like. In one embodiment, the communication server may provide the following example subscriber notification message response, substantially in the form of a HTTP(S) POST message including XML-formatted data, as provided below:

```
POST /subscriber_notification_message_response.php HTTP/1.1
Host: www.server.com
Content-Type: Application/XML
Content-Length: 667
<?XML version = "1.0" encoding = "UTF-8"?>
<subscriber_notification_message_response>
```

-continued

```
<response__identifier>ID__response__26</response__identifier>
<status>OK</status>
</subscriber__notification__message__response>
```

The NBSA server 1404 may send a document publishing output 1469 to the publisher client 1402 to inform the publisher whether document publication was successful. In one implementation, the document publishing output may include data such as a response identifier, a status, and/or the like. In one embodiment, the NBSA server may provide the following example document publishing output, substantially in the form of a HTTP(S) POST message including XML-formatted data, as provided below:

```
POST /document__publishing__output.php HTTP/1.1
Host: www.server.com
Content-Type: Application/XML
Content-Length: 667
<?XML version = "1.0" encoding = "UTF-8"?>
<document__publishing__output>
  <response__identifier>ID__response__21</response__identifier>
  <status>OK</status>
</document__publishing__output>
```

Figure 15:
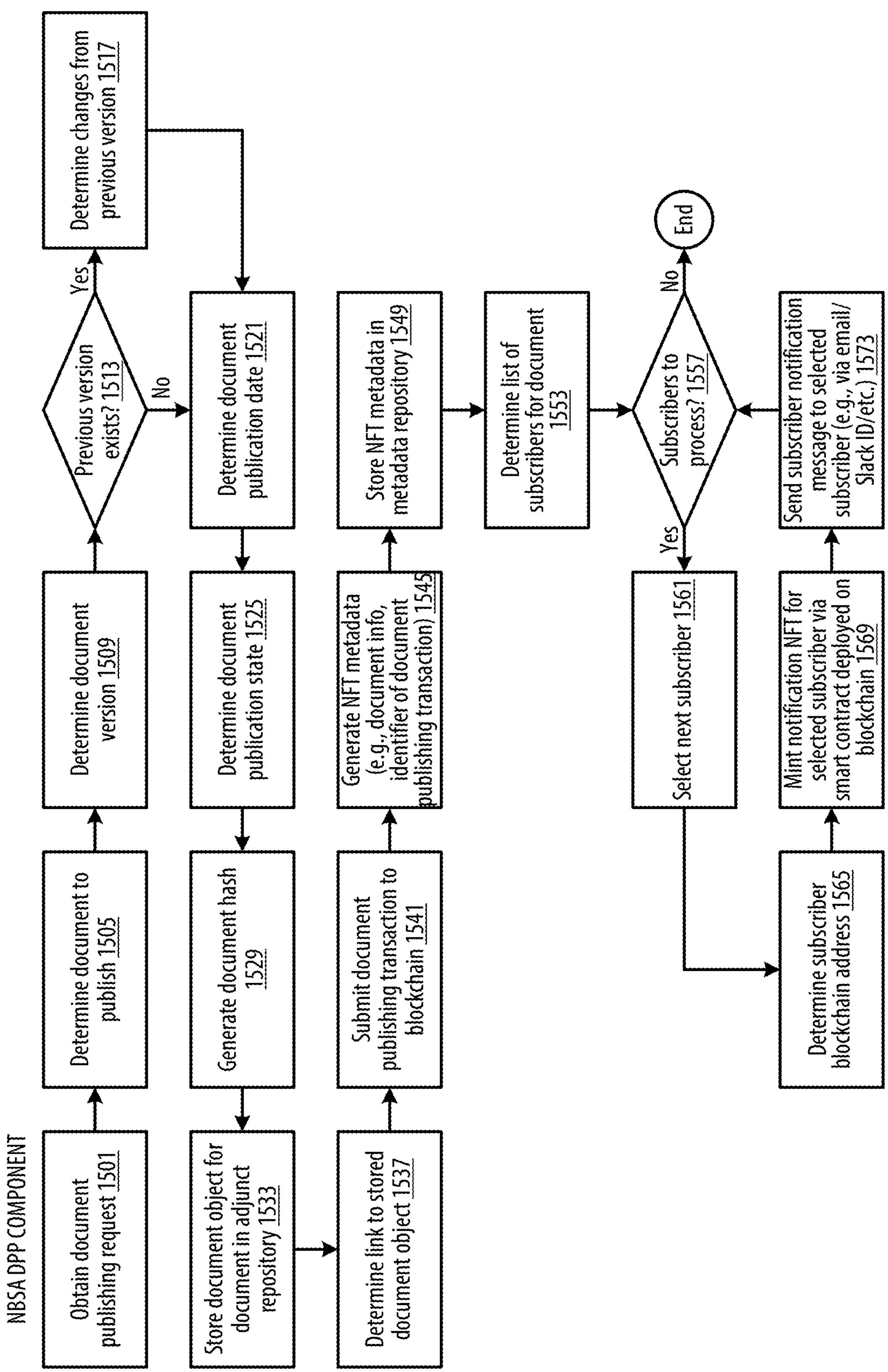
FIG. 15 shows non-limiting, example embodiments of a logic flow illustrating a document publication processing (DPP) component for the NBSA.

FIG. 15 shows non-limiting, example embodiments of a logic flow illustrating a document publication processing (DPP) component for the NBSA. In FIG. 15, a document publishing request may be obtained at 1501. For example, the document publishing request may be obtained as a result of an input request from a user associated with a publisher to publish a document and/or notify subscribers (e.g., who wish to be notified regarding changes to the document). See FIG. 11 for an example of a user interface that may be utilized by the publisher user to provide document info (e.g., document name, document contents, document description, document type, document version, document previous version, document creation date, document publication date, document owner, document reviewer, document publication state) associated with a document to publish. It is to be understood that a publisher may include any entity that creates, modifies, reviews, audits, and/or the like documents. It is to be understood that a document may include any type of a record or file such as a text file, a markup language file (e.g., HTML, XML), a data interchange file (e.g., JSON), a binary file (e.g., a document file, an image file, an audio file, a video file, a spreadsheet file, a presentation file, a database file), a database record, and/or the like.

A document to publish may be determined at 1505. In one embodiment, the name and/or contents of the document may be determined. In one implementation, the document publishing request may be parsed (e.g., using PHP commands) to determine the document to publish (e.g., based on the values of the document_name and/or document_data fields). In another embodiment, information regarding the publisher and/or the publisher user associated with the document may also be determined. In one implementation, the document publishing request may be parsed (e.g., using PHP commands) to determine the publisher info (e.g., based on the value of the publisher_info field). In an alternative embodiment, a plurality of documents to publish may be specified by the user. Accordingly, document info for the plurality of documents to publish may be processed as discussed below, and NFT metadata generated as discussed below may be structured to describe properties of the plurality of documents to publish.

A document version associated with the document may be determined at 1509. In one embodiment, making changes (e.g., by the publisher) to an existing document may result in creation of a new version of the document. In one implementation, the document publishing request may be parsed (e.g., using PHP commands) to determine the document version (e.g., based on the value of the document_version field).

A determination may be made at 1513 whether a previous version of the document exists. In one embodiment, a newly created document may not have a previous version, while an updated document may have a previous version. In one implementation, the document publishing request may be parsed (e.g., using PHP commands) to determine the previous version of the document (e.g., based on the value of the previous_version field). In other implementations, the previous version of the document may be determined based on existing versions of the document (e.g., the highest version of the document published so far), based on a calculation (e.g., the document version's preceding alphanumeric value), and/or the like.

If a previous version of the document exists, changes from the previous version may be determined at 1517. In one embodiment, each document version may be implemented (e.g., stored) as a distinct object to facilitate comparisons between document versions, auditing changes, rolling back to a previous version, and/or the like. In one implementation, a document comparison (e.g., a redline comparison) may be performed between the current document version and the previous document version to generate a list of changes, a comparison document (e.g., a redline document), and/or the like.

A document publication date associated with the document may be determined at 1521. In various embodiments, the document publication date may be the current date, some date in the future when the document is scheduled to be published, and/or the like. In one implementation, the document publishing request may be parsed (e.g., using PHP commands) to determine the document publication date (e.g., based on the value of the publication_date field).

A document publication state may be determined at 1525. In one embodiment, the document publication state may indicate the document's status with regard to the publication process. For example, the document publication state may be: ready for review, published, audited, removed from publication, and/or the like. In one implementation, the document publishing request may be parsed (e.g., using PHP commands) to determine the document publication state (e.g., based on the value of the publication_state field).

A document hash associated with the document may be generated at 1529. In one embodiment, the hash associated with the document may be generated using a hash function such as MD5, SHA-2, CRC32, and/or the like. In one implementation, document info associated with the document (e.g., a tuple of constituent data elements such as {document name, document contents, document version, document previous version, document changes, document publication date, document publication state}) may be hashed using the hash function to generate the hash associated with the document. For example, the document hash may be f4af8b5789576c000ce9105b25609bd6.

A document object for the document may be stored in an adjunct repository at 1533. In various embodiments, the adjunct repository may be Amazon S3 object store, MySQL database, IPFS, directly on the blockchain, and/or the like. In one implementation, the document object may store data such as an identifier (e.g., a key), document info, document hash, publisher info, and/or the like. For example, the document object may be stored in the adjunct repository via a call to Amazon S3 API that facilitates storing objects in a bucket similar to the following (e.g., in this example Amazon S3 provides versioning which facilitates comparison of document changes without having to store additional document changes data):

```
Host: nbts.s3.amazonaws.com
User-Agent: browser_data
Accept: file_types
Accept-Language: Regions
Accept-Encoding: encoding
Accept-Charset: character_set
Keep-Alive: 300
Connection: keep-alive
Content-Type: multipart/form-data; boundary=9431149156168
Content-Length: length
Content-Disposition: form-data; name="key"
Content-Disposition: form-data; name="tagging"
<Tagging>
  <TagSet>
    <Tag>
      <Key>documentID</Key>
      <Value>key_21</Value>
      <Key>documentName</Key>
      <Value>policy_21.pdf</Value>
      <Key>documentVersion</Key>
      <Value>10</Value>
      <Key>documentPreviousVersion</Key>
      <Value>9</Value>
      <Key>documentPublicationDate</Key>
      <Value>1/1/2024</Value>
      <Key>documentPublicationState</Key>
      <Value>Published</Value>
      <Key>documentPublisherID</Key>
      <Value>ID_publisher_21</Value>
      <Key>documentReviewerID</Key>
      <Value>signature of the  publisher</Value>
      <Key>documentReviewerSignature</Key>
      <Value>ID_publisher_user_21</Value>
      <Key>documentHash</Key>
      <Value>f4af8b5789576c000ce9105b25609bd6</Value>
    </Tag>
  </TagSet>
</Tagging>
signature=9431149156168
Content-Disposition: form-data; name="file"; filename="policy_21.pdf"
Content-Type: pdf
```

In another example, the document object may be stored in the adjunct repository via a MySQL database command similar to the following:

```
INSERT INTO Documents (documentID, documentName, documentContents,
  documentVersion, documentPreviousVersion, documentChanges,
  documentPublicationDate, documentPublicationState, documentPublisherID,
  documentPublisherSignature, documentReviewerID, documentReviewerSignature,
  documentHash)
VALUES (key_21, "policy_21.pdf", document contents, "10', "9", document
  changes, "1/1/2024", "Published", ID_publisher_21, signature of the
  publisher, ID_publisher_user_21, signature of the reviewer,
  f4af8b5789576c000ce9105b25609bd6);
```

In some implementations, the document hash may be utilized as the identifier (e.g., the document object key) to facilitate efficient document info retrieval.

A link to the stored document object may be determined at 1537. In one embodiment, the link may be structured to allow determination of the document hash associated with the document and/or to allow access to document contents. For example, the link may be utilized to expose (e.g., to authorized users) the stored document hash and/or the document info. In another example, the link may be utilized to expose (e.g., to authorized users) the stored constituent data elements that may be utilized to recalculate the document hash and/or the document info. In one implementation, the link may be the identifier (e.g., the key) of the stored document object in the adjunct repository. In another implementation, the link may be a URI to the exposed data (e.g., the stored document hash, the stored constituent data elements, the stored document info) in the adjunct repository (e.g., https://s3/nbts/f4af8b5789576c000ce9105b25609bd6).

A document publishing transaction may be submitted to a blockchain (e.g., a new blockchain implemented via Amazon Quantum Ledger Database; an existing blockchain such as Solana, Ethereum, Polygon, and/or the like) to facilitate storing information regarding the document on the blockchain at 1541. In one implementation, the document publishing transaction may be sent to the blockchain via a document publishing transaction request. In some alternative implementations, the document publishing transaction may be sent to a document publishing smart contract deployed on the blockchain to facilitate handling of the document. For example, the document publishing smart contract may be configured to emit document publication events (e.g., events to track the sending and/or receiving of the document). The document publication events may be utilized by a document publication notification generating smart contract to generate notification NFTs for the subscribers. In one implementation, a blockchain address of the document publishing smart contract may be specified via a configuration setting. For example, a document publishing smart contract structured similar to the following may be utilized:

Smart Contract

```
pragma solidity ^0.6.0;
contract DocumentExchange {
  // struct to represent a document
  struct Document {
    bytes32 hash;
    uint256 timestamp;
  }
  // mapping to store the documents
  mapping(bytes32 => Document) public documents;
  // events to track the sending and receiving of documents
  event DocumentSent(bytes32 indexed hash, uint256 indexed timestamp);
  event DocumentReceived(bytes32 indexed hash, uint256 indexed timestamp);
  // function to send a document from the financial institution to the
regulators
  function sendDocument(bytes32 hash) public {
    // check if the document has already been sent
    require(!documents[hash].hash, "Document has already been sent");
    // store the document in the mapping
    documents[hash] = Document(hash, now);
    // emit the DocumentSent event
    emit DocumentSent(hash, now);
  }
  // function to receive a document by the regulators
  function receiveDocument(bytes32 hash) public {
    // check if the document has been sent
    require(documents[hash].hash, "Document has not been sent");
    // update the timestamp of the document
    documents[hash].timestamp = now;
    // emit the DocumentReceived event
    emit DocumentReceived(hash, now);
  }
}
```

Notes

This smart contract defines a struct called Document to represent a document, which consists of a hash and a timestamp. It also defines a mapping called documents to store the documents. The smart contract has two functions: sendDocument and receiveDocument. The sendDocument function is called by the financial institution to send a document to the regulators, and the receiveDocument function is called by the regulators to mark the document as received. The contract also defines two events: DocumentSent and DocumentReceived, which are emitted when a document is sent or received, respectively.

NFT metadata may be generated at 1545. In one embodiment, the NFT metadata may be structured to comprise a set of data fields that describe properties (e.g., document info, identifier of the document publishing transaction) of notification NFTs to be sent to the subscribers associated with the document. In one implementation, the NFT metadata may be in JSON format. For example, NFT metadata similar to the following may be generated:

```
{
  "name": "Notification NFT metadata",
  "description": "Notification NFT for document subscribers",
  "image": "URI of image for document",
  "properties": {
    "document_info": {
      "document_name": "policy_21.pdf",
      "document_version": "10",
```

-continued

```
      "publication_date": "1/1/2024",
      "publication_state": "Published",
      ...
    },
    "document_publishing_transaction_identifier":
      "Transaction hash of the document publishing transaction"
  }
}
```

The NFT metadata may be stored in the metadata repository at 1549. In various embodiments, the metadata repository may be Arweave network, MySQL database, IPFS, directly on the blockchain, and/or the like. For example, the NFT metadata may be stored in the metadata repository via a call to Arweave API that facilitates storing data on the Arweave network similar to the following:

```
URL: /tx
Method: POST
Payload:
{
  "last_tx": "63KntvNNxLWm3oos7HciFNa8ToRGqyikf1oF9aKTcibJ",// Base64 encoded
ID of the last transaction made by this wallet. Empty if this is the first one.
  "transaction."owner": "C6d3jyzPfCyEKY3wfwvs791sreLC1WgPpcU4ZFsuv7uA",// The
public key making this transaction.
```

-continued

"transactions."quantity": "",// Decimal string representation of the amount of sent AR in winston. Empty for data transactions.
"data":"ewoJCeKAnG1hc3Rlcl9oYXNo4oCdOiDigJwxMjI5ZjU4YjJhZTM0ZTZhZ...",// The Base64 encoded data being store in the transaction.
"reward": "0.0025",// Decimal string representation of the mining reward AR amount in winston.
"signature": "C6d3jyzPfCyEKY3wfwvs791sreLC1WgPpcU4ZFsuv7uA"// Base64 encoded signature of the transaction.
}

In another example, the NFT metadata may be stored in the metadata repository via a MySQL database command similar to the following:

```
INSERT INTO Metadata (NFT_metadata_ID, NFT_metadata_name,
  NFT_metadata_description, NFT_metadata_image, NFT_metadata_properties)
VALUES (ID_NFT_metadata_21, "Notification NFT metadata", "Notification NFT for
  document subscribers", "URI of image for document", "properties data");
```

A list of subscribers for the document may be determined at 1553. In one embodiment, subscribers (e.g., members, employees, reviewers, auditors, regulators, watchdog groups, press) may be entities (e.g., people, organizations) that wish to be notified regarding updates to the document. It is to be understood that the subscribers may include multiple entities and each entity may also comprise multiple entities (e.g., the subscribers may include 2 organizations each with 10 people for a total of 20 subscribers). In one implementation, the list of subscribers for the document may be retrieved from the subscribers database table **2719*n***. For example, the list of subscribers for the document may be determined via a MySQL database command similar to the following:

```
SELECT subscriberID
FROM Subscribers
WHERE subscribedToDocumentName = "policy_21.pdf";
```

A determination may be made at 1557 whether there remain subscribers to process. In one implementation, each of the subscribers in the list of subscribers may be processed. If there remain subscribers to process, the next subscriber may be selected for processing at 1561.

A subscriber blockchain address associated with the selected subscriber (e.g., with subscriber identifier ID_subscriber_21) may be determined at 1565. In one implementation, the subscriber blockchain address may be retrieved from the subscribers database table **2719*n***. For example, the subscriber blockchain address associated with the selected subscriber may be determined via a MySQL database command similar to the following:

```
SELECT subscriberWalletAddress
FROM Subscribers
WHERE subscriberID = ID_subscriber_21;
```

For example, the subscriber blockchain address may be a blockchain wallet address (e.g., 3NUiMqW49ToKdnUiK8Q44fetBUngSZm8iD9hdb5Rpg7A).

A notification NFT for the selected subscriber may be minted via a document publication notification generating smart contract deployed on the blockchain at 1569. In one implementation, a blockchain address of the document publication notification generating smart contract may be specified via a configuration setting. For example, a document publication notification generating smart contract structured similar to the following may be utilized:

Smart Contract

```
pragma solidity ^0.7.0;
import "https://github.com/polygon-network/polygon-sdk-solidity/contracts/libraries/SafeMath.sol";
import "https://github.com/polygon-network/polygon-sdk-solidity/contracts/interfaces/IComparable.sol";
import "https://github.com/polygon-network/polygon-sdk-solidity/contracts/interfaces/INFT.sol";
import "https://github.com/polygon-network/polygon-sdk-solidity/contracts/interfaces/IForwarder.sol";
import "https://github.com/polygon-network/polygon-sdk-solidity/contracts/interfaces/ISecured.sol";
import "https://github.com/polygon-network/polygon-sdk-solidity/contracts/interfaces/ICollection.sol";
import "https://github.com/polygon-network/polygon-sdk-solidity/contracts/interfaces/IForwarderReceiver.sol";
import "https://github.com/polygon-network/polygon-sdk-solidity/contracts/interfaces/ICollectionReceiver.sol";
import "https://github.com/polygon-network/polygon-sdk-solidity/contracts/interfaces/ICollectionRole.sol";
```

-continued

```
Smart Contract
import "https://github.com/polygon-network/polygon-sdk-solidity/contracts/interfaces/IForwarderRole.sol";
import "https://github.com/polygon-network/polygon-sdk-solidity/contracts/interfaces/ICollectionReceiverRole.sol";
import "https://github.com/polygon-network/polygon-sdk-solidity/contracts/interfaces/IForwarderReceiverRole.sol";
import "https://github.com/polygon-network/polygon-sdk-solidity/contracts/libraries/Identity.sol";
import "https://github.com/polygon-network/polygon-sdk-solidity/contracts/libraries/NFTCore.sol";
import "https://github.com/polygon-network/polygon-sdk-solidity/contracts/libraries/NFTRoles.sol";
import "https://github.com/polygon-network/polygon-sdk-solidity/contracts/libraries/NFTs.sol";
// Set up the contract to use the SafeMath library
using SafeMath for uint256;
// Define the structure of the NFT
contract MyNFT is IComparable, INFT, ISecured, ICollection, IForwarder,
ICollectionReceiver, ICollectionRole, IForwarderRole, ICollectionReceiverRole,
IForwarderReceiverRole {
  // Define variables to store the data for the NFT
  string public name;
  string public description;
  uint256 public price;
  // Define the constructor for the NFT
  constructor( ) public {
    // Set
// Other variables may include parts of metadata such as {publication
date}{artist name}{date}{mint cap}{location}{GPS coordinates}{email
address}{consortium or member id}{node address}{document type}
// Other functions may include a safeMint( ) function for minting notification
NFTs for subscribers
```

In one implementation, a blockchain transaction may be sent to the document publication notification generating smart contract (e.g., via a notification NFT mint transaction request) to mint the notification NFT for the selected subscriber. For example, the notification NFT may be minted via a call to a safeMint( . . . ) function of an ERC-721 compliant document publication notification generating smart contract (e.g., signed by the publisher). In one embodiment, minting the notification NFT may comprise associating (e.g., via an NFT identifier of the notification NFT) the NFT metadata and/or the subscriber blockchain address of the selected subscriber with the authenticating NFT. In some alternative implementations, an emitted document publication event may trigger the minting of notification NFTs for the subscribers.

A subscriber notification message for the selected subscriber may be sent at 1573. For example, one or more subscriber notification messages may be sent via communication methods such as Email, Slack, Teams, Discord, Open a New JIRA story, a file updated for automated changes EARR, and/or the like. In one embodiment, the subscriber notification message may provide document info, info regarding the notification NFT (e.g., a notification NFT identifier), a link to access the document (e.g., a document object link), and/or the like for the selected subscriber. In one implementation, subscriber notification data (e.g., email address, Slack ID, etc.) for the selected subscriber may be retrieved from the subscribers database table 2719*n*. For example, the subscriber notification data associated with the selected subscriber may be determined via a MySQL database command similar to the following:

```
SELECT subscriberNotificationData
FROM Subscribers
WHERE subscriberID = ID_subscriber_21;
```

Figure 16:
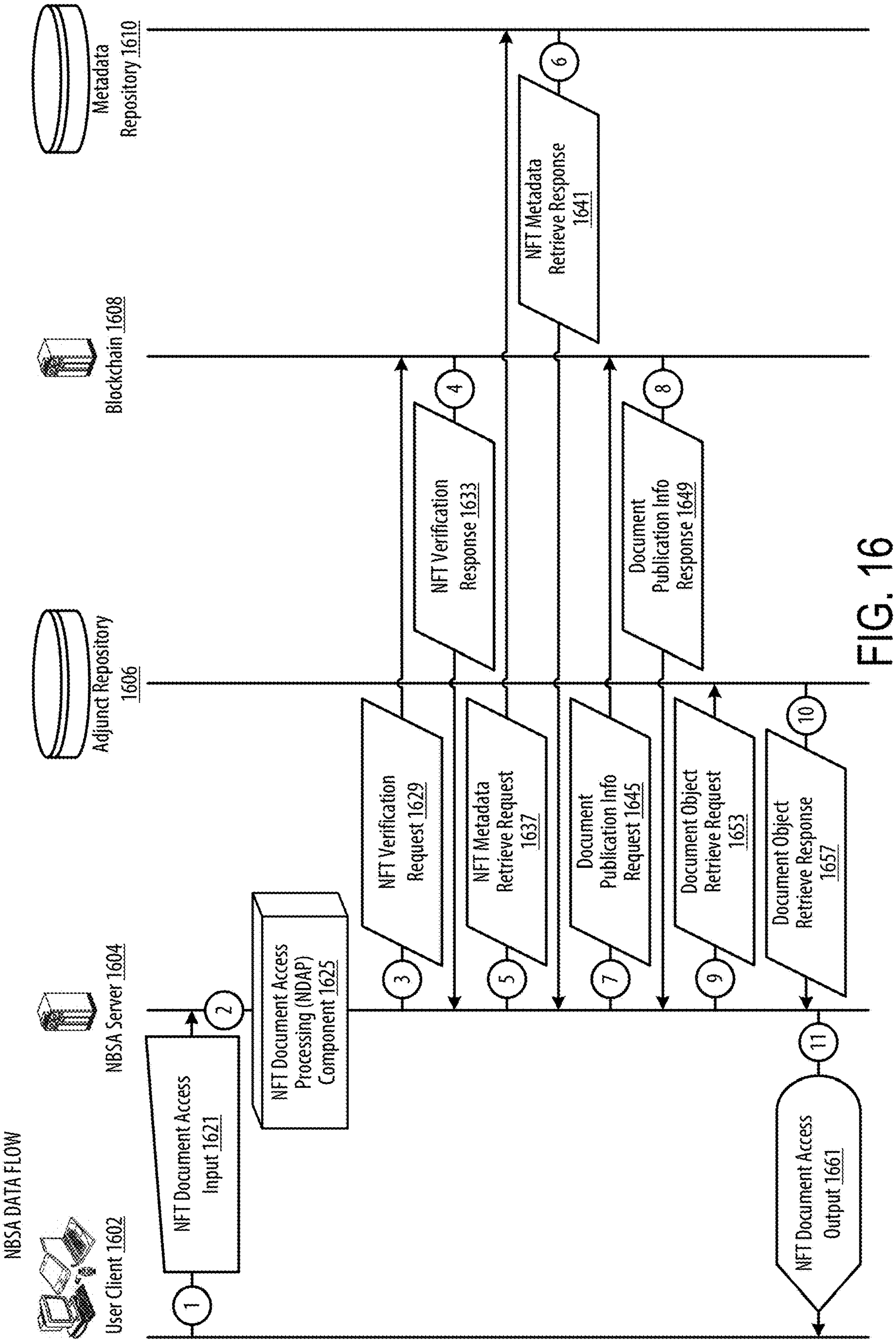
FIG. 16 shows non-limiting, example embodiments of a datagraph illustrating data flow(s) for the NBSA.

FIG. 16 shows non-limiting, example embodiments of a datagraph illustrating data flow(s) for the NBSA. In FIG. 16, a user client 1602 (e.g., of a subscriber user) may send an NFT document access input 1621 to an NBSA server 1604 to facilitate accessing a document via a notification NFT. For example, the user client may be a desktop, a laptop, a tablet, a smartphone, a smartwatch, and/or the like that is executing a client application. In one implementation, the NFT document access input may include data such as a request identifier, a request type, a user identifier, an NFT identifier, authorization data (e.g., a password allowing access to a cryptocurrency wallet, a cryptographic signature proving ownership of a blockchain address, an authenticating NFT), and/or the like. In one embodiment, the user client may provide the following example NFT document access input, substantially in the form of a HTTP(S) POST message including XML-formatted data, as provided below:

```
POST /NFT_document_access_input.php HTTP/1.1
Host: www.server.com
Content-Type: Application/XML
Content-Length: 667
<?XML version = "1.0" encoding = "UTF-8"?>
<NFT_document_access_input>
  <request_identifier>ID_request_31</request_identifier>
  <request_type>ACCESS_DOCUMENT</request_type>
  <user_identifier>ID_subscriber_21</user_identifier>
  <NFT_ID>
    uv3z7uzd7sitrexts4ljt3rm4azrce6y3q62fmeht3virqqc7rkr
  </NFT_ID>
```

-continued

```
  <authorization_data>
    cryptographic signature valid for owner address associated with the
    notification NFT (e.g., a signed message generated by a wallet)
  </authorization_data>
</NFT_document_access_input>
```

An NFT document access processing (NDAP) component 1625 may utilize data provided in the NFT document access input to provide access to the document for the user. See FIG. 17 for additional details regarding the NDAP component.

The NBSA server 1604 may send an NFT verification request 1629 to a document publication notification generating smart contract deployed on a blockchain 1608 (e.g., a new blockchain implemented via Amazon Quantum Ledger Database; an existing blockchain such as Solana, Ethereum, Polygon, and/or the like) to facilitate verifying that the user authorized the request to access the document via the notification NFT. For example, the NFT verification request may be utilized to determine an owner blockchain address (e.g., a wallet address) and/or metadata (e.g., a metadata datastructure stored on the blockchain, a URI link to metadata stored off-chain) associated with the notification NFT. It is to be understood that, in some embodiments, multiple NFT verification requests may be sent (e.g., one to obtain the owner blockchain address and another to obtain the metadata). In one implementation, the NFT verification request may include data such as a request identifier, a smart contract address, function call details, and/or the like. In one embodiment, the NBSA server may provide the following example NFT verification request, substantially in the form of a HTTP(S) POST message including XML-formatted data, as provided below:

```
POST /NFT_verification_request.php HTTP/1.1
Host: www.server.com
Content-Type: Application/XML
Content-Length: 667
<?XML version = "1.0" encoding = "UTF-8"?>
<NFT_verification_request>
  <request_identifier>ID_request_32</request_identifier>
  <smart_contract_address>
    address of the document publication notification generating
    smart contract
  </smart_contract_address>
  <function_call_details>
    <function_name>ownerOf</function_name>
    <NFT_ID>
      uv3z7uzd7sitrexts4ljt3rm4azrce6y3q62fmeht3virqqc7rkr
    </NFT_ID>
  </function_call_details>
  <function_call_details>
    <function_name>tokenURI</function_name>
    <NFT_ID>
      uv3z7uzd7sitrexts4ljt3rm4azrce6y3q62fmeht3virqqc7rkr
    </NFT_ID>
  </function_call_details>
</NFT_verification_request>
```

The document publication notification generating smart contract deployed on the blockchain 1608 may send an NFT verification response 1633 to the NBSA server 1604 with the requested notification NFT data. In one implementation, the NFT verification response may include data such as a response identifier, the requested notification NFT data, and/or the like. In one embodiment, the document publication notification generating smart contract deployed on the blockchain may provide the following example NFT verification response, substantially in the form of a HTTP(S) POST message including XML-formatted data, as provided below:

```
POST /NFT_verification_response.php HTTP/1.1
Host: www.server.com
Content-Type: Application/XML
Content-Length: 667
<?XML version = "1.0" encoding = "UTF-8"?>
<NFT_verification_response>
  <response_identifier>ID_response_32</response_identifier>
  <owner_address>
    3NUiMqW49ToKdnUiK8Q44fetBUngSZm8iD9hdb5Rpg7A
  </owner_address>
  <metadata_URI>link to notification NFT metadata</metadata_URI>
</NFT_verification_response>
```

The NBSA server 1604 may send an NFT metadata retrieve request 1637 to a metadata repository 1610 (e.g., via the metadata URI) to facilitate retrieving metadata associated with the notification NFT from the metadata repository. In one implementation, the NFT metadata retrieve request may include data such as a request identifier, an NFT metadata identifier, and/or the like. In one embodiment, the NBSA server may provide the following example NFT metadata retrieve request, substantially in the form of a HTTP(S) POST message including XML-formatted data, as provided below:

```
POST /NFT_metadata_retrieve_request.php HTTP/1.1
Host: www.server.com
Content-Type: Application/XML
Content-Length: 667
<?XML version = "1.0" encoding = "UTF-8"?>
<NFT_metadata_retrieve_request>
  <request_identifier>ID_request_33</request_identifier>
  <NFT_metadata_ID>ID_NFT_metadata_21</NFT_metadata_ID>
</NFT_metadata_retrieve_request>
```

The metadata repository 1610 may send an NFT metadata retrieve response 1641 to the NBSA server 1604 with the requested metadata. In one implementation, the NFT metadata retrieve response may include data such as a response identifier, the requested metadata datastructure, and/or the like. In one embodiment, the metadata repository may provide the following example NFT metadata retrieve response, substantially in the form of a HTTP(S) POST message including XML-formatted data, as provided below:

```
POST /NFT_metadata_retrieve_response.php HTTP/1.1
Host: www.server.com
Content-Type: Application/XML
Content-Length: 667
<?XML version = "1.0" encoding = "UTF-8"?>
<NFT_metadata_retrieve_response>
  <response_identifier>ID_response_33</response_identifier>
  <NFT_metadata>
    <name>Notification NFT metadata</name>
    <description>Notification NFT for document
    subscribers</description>
    <image>URI of image for document</image>
    <properties>
```

-continued

```
        <document__info>
          <document__name>policy__21.pdf</document__name>
          <document__version>10</document__version>
          <publication__date>1/1/2024</publication__date>
          <publication__state>Published</publication__state>
        </document__info>
        <document__publishing__transaction__identifier>
          Transaction hash of the document publishing transaction
        </document__publishing__transaction__identifier>
      </properties>
    </NFT__metadata>
</NFT__metadata__retrieve__response>
```

The NBSA server 1604 may send a document publication info request 1645 to the blockchain 1608 to facilitate retrieving publication information regarding the document from the blockchain. In one implementation, the document publication info request may include data such as a request identifier, a transaction search query (e.g., a document publishing transaction identifier), and/or the like. In one embodiment, the NBSA server may provide the following example document publication info request, substantially in the form of a HTTP(S) POST message including XML-formatted data, as provided below:

```
POST /document__publication__info__request.php HTTP/1.1
Host: www.server.com
Content-Type: Application/XML
Content-Length: 667
<?XML version = "1.0" encoding = "UTF-8"?>
<document__publication__info__request>
  <request__identifier>ID__request__34</request__identifier>
  <document__publishing__transaction__identifier>
    Transaction hash of the document publishing transaction
  </document__publishing__transaction__identifier>
</document__publication__info__request>
```

The blockchain 1608 may send a document publication info response 1649 to the NBSA server 1604 with the requested publication information regarding the document. In one implementation, the document publication info response may include data such as a response identifier, the requested publication information regarding the document, and/or the like. In one embodiment, the blockchain may provide the following example document publication info response, substantially in the form of a HTTP(S) POST message including XML-formatted data, as provided below:

```
POST /document__publication__info__response.php HTTP/1.1
Host: www.server.com
Content-Type: Application/XML
Content-Length: 667
<?XML version = "1.0" encoding = "UTF-8"?>
<document__publication__info__response>
  <response__identifier>ID__response__34</response__identifier>
  <document__object__key>key__21 (e.g., document hash)</document__object__key>
  <document__hash>f4af8b5789576c000ce9105b25609bd6</document__hash>
</document__publication__info__response>
```

The NBSA server 1604 may send a document object retrieve request 1653 to an adjunct repository 1606 to facilitate retrieving document details (e.g., document info, document hash, constituent data elements) associated with the document from the adjunct repository. In one implementation, the document object retrieve request may include data such as a request identifier, document object key, specification of requested document data, and/or the like. In one embodiment, the NBSA server may provide the following example document object retrieve request, substantially in the form of a HTTP(S) POST message including XML-formatted data, as provided below:

```
POST /document__object__retrieve__request.php HTTP/1.1
Host: www.server.com
Content-Type: Application/XML
Content-Length: 667
<?XML version = "1.0" encoding = "UTF-8"?>
<document__object__retrieve__request>
  <request__identifier>ID__request__35</request__identifier>
  <document__object__key>key__21 (e.g., document
  hash)</document__object__key>
  <requested__document__data>
    document__info, document__hash
  </requested__document__data>
</document__object__retrieve__request>
```

The adjunct repository 1606 may send a document object retrieve response 1657 to the NBSA server 1604 with the requested document data. In one implementation, the document object retrieve response may include data such as a response identifier, the requested document data, and/or the like. In one embodiment, the adjunct repository may provide the following example document object retrieve response, substantially in the form of a HTTP(S) POST message including XML-formatted data, as provided below:

```
POST /document_object_retrieve_response.php HTTP/1.1
Host: www.server.com
Content-Type: Application/XML
Content-Length: 667
<?XML version = "1.0" encoding = "UTF-8"?>
<document_object_retrieve_response>
  <response_identifier>ID_response_35</response_identifier>
  <document_info>
    <document_name>policy_21.pdf</document_name>
    <document_data>document contents</document_data>
    <document_version>10</document_version>
    <previous_version>9</previous_version>
    <document_changes>changes from previous version</document_changes>
    <publication_date>1/1/2024</publication_date>
    <publication_state>Published</publication_state>
  </document_info>
  <document_hash>f4af8b5789576c000ce9105b25609bd6</document_hash>
</document_object_retrieve_response>
```

The NBSA server 1604 may send an NFT document access output 1661 to the user client 1602 to inform the subscriber whether the document was accessed successfully and/or to provide the document to the subscriber. In one implementation, the NFT document access output may include data such as a response identifier, a status, document data, and/or the like. In one embodiment, the NBSA server may provide the following example NFT document access output, substantially in the form of a HTTP(S) POST message including XML-formatted data, as provided below:

```
POST /NFT_document_access_output.php HTTP/1.1
Host: www.server.com
Content-Type: Application/XML
Content-Length: 667
<?XML version = "1.0" encoding = "UTF-8"?>
<NFT_document_access_output>
  <response_identifier>ID_response_31</response_identifier>
  <status>OK</status>
  <document_data>document contents</document_data>
</NFT_document_access_output>
```

Figure 17:
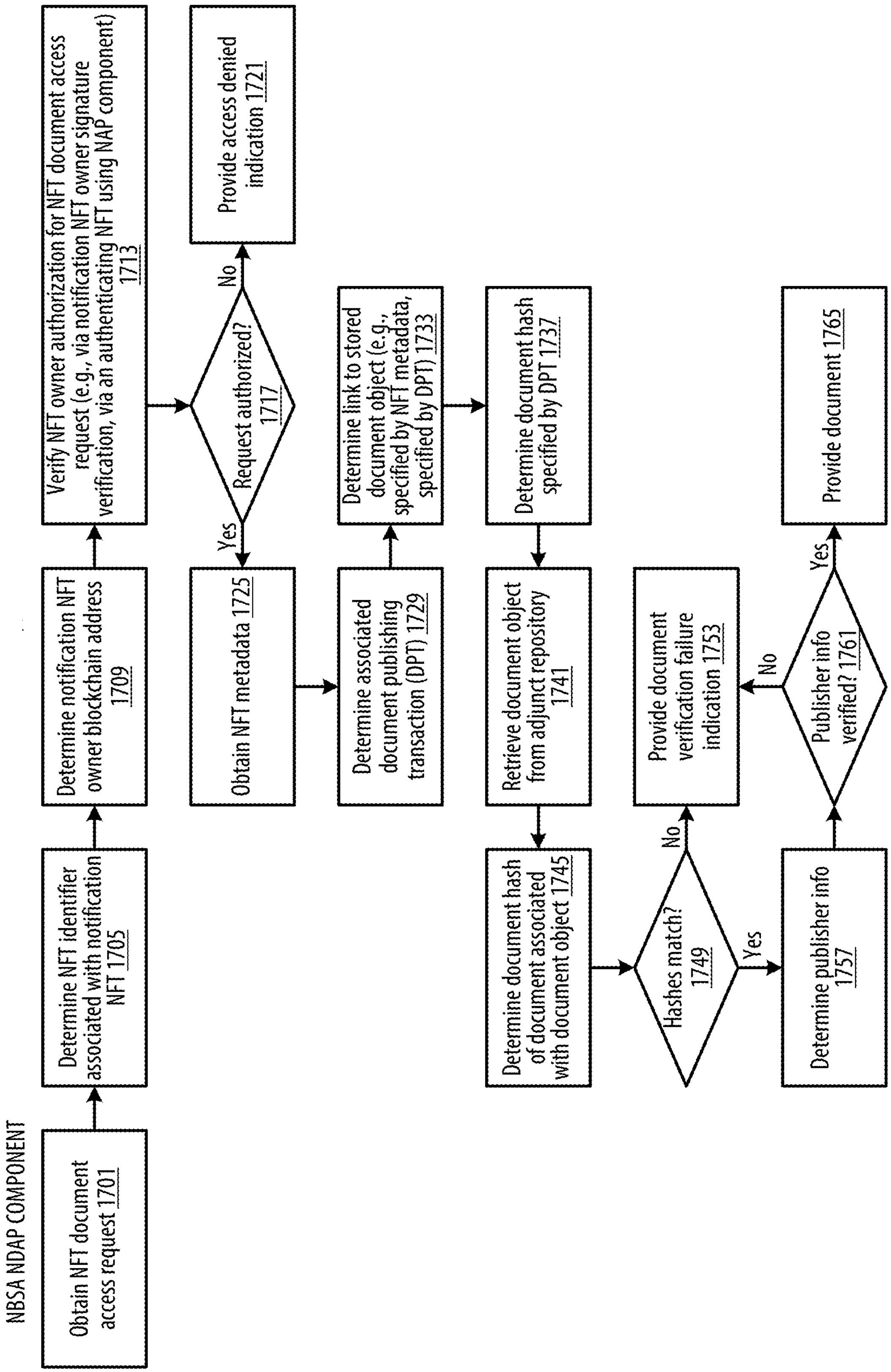
FIG. 17 shows non-limiting, example embodiments of a logic flow illustrating an NFT document access processing (NDAP) component for the NBSA.

FIG. 17 shows non-limiting, example embodiments of a logic flow illustrating an NFT document access processing (NDAP) component for the NBSA. In FIG. 17, an NFT document access request may be obtained at 1701. For example, the NFT document access request may be obtained as a result of a request from a subscriber user to access a document via a notification NFT.

An NFT identifier associated with the notification NFT may be determined at 1705. In one implementation, the NFT document access request may be parsed (e.g., using PHP commands) to determine the NFT identifier of the notification NFT (e.g., based on the value of the NFT_ID field).

An owner blockchain address associated with the notification NFT may be determined at 1709. In one embodiment, the owner blockchain address associated with the notification NFT may be determined via a document publication notification generating smart contract deployed on a blockchain (e.g., a new blockchain implemented via Amazon Quantum Ledger Database; an existing blockchain such as Solana, Ethereum, Polygon, and/or the like). In one implementation, a blockchain address of the document publication notification generating smart contract may be specified via a configuration setting. In one implementation, a blockchain transaction may be sent to the document publication notification generating smart contract (e.g., via an NFT verification request) to determine the associated owner blockchain address. For example, the owner blockchain address may be determined via a function call to the ownerOf( . . . ) function of an ERC-721 compliant document publication notification generating smart contract.

NFT owner authorization for the NFT document access request may be verified at 1713. In one embodiment, the NFT owner authorization may be verified via authorization data proving control over (e.g., ownership of) the owner blockchain address associated with the notification NFT. For example, the authorization data may comprise a password to a cryptographic wallet corresponding to the owner blockchain address. In another example, the authorization data may comprise a message signed with the user's private key (e.g., via the cryptographic wallet of the user) proving ownership of the owner blockchain address. In another example, the authorization data may comprise an authenticating NFT (e.g., providing access to the cryptographic wallet of the user). In one implementation, the NFT document access request may be parsed (e.g., using PHP commands) to determine the authorization data (e.g., based on the value of the authorization_data field). For example, the user's password may be verified to confirm that the user controls the cryptographic wallet corresponding to the owner blockchain address associated with the notification NFT. In another example, the cryptographically signed message may be verified using the user's public key to confirm that the user controls the owner blockchain address associated with the notification NFT. In another example, the user's authenticating NFT may be authenticated via the NAP component to confirm that the user controls the cryptographic wallet corresponding to the owner blockchain address associated with the notification NFT.

A determination may be made at 1717 whether the NFT owner authorization for the NFT document access request was verified successfully. If the NFT owner authorization for the NFT document access request was not verified, an access denied indication may be provided at 1721. In one implementation, a message may be sent to the user with a status field indicating that access to the document was denied (e.g., via an NFT document access output).

If the NFT owner authorization for the NFT document access request was verified, NFT metadata associated with the notification NFT may be obtained at 1725. In one embodiment, a metadata URI associated with the notification NFT may be obtained via the document publication notification generating smart contract. In one implementation, a blockchain transaction may be sent to the document publication notification generating smart contract (e.g., via an NFT verification request) to determine the associated metadata URI. For example, the metadata URI may be determined via a function call to the tokenURI( . . . ) function of an ERC-721 compliant document publication notification generating smart contract. In one embodiment, the metadata URI may directly specify the NFT metadata (e.g., a datastructure in JSON format). In another embodiment, the metadata URI may specify a link (e.g., an identifier of a record in a metadata repository, a URI to a JSON file in a metadata repository) to the NFT metadata (e.g., a datastructure in JSON format). In one implementation, the NFT metadata may be retrieved (e.g., via an NFT metadata retrieve request) from the metadata repository via the link. For example, the NFT metadata may be retrieved from the metadata repository via a call to Arweave API that facilitates retrieving data from the Arweave network similar to the following:

```
URL: /tx/[transaction_id]
Method: GET
Response:
{
  "id": "VvNF3aLS28MXD_04Lv01F9_WcxMibFOp166qDqC1Hlw", //
  NFT_metadata_ID
  "last_tx": "bUfaJN-KKS1LRh_DlJv4ff1gmdbHP4io-J9x7cLY5is",
  "owner": "1Q7RfP...J2x0xc",
  "tags": [ ],
```

-continued

```
  "target": "",
  "quantity": "0",
  "data": "3DduMPkwLkE0LjIxM9o",
  "reward": "1966476441",
  "signature": "RwBICn...Rxqi54"
}
```

In another example, the NFT metadata may be retrieved from the metadata repository via a MySQL database command similar to the following:

```
SELECT *
FROM Metadata
WHERE NFT_metadata_ID = ID_NFT_metadata_21;
```

A document publishing transaction (DPT) associated with the notification NFT may be determined at 1729. In one embodiment, a document publishing transaction identifier specified by the NFT metadata may be determined. In one implementation, the NFT metadata may be parsed (e.g., using PHP commands) to determine the document publishing transaction identifier (e.g., based on the value of the document_publishing_transaction_identifier field) associated with the notification NFT.

A link to a stored document object associated with the document publishing transaction may be determined at 1733. In various implementations, the link may be specified by the document publishing transaction, by the NFT metadata, and/or the like. In one embodiment, the link may be an identifier (e.g., a key) of the stored document object in an adjunct repository. In another embodiment, the link may be a URI to exposed document details (e.g., document info, document hash, constituent data elements) of the stored document object in an adjunct repository. In one implementation, the document publishing transaction and/or the NFT metadata may be parsed (e.g., using PHP commands) to determine the link (e.g., based on the value of the document_object_key field).

A document hash specified by the document publishing transaction may be determined at 1737. In one implementation, the document publishing transaction may be parsed (e.g., using PHP commands) to determine the document hash (e.g., based on the value of the document_hash field).

The stored document object may be retrieved from the adjunct repository at 1741. In one implementation, the stored document object may be retrieved from the adjunct repository via the determined link. For example, the document object may be retrieved from the adjunct repository via a call to Amazon S3 API that facilitates retrieving objects from a bucket similar to the following:

```
GET /S3/nbts/key_21 HTTP/1.2
Host: nbts.execute-api.east-1.amazonaws.com
Content-Type: application/xml
X-Amz-Date: 20231015T063759Z
Authorization: AWS4-HMAC-SHA256 Credential=access-key-
id/20161015/{region}/execute-api/aws4_request, SignedHeaders=content-
type;host;x-amz-date,
Signature=ba09b72b585acf0e578e6ad02555c00e24b420b59025bc7bb8d3f7aed1471339
Cache-Control: no-cache
Postman-Token: d60fcb59-d335-52f7-0025-5bd96928098a
```

In another example, the document object may be retrieved from the adjunct repository via a MySQL database command similar to the following:

```
SELECT *
FROM Documents
WHERE documentID = key_21;
```

It is to be understood that, in some implementations, specific data fields (e.g., document info, document hash, constituent data elements) of the document object may be retrieved from the adjunct repository (e.g., instead of the entire document object). In one alternative implementation, the stored document object may be retrieved from the adjunct repository via a document serial number.

A document hash of a document associated with the stored document object may be determined at 1745. In one implementation, the document hash may be retrieved as discussed with regard to 1741. In another implementation, the document hash may be recalculated in a similar way as discussed with regard to 1529 from constituent data elements retrieved as discussed with regard to 1741.

A determination may be made at 1749 whether the document hash specified by the document publishing transaction and the document hash of the document associated with the stored document object match. If the document hashes are different, a document verification failure indication may be provided at 1753. In one implementation, a message may be sent to the user with a status field indicating a document verification failure (e.g., via an NFT document access output).

If the document hashes are the same, publisher info of the document associated with the stored document object may be determined at 1757. In one implementation, the publisher info may be retrieved as discussed with regard to 1741.

A determination may be made at 1761 whether the publisher info may be verified. In one implementation, publisher signature, reviewer signature, and/or the like signatures may be verified using a corresponding public key (e.g., publisher's public key, reviewer's public key). If the publisher info is not verified, a document verification failure indication may be provided at 1753. In one implementation, a message may be sent to the user with a status field indicating a document verification failure (e.g., via an NFT document access output).

If the publisher info is not verified, the document may be provided at 1765. In one implementation, document contents may be retrieved as discussed with regard to 1741 and provided to the user (e.g., via an NFT document access output). In an alternative embodiment, information regarding document access (e.g., for confirmation of reading, deliver, etc.) may be stored on the blockchain (e.g., via additional blockchain transactions and/or NFTs) for tracking purposes. In one implementation, additional NFTs (e.g., {OpenedNFT}, {AttestedToReadingNFT}, etc.) may be created to record that the user opened the document, scrolled to the bottom of the document and/or clicked a check box that they read the document, and/or the like. For example, the publisher may determine which tracking options (e.g., which additional NFTs) should be utilized (e.g., to facilitate efficient use of blockchain resources).

Figure 18:
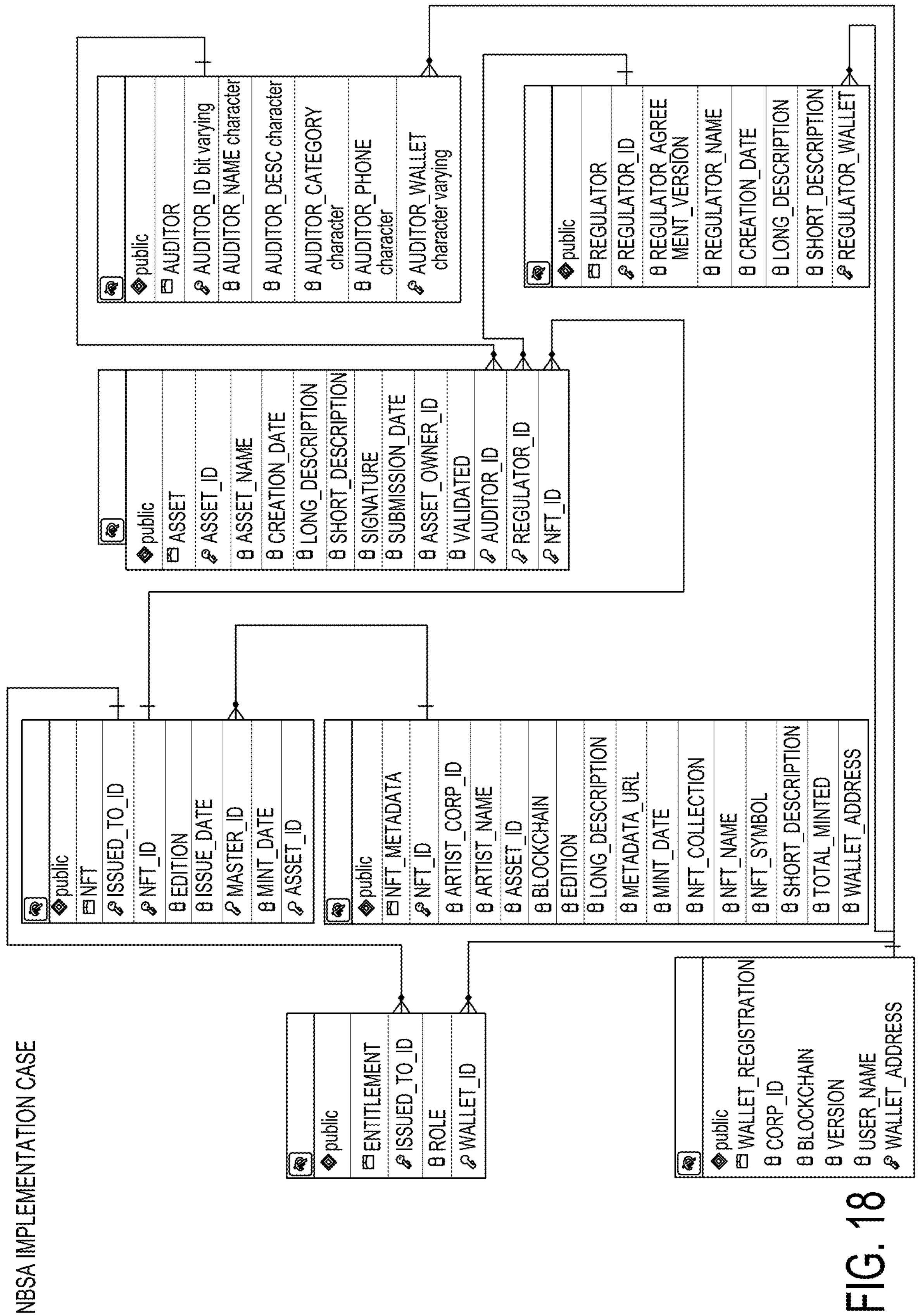
FIG. 18 shows non-limiting, example embodiments of implementation case(s) for the NBSA.

FIG. 18 shows non-limiting, example embodiments of implementation case(s) for the NBSA. In FIG. 18, an exemplary entity relationship (ER) diagram that may be utilized to facilitate NBSA operation is illustrated. In various embodiments, exemplary use cases such as described in FIGS. 19A-B may be implemented using database tables discussed in the ER diagram.

FIGS. 19A-B show non-limiting, example embodiments of implementation case(s) for the NBSA. In FIGS. 19A-B, exemplary use cases including a use case description, data and/or process utilized, and notes for each exemplary use case are illustrated.

Figure 20:
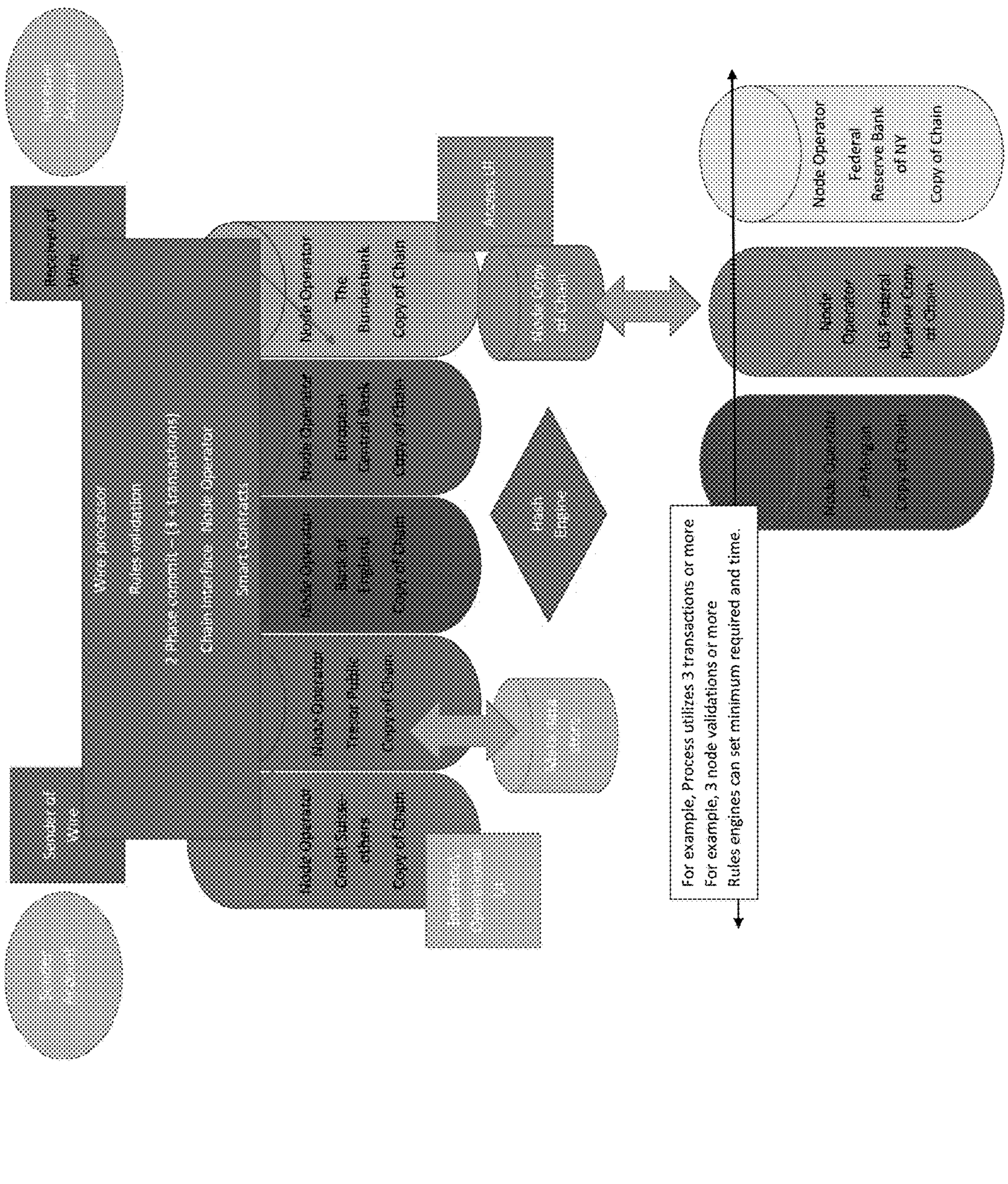
FIG. 20 shows non-limiting, example embodiments of an architecture for the NBSA.

FIG. 20 shows non-limiting, example embodiments of an architecture for the NBSA. In FIG. 20, components of an exemplary architecture that may be utilized to facilitate NBSA operation are illustrated.

In one embodiment, using a multitransitional process on an existing blockchain (e.g., BTC, ETH, Solana) or on a shared created blockchain (e.g., accepted by SWIFT and/or major processors around the world) the NBSA may implement a transfer transaction blockchain with clawback.

In one implementation, a proof of work system (e.g., aimed at low volume (e.g., fewer than 1 million transactions per day) high value transactions) may be utilized. In another implementation, a proof of stake system may be utilized.

In one implementation, using Solana, Ethereum or other available Blockchain technologies, a blockchain may be created (e.g., that has some minimum number of nodes (e.g., at least 3, more than 24)) that may be used to perform a myriad of functions such as but not limited to: moving funds from a send account to a receiver account (e.g., using a Memo posting style of transaction where there is 1. A send post, 2. A Receive post, 3. n verification posts (transactions)).

In one embodiment, the NBSA may implement the ability to do a clawback within an agreed upon time and/or number of transactions based on Smart Contracts.

In one implementation, for each transfer, rules may be set before a first send is done such as the minimum number of posts or transactions on the chain, and a timer for which the clawback can be initiated (e.g., through the use of Smart Contracts).

In one implementation, for purposes of the operation, the clawback transaction should be submitted by the sender (e.g., sender bank) prior to the nodes executing the minimum number of posts (Transactions).

In one implementation, the rules engine can also enable a rule for a final 2-way transaction (e.g., after all nodes approved) that the sender processes a FINAL post, with the sender responding with 1 Agree post transaction—with each transaction utilizing multiple nodes to process (e.g., processed through a Smart Contract).

In one embodiment, smart contracts can be created to handle the rules or creating standard methods for a clawback (e.g., to move SWIFT to a Blockchain for existing processes or enhanced oversight methods where transparency is preferred).

In one embodiment, agreed upon Node operators may hold the source documents (e.g., in an adjunct database) while a hash of each source field is used to create a master hash for an authenticating NFT. In one implementation, this is then synced and verified when the authenticating NFT is presented (e.g., to authorize a transfer transaction).

In one embodiment, authenticating NFTs may be created for title to funds. In one embodiment, the obfuscated transaction trail (e.g., public ledger) may be publicly posted.

In some embodiments, the NBSA may also be used for FX transfers and/or for processing between large intuitions. In one embodiment, the NBSA may be used as an upgrade to the SWIFT (Society for Worldwide Interbank Financial Telecommunication, legally S.W.I.F.T.) system.

Financial products and services continue to grow in complexity, for end customers, regulators or governments it can be difficult to have the transparency to ensure the product or service is managed correctly (e.g., contains assets and securities in line with the original operating parameters). In some embodiments, the NBSA may provide transparency of managed accounts or similar financial products where asset transfers in and out, charges, changes and operations are tracked on an immutable ledger-based database solution (e.g., this can be a public or private chain depending on the use case). In one implementation, as part of the operational flow to carry out actions on the product or service, a governance gate may be integrated into the NBSA that tokenizes the action in the form of a document record that may be placed on the blockchain for full transparency.

In one embodiment, smart contracts may be utilized by the NBSA, where passing of said governance gate would pass or fail depending on predefined rules outlined and enforced by one or more smart contracts. A non-exhaustive set of examples may include smart contracts administering fee limits, maximum exposure to an asset, security or sector, constitution of a portfolio, trading authorization and fiduciary compliance, access control rules (e.g., being in a certain user group (e.g., administrators, employee of a specific department), time of day restrictions on access, number of allowed accesses), and/or the like.

In one embodiment, the NBSA may implement "decentralized consensus" through the combination of an immutable ledger database, semiprivate blockchain and voting based contracts, and/or the like. Members of the blockchain may hold voting rights, applied and implemented through voting contracts on the blockchain. In one implementation, on agreement of a proposal each entity releases their token, with some number (e.g., all) of tokens specified to cryptographically approve the write process to the immutable ledger-based database. For example, a group of trustees may be tasked with managing an account of a vulnerable person, members including the financial institution are part of the private chain, a trustee's request for a money transfer results in an automated request requiring all other members to vote and approve such a transfer.

Figure 21A:
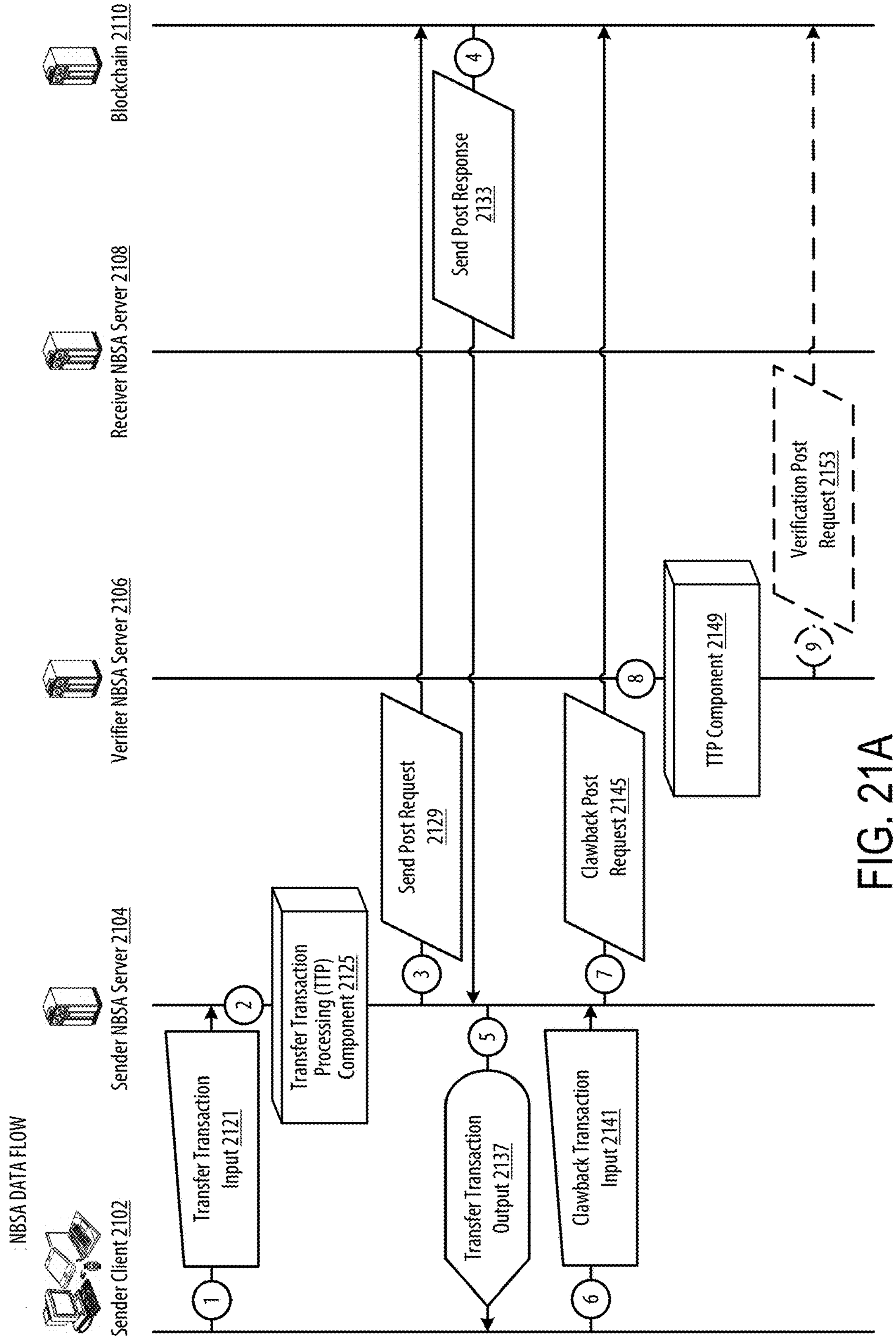
FIGS. 21A, 21B (hereinafter collectively FIG. 21) show non-limiting, example embodiments of a datagraph illustrating data flow(s) for the NBSA.
Figure 21B:
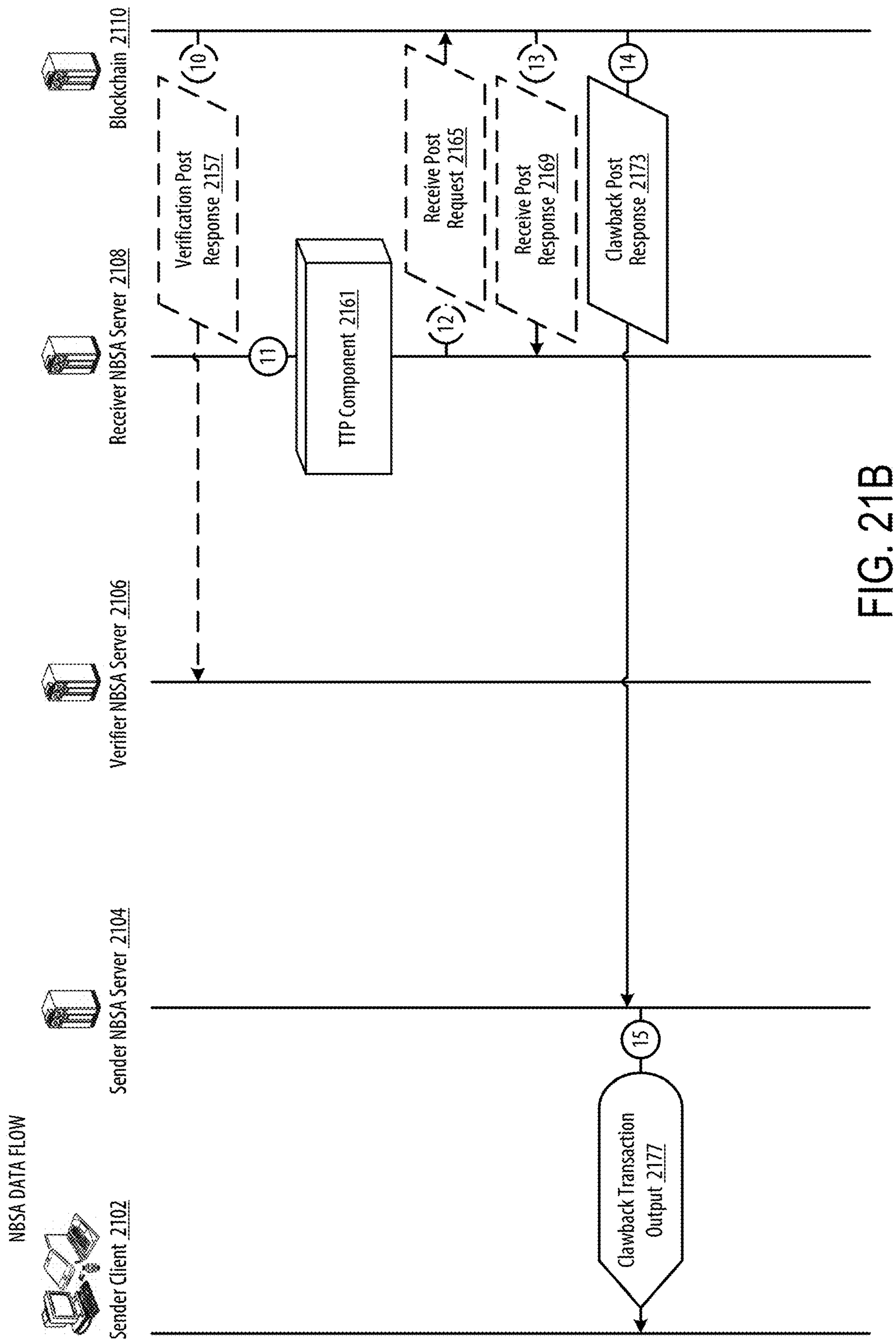

FIGS. 21A-B show non-limiting, example embodiments of a datagraph illustrating data flow(s) for the NBSA. In FIGS. 21A-B, dashed lines indicate data flow elements that may be more likely to be optional. In FIGS. 21A-B, a sender client 2102 (e.g., of a sender) may send a transfer transaction input 2121 (e.g., for the sender's transfer transaction) to a sender NBSA server 2104 to facilitate transferring funds (e.g., cryptographic assets) from the sender to a receiver. For example, the sender client may be a desktop, a laptop, a tablet, a smartphone, a smartwatch, and/or the like that is executing a client application. In one implementation, the transfer transaction input may include data such as a request identifier, a sender identifier, authentication data (e.g., an authenticating NFT), transaction details for the sender's transfer transaction, and/or the like. In one embodiment, the sender client may provide the following example transfer transaction input, substantially in the form of a HTTP(S) POST message including XML-formatted data, as provided below:

```
POST /transfer_transaction_input.php HTTP/1.1
Host: www.server.com
Content-Type: Application/XML
Content-Length: 667
<?XML version = "1.0" encoding = "UTF-8"?>
<transfer_transaction_input>
  <request_identifier>ID_request_41</request_identifier>
  <sender_identifier>ID_sender_41</sender_identifier>
  <authentication_data>
    <NFT_ID>
      uw4z7uzd7sitrexts4ljt3rm4azrce6y3q62fmeht3virqqc7slr
    </NFT_ID>
    <NFT_type>Sender ID (e.g., with title to funds)</NFT_type>
    <authorization_data>
      cryptographic signature valid for owner address associated with the
      authenticating NFT (e.g., a signed message generated by a wallet)
    </authorization_data>
  </authentication_data>
  <transaction_details>
    <transfer_transaction_identifier>
      ID_transaction_41
    </transfer_transaction_identifier>
    <transaction_type>SEND</transaction_type>
    <transaction_amount>53 ETH</transaction_amount>
    <receiver_identifier>ID_recipient_41</receiver_identifier>
  </transaction_details>
</transfer_transaction_input>
```

A transfer transaction processing (TTP) component 2125 may utilize data provided in the transfer transaction input (e.g., from the sender) to facilitate processing the sender's transfer transaction. See FIG. 22 for additional details regarding the TTP component.

The sender NBSA server 2104 may send a send post request 2129 to a blockchain 2110 to facilitate recording a send post transaction corresponding to the sender's transfer transaction on the blockchain. For example, the sender NBSA server may submit the send post transaction to the blockchain and then make a function call to a transfer transaction handling smart contract to notify the transfer transaction handling smart contract regarding the send post transaction. In another example, the sender NBSA server may send a function call to a transfer transaction handling smart contract to instruct the transfer transaction handling smart contract to record the send post transaction on the blockchain. In one implementation, the send post request (e.g., to a transfer transaction handling smart contract) may include data such as a request identifier, a smart contract address, function call details, and/or the like. In one embodiment, the sender NBSA server may provide the following example send post request, substantially in the form of a HTTP(S) POST message including XML-formatted data, as provided below:

```
POST /send_post_request.php HTTP/1.1
Host: www.server.com
Content-Type: Application/XML
Content-Length: 667
<?XML version = "1.0" encoding = "UTF-8"?>
<send_post_request>
  <request_identifier>ID_request_42</request_identifier>
  <smart_contract_address>
    address of the transfer transaction handling smart contract
  </smart_contract_address>
  <function_call_details>
    <function_name>notifySend</function_name>
    <send_post_transaction_identifier>
      transaction identifier of the send post transaction (e.g., that
      contains transaction details for the sender's transfer transaction
      and that is cryptographically signed by the sender)
    </send_post_transaction_identifier>
  </function_call_details>
</send_post_request>
```

The transfer transaction handling smart contract deployed on the blockchain 2110 may send a send post response 2133 to the sender NBSA server 2104 to confirm that submission of the send post transaction was recorded. In one implementation, the send post response may include data such as a response identifier, a status, and/or the like. In one embodiment, the transfer transaction handling smart contract deployed on the blockchain may provide the following example send post response, substantially in the form of a HTTP(S) POST message including XML-formatted data, as provided below:

```
POST /send_post_response.php HTTP/1.1
Host: www.server.com
Content-Type: Application/XML
Content-Length: 667
<?XML version = "1.0" encoding = "UTF-8"?>
<send_post_response>
  <response_identifier>ID_response_42</response_identifier>
  <status>OK</status>
</send_post_response>
```

The sender NBSA server 2104 may send a transfer transaction output 2137 to the sender client 2102 to inform the sender whether the sender's transfer transaction was processed successfully. In one implementation, the transfer transaction output may include data such as a response identifier, a status, and/or the like. In one embodiment, the sender NBSA server may provide the following example transfer transaction output, substantially in the form of a HTTP(S) POST message including XML-formatted data, as provided below:

```
POST /transfer_transaction_output.php HTTP/1.1
Host: www.server.com
Content-Type: Application/XML
Content-Length: 667
<?XML version = "1.0" encoding = "UTF-8"?>
<transfer_transaction_output>
  <response_identifier>ID_response_41</response_identifier>
  <status>OK</status>
</transfer_transaction_output>
```

Sometime after sending the transfer transaction input, the sender client 2102 may send a clawback transaction input 2141 (e.g., for the sender's clawback transaction) to the sender NBSA server 2104 to facilitate clawing back funds sent via the sender's transfer transaction. It is to be understood that the clawback transaction input may be sent before, after, while, between, and/or the like other transactions (e.g., from verifier(s), from the receiver) associated with the sender's transfer transaction are sent (e.g., by verifier(s), by the receiver) and/or processed (e.g., by the transfer transaction handling smart contract), and, as such, the success of the sender's clawback transaction may, in some implementations, depend on the time (e.g., with regard to the sender's transfer transaction) and/or order (e.g., with regard to the other transactions) in which the sender's clawback transaction is sent and/or processed. In one implementation, the clawback transaction input may include data such as a request identifier, a sender identifier, authentication data (e.g., an authenticating NFT), transaction details for the sender's clawback transaction, and/or the like. In one embodiment, the sender client may provide the following example clawback transaction input, substantially in the form of a HTTP(S) POST message including XML-formatted data, as provided below:

```
POST /clawback_transaction_input.php HTTP/1.1
Host: www.server.com
Content-Type: Application/XML
Content-Length: 667
<?XML version = "1.0" encoding = "UTF-8"?>
<clawback_transaction_input>
  <request_identifier>ID_request_43</request_identifier>
  <sender_identifier>ID_sender_41</sender_identifier>
  <authentication_data>
    <NFT_ID>
      uw4z7uzd7sitrexts4ljt3rm4azrce6y3q62fmeht3virqqc7slr
    </NFT_ID>
    <NFT_type>Sender ID</NFT_type>
    <authorization_data>
      cryptographic signature valid for owner address associated with the
      authenticating NFT (e.g., a signed message generated by a wallet)
    </authorization_data>
  </authentication_data>
  <transaction_details>
    <clawback_transaction_identifier>
      ID_transaction_42
    </clawback_transaction_identifier>
    <transaction_type>CLAWBACK</transaction_type>
    <transfer_transaction_identifier>
      ID_transaction_41
    </transfer_transaction_identifier>
  </transaction_details>
</clawback_transaction_input>
```

The TTP component 2125 may utilize data provided in the clawback transaction input (e.g., from the sender) to facilitate processing the sender's clawback transaction. See FIG. 22 for additional details regarding the TTP component.

The sender NBSA server 2104 may send a clawback post request 2145 to the blockchain 2110 to facilitate recording a clawback post transaction corresponding to the sender's transfer transaction on the blockchain. For example, the sender NBSA server may submit the clawback post transaction to the blockchain and then make a function call to a transfer transaction handling smart contract to notify the transfer transaction handling smart contract regarding the clawback post transaction. In another example, the sender NBSA server may send a function call to a transfer transaction handling smart contract to instruct the transfer transaction handling smart contract to record the clawback post transaction on the blockchain. In one implementation, the clawback post request (e.g., to a transfer transaction handling smart contract) may include data such as a request identifier, a smart contract address, function call details, and/or the like. In one embodiment, the sender NBSA server may provide the following example clawback post request, substantially in the form of a HTTP(S) POST message including XML-formatted data, as provided below:

```
POST /clawback_post_request.php HTTP/1.1
Host: www.server.com
Content-Type: Application/XML
Content-Length: 667
<?XML version = "1.0" encoding = "UTF-8"?>
<clawback_post_request>
  <request_identifier>ID_request_44</request_identifier>
  <smart_contract_address>
    address of the transfer transaction handling smart contract
  </smart_contract_address>
  <function_call_details>
    <function_name>notifyClawback</function_name>
    <clawback_post_transaction_identifier>
      transaction identifier of the clawback post transaction (e.g., that
      contains transaction details for the sender's clawback transaction
      and that is cryptographically signed by the sender)
    </clawback_post_transaction_identifier>
  </function_call_details>
</clawback_post_request>
```

In some embodiments, a TTP component 2149 (e.g., executed by a verifier NBSA server 2106) may utilize data provided (e.g., before, after, while, and/or the like the clawback transaction is sent and/or processed) in a verification transaction input (e.g., from a verifier) to facilitate processing the verifier's verify transaction (e.g., that confirms that the verifier verified a specified transfer transaction) for the sender's transfer transaction. See FIG. 22 for additional details regarding the TTP component.

The verifier NBSA server 2106 may send a verification post request 2153 to the blockchain 2110 to facilitate recording a verify post transaction corresponding to the sender's transfer transaction on the blockchain. For example, the verifier NBSA server may submit the verify post transaction to the blockchain and then make a function call to a transfer transaction handling smart contract to notify the transfer transaction handling smart contract regarding the verify post transaction. In another example, the verifier NBSA server may send a function call to a transfer transaction handling smart contract to instruct the transfer transaction handling smart contract to record the verify post transaction on the blockchain. In one implementation, the verification post request (e.g., to a transfer transaction handling smart contract) may include data such as a request identifier, a smart contract address, function call details, and/or the like. In one embodiment, the verifier NBSA server may provide the following example verification post request, substantially in the form of a HTTP(S) POST message including XML-formatted data, as provided below:

```
POST /verification_post_request.php HTTP/1.1
Host: www.server.com
Content-Type: Application/XML
Content-Length: 667
<?XML version = "1.0" encoding = "UTF-8"?>
<verification_post_request>
  <request_identifier>ID_request_45</request_identifier>
  <smart_contract_address>
    address of the transfer transaction handling smart contract
  </smart_contract_address>
  <function_call_details>
    <function_name>notifyVerify</function_name>
    <verify_post_transaction_identifier>
      transaction identifier of the verify post transaction (e.g.,
      that contains transaction details for the verifier's verify
      transaction and that is cryptographically signed by the verifier)
    </verify_post_transaction_identifier>
  </function_call_details>
</verification_post_request>
```

The transfer transaction handling smart contract deployed on the blockchain 2110 may send a verification post response 2157 to the verifier NBSA server 2106 to confirm that submission of the verify post transaction was recorded. In one implementation, the verification post response may include data such as a response identifier, a status, and/or the like. In one embodiment, the transfer transaction handling smart contract deployed on the blockchain may provide the following example verification post response, substantially in the form of a HTTP(S) POST message including XML-formatted data, as provided below:

```
POST /verification_post_response.php HTTP/1.1
Host: www.server.com
Content-Type: Application/XML
Content-Length: 667
<?XML version = "1.0" encoding = "UTF-8"?>
<verification_post_response>
  <response_identifier>ID_response_45</response_identifier>
  <status>OK</status>
</verification_post_response>
```

In some embodiments, a TTP component 2161 (e.g., executed by a receiver NBSA server 2108) may utilize data provided (e.g., before, after, while, and/or the like the clawback transaction is sent and/or processed) in a receiver transaction input (e.g., from the receiver) to facilitate processing the receiver's receive transaction (e.g., that confirms that the receiver processed a specified transfer transaction) for the sender's transfer transaction. See FIG. 22 for additional details regarding the TTP component.

The receiver NBSA server 2108 may send a receive post request 2165 to the blockchain 2110 to facilitate recording a receive post transaction corresponding to the sender's transfer transaction on the blockchain. For example, the receiver NBSA server may submit the receive post transaction to the blockchain and then make a function call to a transfer transaction handling smart contract to notify the transfer transaction handling smart contract regarding the receive post transaction. In another example, the receiver NBSA server may send a function call to a transfer transaction handling smart contract to instruct the transfer transaction handling smart contract to record the receive post transaction on the blockchain. In one implementation, the receive post request (e.g., to a transfer transaction handling smart contract) may include data such as a request identifier, a smart contract address, function call details, and/or the like. In one embodiment, the receiver NBSA server may provide the following example receive post request, substantially in the form of a HTTP(S) POST message including XML-formatted data, as provided below:

```
POST /receive_post_request.php HTTP/1.1
Host: www.server.com
Content-Type: Application/XML
Content-Length: 667
<?XML version = "1.0" encoding = "UTF-8"?>
<receive_post_request>
  <request_identifier>ID_request_46</request_identifier>
  <smart_contract_address>
    address of the transfer transaction handling smart contract
  </smart_contract_address>
  <function_call_details>
    <function_name>notifyReceive</function_name>
    <receive_post_transaction_identifier>
      transaction identifier of the receive post transaction (e.g.,
      that contains transaction details for the receiver's receive
      transaction and that is cryptographically signed by the receiver)
    </receive_post_transaction_identifier>
  </function_call_details>
</receive_post_request>
```

The transfer transaction handling smart contract deployed on the blockchain 2110 may send a receive post response 2169 to the receiver NBSA server 2108 to confirm that submission of the receive post transaction was recorded. In one implementation, the receive post response may include data such as a response identifier, a status, and/or the like. In one embodiment, the transfer transaction handling smart contract deployed on the blockchain may provide the following example receive post response, substantially in the form of a HTTP(S) POST message including XML-formatted data, as provided below:

```
POST /receive_post_response.php HTTP/1.1
Host: www.server.com
Content-Type: Application/XML
Content-Length: 667
<?XML version = "1.0" encoding = "UTF-8"?>
<receive_post_response>
  <response_identifier>ID_response_46</response_identifier>
  <status>OK</status>
</receive_post_response>
```

The transfer transaction handling smart contract deployed on the blockchain 2110 may send a clawback post response 2173 to the sender NBSA server 2104 to confirm that submission of the clawback post transaction was recorded and/or to inform the sender NBSA server whether the funds were clawed back successfully. In one implementation, the clawback post response may include data such as a response identifier, a status, and/or the like. In one embodiment, the transfer transaction handling smart contract deployed on the blockchain may provide the following example clawback post response, substantially in the form of a HTTP(S) POST message including XML-formatted data, as provided below:

```
POST /clawback_post_response.php HTTP/1.1
Host: www.server.com
Content-Type: Application/XML
Content-Length: 667
<?XML version = "1.0" encoding = "UTF-8"?>
<clawback_post_response>
  <response_identifier>ID_response_44</response_identifier>
  <status>OK</status>
</clawback_post_response>
```

The sender NBSA server 2104 may send a clawback transaction output 2177 to the sender client 2102 to inform the sender whether the sender's clawback transaction was processed successfully (e.g., to inform the sender whether the funds associated with the sender's transfer transaction were returned to the sender). In one implementation, the clawback transaction output may include data such as a response identifier, a status, and/or the like. In one embodiment, the sender NBSA server may provide the following example clawback transaction output, substantially in the form of a HTTP(S) POST message including XML-formatted data, as provided below:

```
POST /clawback_transaction_output.php HTTP/1.1
Host: www.server.com
Content-Type: Application/XML
Content-Length: 667
<?XML version = "1.0" encoding = "UTF-8"?>
<clawback_transaction_output>
  <response_identifier>ID_response_43</response_identifier>
  <status>OK</status>
</clawback_transaction_output>
```

Figure 22:
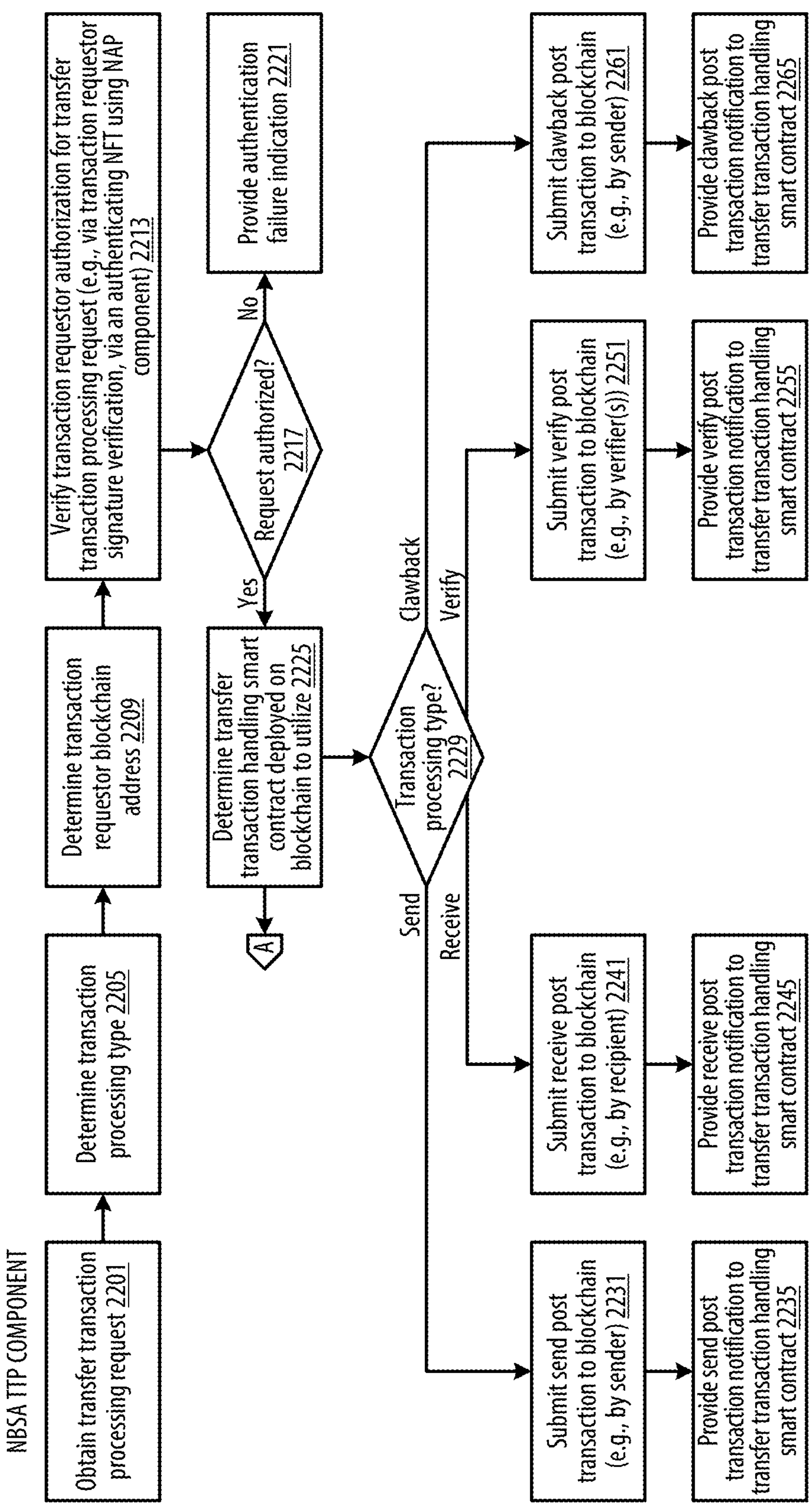
FIG. 22 shows non-limiting, example embodiments of a logic flow illustrating a transfer transaction processing (TTP) component for the NBSA.

FIG. 22 shows non-limiting, example embodiments of a logic flow illustrating a transfer transaction processing (TTP) component for the NBSA. In FIG. 22, a transfer transaction processing request may be obtained at 2201. For example, the transfer transaction processing request may be obtained as a result of a request (e.g., via a transfer transaction input, a clawback transaction input, a verification transaction input, a receiver transaction input) from a transaction requestor (e.g., a sender, a verifier, a receiver) to process a transaction (e.g., a transfer transaction, a clawback transaction, a verify transaction, a receive transaction) for the sender's transfer transaction (e.g., transferring funds from the sender to the receiver).

A transaction processing type associated with the transfer transaction processing request may be determined at 2205. In one embodiment, the transaction processing type may be one of: send, receive, verify, clawback. It is to be understood that, in alternative embodiments, other transaction processing types may be utilized. For example, a final transaction processing type may be utilized in embodiments in which the sender utilizes a final post transaction to confirm agreement to proceed with the transfer transaction after other nodes (e.g., verifier node(s), receiver node) approve the transfer transaction. In one implementation, the transfer transaction processing request may be parsed (e.g., using PHP commands) to determine the transaction processing type (e.g., based on the value of the transaction_type field).

A transaction requestor blockchain address may be determined at 2209. In one embodiment, the transaction requestor blockchain address may be specified via the transfer transaction processing request. In one implementation, the transfer transaction processing request may be parsed (e.g., using PHP commands) to determine the transaction requestor blockchain address. In another embodiment, the transaction requestor blockchain address may be determined via an authenticating NFT. In one implementation, the transfer transaction processing request may be parsed (e.g., using PHP commands) to determine an NFT identifier associated with the authenticating NFT (e.g., based on the value of the NFT_ID field), and an owner blockchain address associated with the authenticating NFT may be determined via a function call to an authenticating NFT smart contract (e.g., as discussed with regard to FIG. 5 at 509).

Transaction requestor authorization for the transfer transaction processing request may be verified at 2213. In one embodiment, the transaction requestor authorization may be verified via authorization data proving control over (e.g., ownership of) the transaction requestor blockchain address. For example, the authorization data may comprise a password to a cryptographic wallet corresponding to the transaction requestor blockchain address. In another example, the authorization data may comprise a message signed with the transaction requestor's private key (e.g., via the cryptographic wallet of the transaction requestor) proving ownership of the transaction requestor blockchain address. In another example, the authorization data may comprise the authenticating NFT (e.g., providing access to the cryptographic wallet of the transaction requestor). In one implementation, the transfer transaction processing request may be parsed (e.g., using PHP commands) to determine the authorization data (e.g., based on the value of the authorization_data field). For example, the transaction requestor's password may be verified to confirm that the transaction requestor controls the cryptographic wallet corresponding to the transaction requestor blockchain address. In another example, the cryptographically signed message may be verified using the transaction requestor's public key to confirm that the transaction requestor controls the transaction requestor blockchain address. In another example, the authenticating NFT may be authenticated via the NAP component to confirm that the transaction requestor controls the cryptographic wallet corresponding to the owner blockchain address associated with the authenticating NFT.

A determination may be made at 2217 whether the transaction requestor authorization for the transfer transaction processing request was verified successfully. If the transaction requestor authorization for the transfer transaction processing request was not verified, an authentication failure indication may be provided at 2221. In one implementation, a message may be sent to the transaction requestor with a status field indicating an authentication failure.

If the transaction requestor authorization for the transfer transaction processing request was verified, a transfer transaction handling smart contract deployed on a blockchain (e.g., a new blockchain implemented via Amazon Quantum Ledger Database; an existing blockchain such as Solana, Ethereum, Polygon, and/or the like) to utilize may be determined at 2225. In one embodiment, the transfer transaction handling smart contract may facilitate the transfer transaction (e.g., while implementing the ability to do a clawback). For example, a transfer transaction handling smart contract structured similar to the following may be utilized:

```
Smart Contract
pragma solidity ^0.8.0;
import "@openzeppelin/contracts/token/ERC20/IERC20.sol";
contract TokenTransferContract {
  address public owner;
  IERC20 public token;
  constructor(addres _tokenAddress) {
    owner = msg.sender;
```

-continued

```
    token = IERC20(_tokenAddress);
  }
  function transferTokens(address recipient, uint256 amount) external {
    require(msg.sender == owner, "Only the owner can call this function") ;
  token.transfer(x, amount);
  }
  function clawbackTransaction(address recipient, uint256 amount) external {
    require(msg.sender == owner, "Only the owner can call this function");
    require(token.balanceOf(address(this) ) >= amount, "Insufficient
contract balance") ;
    token.transferFrom(recipient, address(this), amount);
  }
  function getContractBalance( ) external view returns (uint256) {
    return token.balanceOf(address(this) );
  }
}
```

Figure 23:
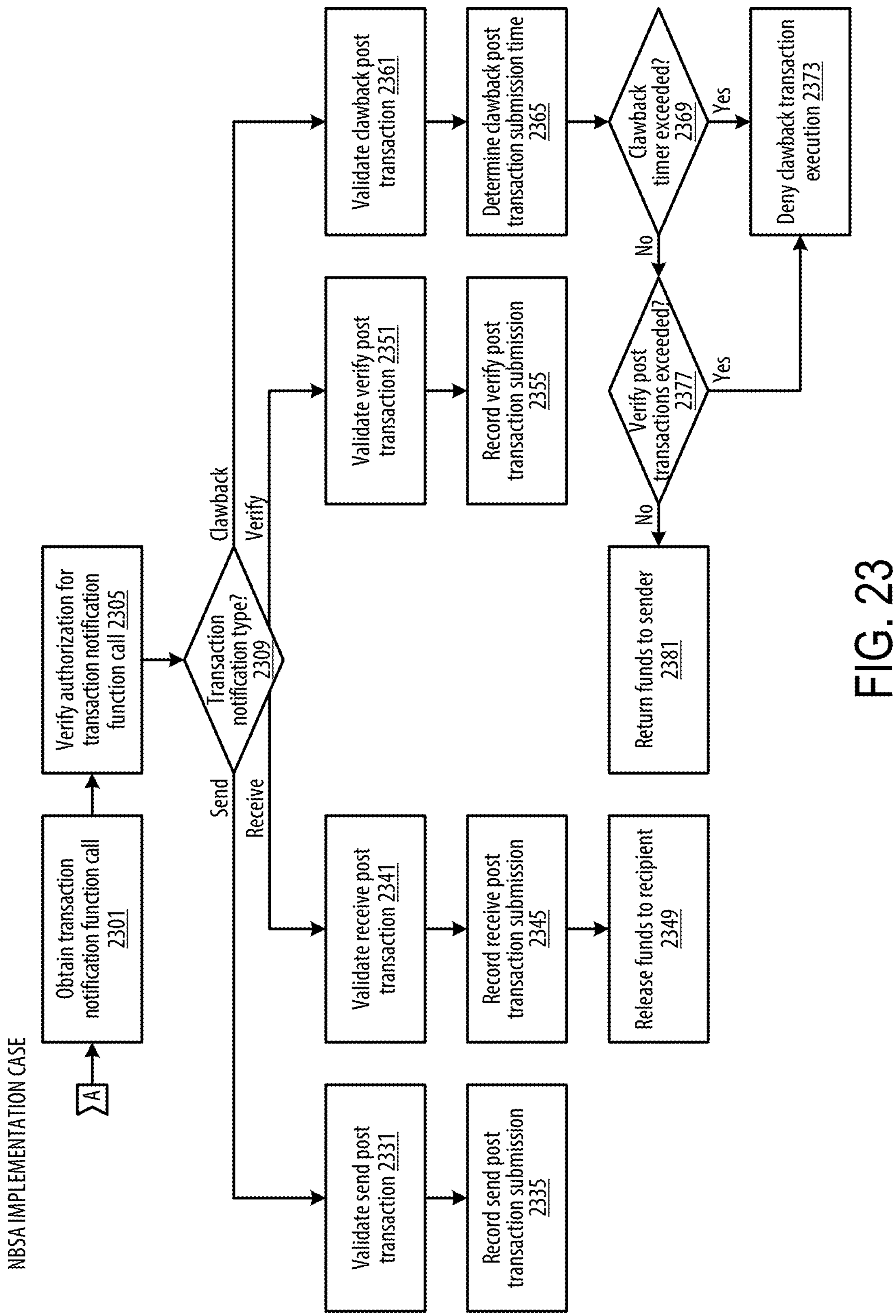
FIG. 23 shows non-limiting, example embodiments of implementation case(s) for the NBSA.

See FIG. 23 for an exemplary implementation case for a transfer transaction handling smart contract. In one implementation, a blockchain address of the transfer transaction handling smart contract to utilize may be specified via a configuration setting. It is to be understood that, in some embodiments, different transfer transaction handling smart contracts (e.g., with different transaction handling rules (e.g., transfer rules, clawback rules)) may be utilized for different nodes, different counterparties (e.g., consumer to consumer, bank to bank, consumer to bank, bank to consumer), different jurisdictions (e.g., different countries, different states), different fund transfer levels (e.g., less than $100K, more than $10 M), and/or the like. As such, a blockchain address of the transfer transaction handling smart contract appropriate for the transfer transaction may be determined (e.g., via the configuration setting based on a set of smart contract selection rules and/or transaction details of the transfer transaction).

A determination may be made at 2229 regarding how to process the transfer transaction processing request. If the transaction processing type associated with the transfer transaction processing request is send (e.g., initiating the transfer transaction), a send post transaction may be submitted (e.g., by a sender NBSA server) to the blockchain at 2231. In one implementation, the send post transaction may be broadcast to the blockchain and may contain transaction details (e.g., sender identifier, transfer transaction identifier, transaction amount, receiver identifier, date and/or time) for the sender's transfer transaction. In some implementations, the send post transaction may transfer funds (e.g., the transaction amount associated with the transfer transaction identifier) from the sender to the transfer transaction handling smart contract. For example, a send post transaction structured similar to the following may be utilized:

```
POST /submit_transaction.php HTTP/1.1
Host: www.server.com
Content-Type: Application/XML
Content-Length: 667
<?XML version = "1.0" encoding = "UTF-8"?>
<post_transaction>
  <sender_id>sender_123</sender_id>
  <reciever_id>sender_123</reciever_id>
  <transaction_id>transaction_345</transaction_id>
  <transaction_amount>1</transaction_amount>
  <epoch_time>1597159545</epoch_time>
</post_transaction>
```

A send post transaction notification may be provided to the transfer transaction handling smart contract at 2235. In one implementation, a blockchain transaction may be sent to the transfer transaction handling smart contract (e.g., via a send post request) to notify the transfer transaction handling smart contract regarding the send post transaction.

If the transaction processing type associated with the transfer transaction processing request is receive (e.g., confirming that the receiver processed the transfer transaction), a receive post transaction may be submitted to the blockchain (e.g., by a receiver NBSA server) at 2241. In one implementation, the receive post transaction may be broadcast to the blockchain and may contain transaction details (e.g., receiver identifier, associated transfer transaction identifier, approval status, date and/or time) for the receiver's receive transaction. For example, a receive post transaction structured similar to the following may be utilized:

```
POST /receive_transaction.php HTTP/1.1
Host: www.server.com
Content-Type: Application/XML
Content-Length: 667
<?XML version = "1.0" encoding = "UTF-8"?>
<receive_transaction>
  <reciever_id>sender_123</reciever_id>
  <transaction_id>transaction_345</transaction_id>
  <epoch_time>1347159534</epoch_time>
  <approval_status>OK</approval_status>
</receive_transaction>
```

A receive post transaction notification may be provided to the transfer transaction handling smart contract at 2245. In one implementation, a blockchain transaction may be sent to the transfer transaction handling smart contract (e.g., via a receive post request) to notify the transfer transaction handling smart contract regarding the receive post transaction.

If the transaction processing type associated with the transfer transaction processing request is verify (e.g., confirming that the verifier verified the transfer transaction), a verify post transaction may be submitted to the blockchain (e.g., by a verifier NBSA server) at 2251. In one implementation, the verify post transaction may be broadcast to the blockchain and may contain transaction details (e.g., verifier identifier, associated transfer transaction identifier, approval status, date and/or time) for the verifier's verify transaction. For example, a verify post transaction structured similar to the following may be utilized:

```
POST /verify_transaction.php HTTP/1.1
Host: www.server.com
Content-Type: Application/XML
```

-continued

```
Content-Length: 667
<?XML version = "1.0" encoding = "UTF-8"?>
<verify_transaction>
  <verifier_id>sender_123</verifier_id>
  <transaction_id>transaction_345</transaction_id>
  <epoch_time>1347159534</epoch_time>
  <approval_status>OK</approval_status>
</verify_transaction>
```

A verify post transaction notification may be provided to the transfer transaction handling smart contract at 2255. In one implementation, a blockchain transaction may be sent to the transfer transaction handling smart contract (e.g., via a verification post request) to notify the transfer transaction handling smart contract regarding the verify post transaction.

If the transaction processing type associated with the transfer transaction processing request is clawback (e.g., initiating clawback of the transfer transaction), a clawback post transaction may be submitted to the blockchain (e.g., by the sender NBSA server) at 2261. In one implementation, the clawback post transaction may be broadcast to the blockchain and may contain transaction details (e.g., sender identifier, associated transfer transaction identifier, date and/or time) for the sender's clawback transaction. For example, a clawback post transaction structured similar to the following may be utilized:

```
POST /clawback_transaction.php HTTP/1.1
Host: www.server.com
Content-Type: Application/XML
Content-Length: 667
<?XML version = "1.0" encoding = "UTF-8"?>
<clawback_transaction>
  <sender_id>sender_123</sender_id>
  <transaction_id>transaction_345</transaction_id>
  <epoch_time>1347159534</epoch_time>
</clawback_transaction>
```

A clawback post transaction notification may be provided to the transfer transaction handling smart contract at 2265. In one implementation, a blockchain transaction may be sent to the transfer transaction handling smart contract (e.g., via a clawback post request) to notify the transfer transaction handling smart contract regarding the clawback post transaction.

FIG. 23 shows non-limiting, example embodiments of implementation case(s) for the NBSA. In FIG. 23, an exemplary implementation case for a transfer transaction handling smart contract is illustrated. In FIG. 23, a transaction notification function call may be obtained at 2301. For example, the transaction notification function call may be obtained as a result of a function call to one of the functions (e.g., notifySend( . . . ), notifyReceive( . . . ), notifyVerify( . . . ), notifyClawback( . . . )) implemented by the transfer transaction handling smart contract from a TTP component via a node (e.g., a sender NBSA server, a receiver NBSA server, a verifier NBSA server).

Authorization for the transaction notification function call may be verified at 2305. In one embodiment, verification may be performed to ensure that the transaction notification function call was made by an authorized entity (e.g., an authorized node). In one implementation, authorization for the transaction notification function call may be verified via Solidity commands (e.g., via a require( ) statement) that implement access control (e.g., ownable access control, role-based access control) for the functions implemented by the transfer transaction handling smart contract.

A determination may be made at 2309 regarding a transaction notification type associated with the transaction notification function call. In one implementation, the transaction notification type may correspond to the function specified by the transaction notification function call.

If the transaction notification type associated with the transaction notification function call is send (e.g., a call to notifySend( . . . ) function), a send post transaction specified via the function call (e.g., via a transaction identifier) may be validated at 2331. In one implementation, the transaction identifier of the send post transaction may be used to retrieve transaction data from the blockchain, and the transaction data may be analyzed to verify that the send post transaction is cryptographically signed by a sender. In some implementations, the transaction data may be analyzed to determine and/or check transaction details specified by the send post transaction (e.g., a transfer transaction identifier) and/or to verify that the transaction details satisfy any additional rules used to validate send post transactions. For example, compliance with a set of predefined transfer rules specifying maximum exposure to an asset, security or sector, constitution of a portfolio, trading authorization and fiduciary compliance, access control rules (e.g., being in a certain user group (e.g., administrators, employee of a specific department), time of day restrictions on access, number of allowed accesses), and/or the like may be checked.

Submission of the send post transaction may be recorded at 2335. In one implementation, variables of the transfer transaction handling smart contract may be modified to record the submission of the send post transaction. For example, a new entry may be added to a hash table (e.g., a Solidity mapping) that uses a transfer transaction identifier as a key and a post transactions record datastructure (e.g., a hash table that uses post transaction type as a key and the number of submitted post transactions of that type as a value) that stores information regarding the (e.g., number of) post transactions of different post transaction types (e.g., send, receive, verify, clawback) associated with the transfer transaction identifier that were submitted to the transfer transaction handling smart contract as a value.

If the transaction notification type associated with the transaction notification function call is receive (e.g., a call to notifyReceive( . . . ) function), a receive post transaction specified via the function call (e.g., via a transaction identifier) may be validated at 2341. In one implementation, the transaction identifier of the receive post transaction may be used to retrieve transaction data from the blockchain, and the transaction data may be analyzed to verify that the receive post transaction is cryptographically signed by a receiver. In some implementations, the transaction data may be analyzed to determine and/or check transaction details specified by the receive post transaction. For example, a transfer transaction identifier associated with the receive post transaction may be determined. In another example, an approval status associated with the receive post transaction may be checked. In some implementations, the number of previously submitted verify post transactions associated with the transfer transaction identifier may be checked to confirm that a threshold number of verify post transactions (e.g., at least 3 verify post transactions) have been submitted by verifiers (e.g., 1 per verifier). In some implementations, the number of previously submitted clawback post transactions associated with the transfer transaction identifier may be checked to confirm that an allowed clawback post transaction has not been submitted by the sender.

Submission of the receive post transaction may be recorded at 2345. In one implementation, variables of the transfer transaction handling smart contract may be modified to record the submission of the receive post transaction. For example, the post transactions record datastructure (e.g., used as a value in the hash table) associated with the transfer transaction identifier (e.g., used as a key in the hash table) may be modified to indicate submission of the receive post transaction (e.g., set the number of submitted receive post transactions to 1).

Funds associated with the transfer transaction identifier may be released to a recipient at 2349. In one implementation, the transfer transaction handling smart contract may transfer (e.g., via a Solidity transfer( ) function) funds (e.g., transaction amount associated with the transfer transaction identifier) from the transfer transaction handling smart contract to the receiver.

If the transaction notification type associated with the transaction notification function call is verify (e.g., a call to notifyVerify( . . . ) function), a verify post transaction specified via the function call (e.g., via a transaction identifier) may be validated at 2351. In one implementation, the transaction identifier of the verify post transaction may be used to retrieve transaction data from the blockchain, and the transaction data may be analyzed to verify that the verify post transaction is cryptographically signed by a verifier. In some implementations, the transaction data may be analyzed to determine and/or check transaction details specified by the verify post transaction. For example, a transfer transaction identifier associated with the verify post transaction may be determined. In another example, an approval status associated with the verify post transaction may be checked.

Submission of the verify post transaction may be recorded at 2355. In one implementation, variables of the transfer transaction handling smart contract may be modified to record the submission of the verify post transaction. For example, the post transactions record datastructure (e.g., used as a value in the hash table) associated with the transfer transaction identifier (e.g., used as a key in the hash table) may be modified to indicate submission of the verify post transaction (e.g., the number of submitted verify post transactions may be incremented by 1).

If the transaction notification type associated with the transaction notification function call is clawback (e.g., a call to notifyClawback( . . . ) function), a clawback post transaction specified via the function call (e.g., via a transaction identifier) may be validated at 2361. In one implementation, the transaction identifier of the clawback post transaction may be used to retrieve transaction data from the blockchain, and the transaction data may be analyzed to verify that the clawback post transaction is cryptographically signed by the sender (e.g., or by another authorized entity). In some implementations, the transaction data may be analyzed to determine and/or check transaction details specified by the clawback post transaction (e.g., a transfer transaction identifier) and/or to verify that the transaction details satisfy any additional rules used to validate clawback post transactions. For example, compliance with a set of predefined clawback rules specifying conditions under which funds may be clawed back may be checked. In one embodiment, a set of clawback rules discussed with regard to 2365 through 2381 may be utilized, however, it is to be understood that different transfer transaction handling smart contracts may, in various embodiments, utilize different sets of clawback rules.

In one embodiment, a clawback post transaction submission time may be determined at 2365. In one implementation, the transaction details specified by the clawback post transaction may be analyzed to determine the clawback post transaction submission time (e.g., date and/or time). A determination may be made at 2369 whether a clawback timer rule was exceeded by the clawback post transaction submission time. For example, the clawback timer rule may specify that a clawback transaction may be executed if less than a specified time period (e.g., fewer than 60 seconds) elapsed since a first transaction (e.g., based on the date and/or time specified by the send post transaction). If the clawback timer rule was exceeded by the clawback post transaction submission time, execution of the sender's clawback transaction may be denied at 2373. In one implementation, a message indicating that the clawback timer rule was exceeded may be generated. If the clawback timer rule was not exceeded by the clawback post transaction submission time, a determination may be made at 2377 whether a threshold verify post transactions rule was exceeded for the transfer transaction identifier. For example, the threshold verify post transactions rule may specify that a clawback transaction may be executed if fewer than a threshold number of verify post transactions (e.g., fewer than 3 verify post transactions) have been submitted by verifiers. If the threshold verify post transactions rule was exceeded for the transfer transaction identifier, execution of the sender's clawback transaction may be denied at 2373. If the threshold verify post transactions rule was not exceeded for the transfer transaction identifier, funds associated with the transfer transaction identifier may be returned to the sender at 2381. In one implementation, the transfer transaction handling smart contract may transfer (e.g., via a Solidity transfer( ) function) funds (e.g., transaction amount associated with the transfer transaction identifier) from the transfer transaction handling smart contract to the sender. In some implementations, variables of the transfer transaction handling smart contract may be modified to record the submission of the clawback post transaction. For example, the post transactions record datastructure (e.g., used as a value in the hash table) associated with the transfer transaction identifier (e.g., used as a key in the hash table) may be modified to indicate submission of the (e.g., allowed) clawback post transaction (e.g., set the number of submitted clawback post transactions to 1).

FIG. 24 shows non-limiting, example embodiments of implementation case(s) for the NBSA. In FIG. 24, exemplary nodes including a node type, a node quality, and node rights for each exemplary node are illustrated.

FIG. 25 shows non-limiting, example embodiments of implementation case(s) for the NBSA. In FIG. 25, exemplary use cases including a use case description and data elements utilized for each exemplary use case are illustrated.

FIG. 26 shows non-limiting, example embodiments of implementation case(s) for the NBSA. In FIG. 26, an exemplary matrix of clawback use cases is illustrated. Exemplary rules that should be satisfied to execute a clawback transaction (e.g., time since first transaction, time since last transaction, dollar amounts) for each exemplary use case are illustrated. In various implementations, the exemplary rules may be implemented via smart contracts, configuration settings (e.g., polices, procedures), and/or the like.

ADDITIONAL ALTERNATIVE EMBODIMENT EXAMPLES

The following alternative example embodiments provide a number of variations of some of the already discussed principles for expanded color on the abilities of the NBSA.

Additional embodiments may include:

101. An authenticating NFT generating apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, an authenticating NFT generation request datastructure structured to specify a set of source asset identifiers and an owner blockchain address;

obtain, via the at least one processor, for each respective source asset identifier in the set of source asset identifiers, source asset data associated with the respective source asset identifier;

generate, via the at least one processor, for each respective source asset identifier in the set of source asset identifiers, a hash of the source asset data associated with the respective source asset identifier;

store, via the at least one processor, for each respective source asset identifier in the set of source asset identifiers, a source asset object associated with the respective source asset identifier in an adjunct repository, in which the source asset object associated with the respective source asset identifier is structured to specify the source asset data and the hash of the source asset data;

generate, via the at least one processor, a master hash from the generated hashes of source asset data associated with the set of source asset identifiers;

generate, via the at least one processor, an NFT metadata datastructure structured to specify the master hash and a link to each source asset object associated with the set of source asset identifiers; and mint, via the at least one processor, an authenticating NFT by sending a blockchain transaction to an authenticating NFT smart contract deployed on a blockchain, in which the authenticating NFT smart contract is structured to associate the generated NFT metadata datastructure and the owner blockchain address with the authenticating NFT.

102. The apparatus of embodiment 101, in which source asset data associated with a source asset identifier is structured to comprise a set of constituent data elements.

103. The apparatus of embodiment 101, in which source asset data associated with a source asset identifier is obtained via a URI associated with the source asset identifier.

104. The apparatus of embodiment 101, in which source asset data associated with a source asset identifier is obtained via an upload associated with the source asset identifier.

105. The apparatus of embodiment 101, in which source asset data associated with a source asset identifier is obtained via a smart contract associated with the source asset identifier.

106. The apparatus of embodiment 101, in which a source asset object associated with a source asset identifier is stored in the adjunct repository such that a hash of source asset data associated with the source asset identifier is utilized as a key to the source asset object in the adjunct repository.

107. The apparatus of embodiment 101, in which a hash of source asset data associated with a source asset identifier is generated via a cryptographic hash function applied to a set of constituent data elements that comprise the source asset data associated with the source asset identifier.

108. The apparatus of embodiment 107, in which the master hash is generated via the cryptographic hash function applied to the generated hashes of source asset data associated with the set of source asset identifiers.

109. The apparatus of embodiment 101, in which a link, specified via the NFT metadata datastructure to a source asset object associated with a source asset identifier, is structured to include a hash of source asset data associated with the source asset identifier.

110. The apparatus of embodiment 101, in which the NFT metadata datastructure is structured to specify an image associated with the authenticating NFT.

111. The apparatus of embodiment 101, in which the image associated with the authenticating NFT corresponds to an NFT type associated with the authenticating NFT.

112. The apparatus of embodiment 101, in which the image associated with the authenticating NFT corresponds to an image associated with a source asset identifier from the set of source asset identifiers.

113. The apparatus of embodiment 101, in which the owner blockchain address is a blockchain wallet address.

114. The apparatus of embodiment 101, in which the authenticating NFT smart contract is structured as a smart contract implementing ERC-721 standard.

115. The apparatus of embodiment 101, in which the blockchain is one of: Solana, Ethereum, Polygon.

116. An authenticating NFT generating processor-readable, non-transient medium, the medium storing a component collection, the component collection storage structured with processor-executable instructions comprising:

obtain, via the at least one processor, an authenticating NFT generation request datastructure structured to specify a set of source asset identifiers and an owner blockchain address;

obtain, via the at least one processor, for each respective source asset identifier in the set of source asset identifiers, source asset data associated with the respective source asset identifier;

generate, via the at least one processor, for each respective source asset identifier in the set of source asset identifiers, a hash of the source asset data associated with the respective source asset identifier;

store, via the at least one processor, for each respective source asset identifier in the set of source asset identifiers, a source asset object associated with the respective source asset identifier in an adjunct repository, in which the source asset object associated with the respective source asset identifier is structured to specify the source asset data and the hash of the source asset data;

generate, via the at least one processor, a master hash from the generated hashes of source asset data associated with the set of source asset identifiers;

generate, via the at least one processor, an NFT metadata datastructure structured to specify the master hash and a link to each source asset object associated with the set of source asset identifiers; and mint, via the at least one processor, an authenticating NFT by sending a blockchain transaction to an authenticating NFT smart contract deployed on a blockchain, in which the authenticating NFT smart contract is structured to associate the generated NFT metadata datastructure and the owner blockchain address with the authenticating NFT.

117. The medium of embodiment 116, in which source asset data associated with a source asset identifier is structured to comprise a set of constituent data elements.

118. The medium of embodiment 116, in which source asset data associated with a source asset identifier is obtained via a URI associated with the source asset identifier.

119. The medium of embodiment 116, in which source asset data associated with a source asset identifier is obtained via an upload associated with the source asset identifier.

120. The medium of embodiment 116, in which source asset data associated with a source asset identifier is obtained via a smart contract associated with the source asset identifier.

121. The medium of embodiment 116, in which a source asset object associated with a source asset identifier is stored in the adjunct repository such that a hash of source asset data associated with the source asset identifier is utilized as a key to the source asset object in the adjunct repository.

122. The medium of embodiment 116, in which a hash of source asset data associated with a source asset identifier is generated via a cryptographic hash function applied to a set of constituent data elements that comprise the source asset data associated with the source asset identifier.

123. The medium of embodiment 122, in which the master hash is generated via the cryptographic hash function applied to the generated hashes of source asset data associated with the set of source asset identifiers.

124. The medium of embodiment 116, in which a link, specified via the NFT metadata datastructure to a source asset object associated with a source asset identifier, is structured to include a hash of source asset data associated with the source asset identifier.

125. The medium of embodiment 116, in which the NFT metadata datastructure is structured to specify an image associated with the authenticating NFT.

126. The medium of embodiment 116, in which the image associated with the authenticating NFT corresponds to an NFT type associated with the authenticating NFT.

127. The medium of embodiment 116, in which the image associated with the authenticating NFT corresponds to an image associated with a source asset identifier from the set of source asset identifiers.

128. The medium of embodiment 116, in which the owner blockchain address is a blockchain wallet address.

129. The medium of embodiment 116, in which the authenticating NFT smart contract is structured as a smart contract implementing ERC-721 standard.

130. The medium of embodiment 116, in which the blockchain is one of: Solana, Ethereum, Polygon.

131. An authenticating NFT generating processor-implemented system, comprising:

means to store a component collection;

means to process processor-executable instructions from the component collection, the component collection storage structured with processor-executable instructions including:

obtain, via the at least one processor, an authenticating NFT generation request datastructure structured to specify a set of source asset identifiers and an owner blockchain address;

obtain, via the at least one processor, for each respective source asset identifier in the set of source asset identifiers, source asset data associated with the respective source asset identifier;

generate, via the at least one processor, for each respective source asset identifier in the set of source asset identifiers, a hash of the source asset data associated with the respective source asset identifier;

store, via the at least one processor, for each respective source asset identifier in the set of source asset identifiers, a source asset object associated with the respective source asset identifier in an adjunct repository, in which the source asset object associated with the respective source asset identifier is structured to specify the source asset data and the hash of the source asset data;

generate, via the at least one processor, a master hash from the generated hashes of source asset data associated with the set of source asset identifiers;

generate, via the at least one processor, an NFT metadata datastructure structured to specify the master hash and a link to each source asset object associated with the set of source asset identifiers; and mint, via the at least one processor, an authenticating NFT by sending a blockchain transaction to an authenticating NFT smart contract deployed on a blockchain, in which the authenticating NFT smart contract is structured to associate the generated NFT metadata datastructure and the owner blockchain address with the authenticating NFT.

132. The system of embodiment 131, in which source asset data associated with a source asset identifier is structured to comprise a set of constituent data elements.

133. The system of embodiment 131, in which source asset data associated with a source asset identifier is obtained via a URI associated with the source asset identifier.

134. The system of embodiment 131, in which source asset data associated with a source asset identifier is obtained via an upload associated with the source asset identifier.

135. The system of embodiment 131, in which source asset data associated with a source asset identifier is obtained via a smart contract associated with the source asset identifier.

136. The system of embodiment 131, in which a source asset object associated with a source asset identifier is stored in the adjunct repository such that a hash of source asset data associated with the source asset identifier is utilized as a key to the source asset object in the adjunct repository.

137. The system of embodiment 131, in which a hash of source asset data associated with a source asset identifier is generated via a cryptographic hash function applied to a set of constituent data elements that comprise the source asset data associated with the source asset identifier.

138. The system of embodiment 137, in which the master hash is generated via the cryptographic hash function applied to the generated hashes of source asset data associated with the set of source asset identifiers.

139. The system of embodiment 131, in which a link, specified via the NFT metadata datastructure to a source asset object associated with a source asset identifier, is structured to include a hash of source asset data associated with the source asset identifier.

140. The system of embodiment 131, in which the NFT metadata datastructure is structured to specify an image associated with the authenticating NFT.

141. The system of embodiment 131, in which the image associated with the authenticating NFT corresponds to an NFT type associated with the authenticating NFT.

142. The system of embodiment 131, in which the image associated with the authenticating NFT corresponds to an image associated with a source asset identifier from the set of source asset identifiers.

143. The system of embodiment 131, in which the owner blockchain address is a blockchain wallet address.

144. The system of embodiment 131, in which the authenticating NFT smart contract is structured as a smart contract implementing ERC-721 standard.

145. The system of embodiment 131, in which the blockchain is one of: Solana, Ethereum, Polygon.

146. An authenticating NFT generating processor-implemented process, including processing processor-executable instructions via at least one processor from a component collection stored in at least one memory, the component collection storage structured with processor-executable instructions comprising:

obtain, via the at least one processor, an authenticating NFT generation request datastructure structured to specify a set of source asset identifiers and an owner blockchain address;

obtain, via the at least one processor, for each respective source asset identifier in the set of source asset identifiers, source asset data associated with the respective source asset identifier;

generate, via the at least one processor, for each respective source asset identifier in the set of source asset identifiers, a hash of the source asset data associated with the respective source asset identifier;

store, via the at least one processor, for each respective source asset identifier in the set of source asset identifiers, a source asset object associated with the respective source asset identifier in an adjunct repository, in which the source asset object associated with the respective source asset identifier is structured to specify the source asset data and the hash of the source asset data;

generate, via the at least one processor, a master hash from the generated hashes of source asset data associated with the set of source asset identifiers;

generate, via the at least one processor, an NFT metadata datastructure structured to specify the master hash and a link to each source asset object associated with the set of source asset identifiers; and mint, via the at least one processor, an authenticating NFT by sending a blockchain transaction to an authenticating NFT smart contract deployed on a blockchain, in which the authenticating NFT smart contract is structured to associate the generated NFT metadata datastructure and the owner blockchain address with the authenticating NFT.

147. The process of embodiment 146, in which source asset data associated with a source asset identifier is structured to comprise a set of constituent data elements.

148. The process of embodiment 146, in which source asset data associated with a source asset identifier is obtained via a URI associated with the source asset identifier.

149. The process of embodiment 146, in which source asset data associated with a source asset identifier is obtained via an upload associated with the source asset identifier.

150. The process of embodiment 146, in which source asset data associated with a source asset identifier is obtained via a smart contract associated with the source asset identifier.

151. The process of embodiment 146, in which a source asset object associated with a source asset identifier is stored in the adjunct repository such that a hash of source asset data associated with the source asset identifier is utilized as a key to the source asset object in the adjunct repository.

152. The process of embodiment 146, in which a hash of source asset data associated with a source asset identifier is generated via a cryptographic hash function applied to a set of constituent data elements that comprise the source asset data associated with the source asset identifier.

153. The process of embodiment 152, in which the master hash is generated via the cryptographic hash function applied to the generated hashes of source asset data associated with the set of source asset identifiers.

154. The process of embodiment 146, in which a link, specified via the NFT metadata datastructure to a source asset object associated with a source asset identifier, is structured to include a hash of source asset data associated with the source asset identifier.

155. The process of embodiment 146, in which the NFT metadata datastructure is structured to specify an image associated with the authenticating NFT.

156. The process of embodiment 146, in which the image associated with the authenticating NFT corresponds to an NFT type associated with the authenticating NFT.

157. The process of embodiment 146, in which the image associated with the authenticating NFT corresponds to an image associated with a source asset identifier from the set of source asset identifiers.

158. The process of embodiment 146, in which the owner blockchain address is a blockchain wallet address.

159. The process of embodiment 146, in which the authenticating NFT smart contract is structured as a smart contract implementing ERC-721 standard.

160. The process of embodiment 146, in which the blockchain is one of: Solana, Ethereum, Polygon.

201. An authenticating NFT evaluating apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, from a requestor, an NFT authentication request datastructure structured to specify an authenticating NFT identifier and authorization data;

determine, via the at least one processor, an owner blockchain address associated with the authenticating NFT identifier by sending a first blockchain transaction to an authenticating NFT smart contract deployed on a blockchain;

evaluate, via the at least one processor, the authorization data to verify that the authorization data establishes control over the owner blockchain address associated with the authenticating NFT identifier;

obtain, via the at least one processor, an NFT metadata datastructure associated with the authenticating NFT identifier by sending a second blockchain transaction to the authenticating NFT smart contract deployed on the blockchain;

determine, via the at least one processor, by querying the NFT metadata datastructure, a master hash associated with the authenticating NFT identifier;

determine, via the at least one processor, by querying the NFT metadata datastructure, a set of source asset datastructures associated with the authenticating NFT identifier;

determine, via the at least one processor, for each respective source asset datastructure in the set of source asset datastructures, a hash of source asset data associated with the respective source asset datastructure;

generate, via the at least one processor, a master hash from the determined hashes of source asset data associated with the set of source asset datastructures;

verify, via the at least one processor, that the retrieved master hash matches the generated master hash; and provide, via the at least one processor, an authentication success indication to the requestor.

202. The apparatus of embodiment 201, in which the requestor is a client device of a user owner associated with the owner blockchain address.

203. The apparatus of embodiment 202, in which the client device of the user owner provides the NFT authentication request datastructure via one of: a QR code, a Bluetooth signal, an NFC signal.

204. The apparatus of embodiment 201, in which the requestor is an authentication application or an authentication device accessed by a user owner associated with the owner blockchain address.

205. The apparatus of embodiment 204, in which the authentication application or the authentication device generates the NFT authentication request datastructure from data provided via a client device of the user owner.

206. The apparatus of embodiment 201, in which the authorization data comprises a password to a cryptographic wallet corresponding to the owner blockchain address.

207. The apparatus of embodiment 201, in which the authorization data comprises a message signed with a private key associated with a cryptographic wallet corresponding to the owner blockchain address.

208. The apparatus of embodiment 201, in which the component collection storage is further structured with processor-executable instructions, comprising:

verify, via the at least one processor, that a user identifier provided by the requestor matches a user identifier associated with the authenticating NFT identifier.

209. The apparatus of embodiment 201, in which the component collection storage is further structured with processor-executable instructions, comprising:

verify, via the at least one processor, that the authenticating NFT identifier has not been recalled.

210. The apparatus of embodiment 201, in which the instructions to determine the master hash associated with the authenticating NFT identifier are structured as instructions to reconstruct the master hash from a plurality of master hash portions, in which one master hash portion is obtained by querying the NFT metadata datastructure associated with the authenticating NFT identifier, and in which another master hash portion is obtained by querying an NFT metadata datastructure associated with another authenticating NFT identifier.

211. The apparatus of embodiment 201, in which a hash of source asset data associated with a source asset datastructure is retrieved from an adjunct repository.

212. The apparatus of embodiment 201, in which a hash of source asset data associated with a source asset datastructure is recalculated via a cryptographic hash function applied to a set of constituent data elements that comprise the source asset data associated with the source asset datastructure.

213. The apparatus of embodiment 201, in which the generated master hash is generated via a cryptographic hash function applied to the determined hashes of source asset data associated with the set of source asset datastructures.

214. The apparatus of embodiment 201, in which the component collection storage is further structured with processor-executable instructions, comprising:

verify, via the at least one processor, that an additional predefined rule enforced via a corresponding smart contract is satisfied.

215. The apparatus of embodiment 201, in which the authentication success indication includes an authentication token.

216. An authenticating NFT evaluating processor-readable, non-transient medium, the medium storing a component collection, the component collection storage structured with processor-executable instructions comprising:

obtain, via the at least one processor, from a requestor, an NFT authentication request datastructure structured to specify an authenticating NFT identifier and authorization data;

determine, via the at least one processor, an owner blockchain address associated with the authenticating NFT identifier by sending a first blockchain transaction to an authenticating NFT smart contract deployed on a blockchain;

evaluate, via the at least one processor, the authorization data to verify that the authorization data establishes control over the owner blockchain address associated with the authenticating NFT identifier;

obtain, via the at least one processor, an NFT metadata datastructure associated with the authenticating NFT identifier by sending a second blockchain transaction to the authenticating NFT smart contract deployed on the blockchain;

determine, via the at least one processor, by querying the NFT metadata datastructure, a master hash associated with the authenticating NFT identifier;

determine, via the at least one processor, by querying the NFT metadata datastructure, a set of source asset datastructures associated with the authenticating NFT identifier;

determine, via the at least one processor, for each respective source asset datastructure in the set of source asset datastructures, a hash of source asset data associated with the respective source asset datastructure;

generate, via the at least one processor, a master hash from the determined hashes of source asset data associated with the set of source asset datastructures;

verify, via the at least one processor, that the retrieved master hash matches the generated master hash; and provide, via the at least one processor, an authentication success indication to the requestor.

217. The medium of embodiment 216, in which the requestor is a client device of a user owner associated with the owner blockchain address.

218. The medium of embodiment 217, in which the client device of the user owner provides the NFT authentication request datastructure via one of: a QR code, a Bluetooth signal, an NFC signal.

219. The medium of embodiment 216, in which the requestor is an authentication application or an authentication device accessed by a user owner associated with the owner blockchain address.

220. The medium of embodiment 219, in which the authentication application or the authentication device generates the NFT authentication request datastructure from data provided via a client device of the user owner.

221. The medium of embodiment 216, in which the authorization data comprises a password to a cryptographic wallet corresponding to the owner blockchain address.

222. The medium of embodiment 216, in which the authorization data comprises a message signed with a private key associated with a cryptographic wallet corresponding to the owner blockchain address.

223. The medium of embodiment 216, in which the component collection storage is further structured with processor-executable instructions, comprising:

verify, via the at least one processor, that a user identifier provided by the requestor matches a user identifier associated with the authenticating NFT identifier.

224. The medium of embodiment 216, in which the component collection storage is further structured with processor-executable instructions, comprising:

verify, via the at least one processor, that the authenticating NFT identifier has not been recalled.

225. The medium of embodiment 216, in which the instructions to determine the master hash associated with the authenticating NFT identifier are structured as instructions to reconstruct the master hash from a plurality of master hash portions, in which one master hash portion is obtained by querying the NFT metadata datastructure associated with the authenticating NFT identifier, and in which another master hash portion is obtained by querying an NFT metadata datastructure associated with another authenticating NFT identifier.

226. The medium of embodiment 216, in which a hash of source asset data associated with a source asset datastructure is retrieved from an adjunct repository.

227. The medium of embodiment 216, in which a hash of source asset data associated with a source asset datastructure is recalculated via a cryptographic hash function applied to a set of constituent data elements that comprise the source asset data associated with the source asset datastructure.

228. The medium of embodiment 216, in which the generated master hash is generated via a cryptographic hash function applied to the determined hashes of source asset data associated with the set of source asset datastructures.

229. The medium of embodiment 216, in which the component collection storage is further structured with processor-executable instructions, comprising:

verify, via the at least one processor, that an additional predefined rule enforced via a corresponding smart contract is satisfied.

230. The medium of embodiment 216, in which the authentication success indication includes an authentication token.

231. An authenticating NFT evaluating processor-implemented system, comprising:

means to store a component collection;

means to process processor-executable instructions from the component collection, the component collection storage structured with processor-executable instructions including:

obtain, via the at least one processor, from a requestor, an NFT authentication request datastructure structured to specify an authenticating NFT identifier and authorization data;

determine, via the at least one processor, an owner blockchain address associated with the authenticating NFT identifier by sending a first blockchain transaction to an authenticating NFT smart contract deployed on a blockchain;

evaluate, via the at least one processor, the authorization data to verify that the authorization data establishes control over the owner blockchain address associated with the authenticating NFT identifier;

obtain, via the at least one processor, an NFT metadata datastructure associated with the authenticating NFT identifier by sending a second blockchain transaction to the authenticating NFT smart contract deployed on the blockchain;

determine, via the at least one processor, by querying the NFT metadata datastructure, a master hash associated with the authenticating NFT identifier;

determine, via the at least one processor, by querying the NFT metadata datastructure, a set of source asset datastructures associated with the authenticating NFT identifier;

determine, via the at least one processor, for each respective source asset datastructure in the set of source asset datastructures, a hash of source asset data associated with the respective source asset datastructure;

generate, via the at least one processor, a master hash from the determined hashes of source asset data associated with the set of source asset datastructures;

verify, via the at least one processor, that the retrieved master hash matches the generated master hash; and provide, via the at least one processor, an authentication success indication to the requestor.

232. The system of embodiment 231, in which the requestor is a client device of a user owner associated with the owner blockchain address.
233. The system of embodiment 232, in which the client device of the user owner provides the NFT authentication request datastructure via one of: a QR code, a Bluetooth signal, an NFC signal.
234. The system of embodiment 231, in which the requestor is an authentication application or an authentication device accessed by a user owner associated with the owner blockchain address.
235. The system of embodiment 234, in which the authentication application or the authentication device generates the NFT authentication request datastructure from data provided via a client device of the user owner.
236. The system of embodiment 231, in which the authorization data comprises a password to a cryptographic wallet corresponding to the owner blockchain address.
237. The system of embodiment 231, in which the authorization data comprises a message signed with a private key associated with a cryptographic wallet corresponding to the owner blockchain address.
238. The system of embodiment 231, in which the component collection storage is further structured with processor-executable instructions, comprising:
    verify, via the at least one processor, that a user identifier provided by the requestor matches a user identifier associated with the authenticating NFT identifier.
239. The system of embodiment 231, in which the component collection storage is further structured with processor-executable instructions, comprising:
    verify, via the at least one processor, that the authenticating NFT identifier has not been recalled.
240. The system of embodiment 231, in which the instructions to determine the master hash associated with the authenticating NFT identifier are structured as instructions to reconstruct the master hash from a plurality of master hash portions, in which one master hash portion is obtained by querying the NFT metadata datastructure associated with the authenticating NFT identifier, and in which another master hash portion is obtained by querying an NFT metadata datastructure associated with another authenticating NFT identifier.
241. The system of embodiment 231, in which a hash of source asset data associated with a source asset datastructure is retrieved from an adjunct repository.
242. The system of embodiment 231, in which a hash of source asset data associated with a source asset datastructure is recalculated via a cryptographic hash function applied to a set of constituent data elements that comprise the source asset data associated with the source asset datastructure.
243. The system of embodiment 231, in which the generated master hash is generated via a cryptographic hash function applied to the determined hashes of source asset data associated with the set of source asset datastructures.
244. The system of embodiment 231, in which the component collection storage is further structured with processor-executable instructions, comprising:
    verify, via the at least one processor, that an additional predefined rule enforced via a corresponding smart contract is satisfied.
245. The system of embodiment 231, in which the authentication success indication includes an authentication token.
246. An authenticating NFT evaluating processor-implemented process, including processing processor-executable instructions via at least one processor from a component collection stored in at least one memory, the component collection storage structured with processor-executable instructions comprising:
    obtain, via the at least one processor, from a requestor, an NFT authentication request datastructure structured to specify an authenticating NFT identifier and authorization data;
    determine, via the at least one processor, an owner blockchain address associated with the authenticating NFT identifier by sending a first blockchain transaction to an authenticating NFT smart contract deployed on a blockchain;
    evaluate, via the at least one processor, the authorization data to verify that the authorization data establishes control over the owner blockchain address associated with the authenticating NFT identifier;
    obtain, via the at least one processor, an NFT metadata datastructure associated with the authenticating NFT identifier by sending a second blockchain transaction to the authenticating NFT smart contract deployed on the blockchain;
    determine, via the at least one processor, by querying the NFT metadata datastructure, a master hash associated with the authenticating NFT identifier;
    determine, via the at least one processor, by querying the NFT metadata datastructure, a set of source asset datastructures associated with the authenticating NFT identifier;
    determine, via the at least one processor, for each respective source asset datastructure in the set of source asset datastructures, a hash of source asset data associated with the respective source asset datastructure;
    generate, via the at least one processor, a master hash from the determined hashes of source asset data associated with the set of source asset datastructures;
    verify, via the at least one processor, that the retrieved master hash matches the generated master hash; and
    provide, via the at least one processor, an authentication success indication to the requestor.
247. The process of embodiment 246, in which the requestor is a client device of a user owner associated with the owner blockchain address.
248. The process of embodiment 247, in which the client device of the user owner provides the NFT authentication request datastructure via one of: a QR code, a Bluetooth signal, an NFC signal.
249. The process of embodiment 246, in which the requestor is an authentication application or an authentication device accessed by a user owner associated with the owner blockchain address.
250. The process of embodiment 249, in which the authentication application or the authentication device generates the NFT authentication request datastructure from data provided via a client device of the user owner.
251. The process of embodiment 246, in which the authorization data comprises a password to a cryptographic wallet corresponding to the owner blockchain address.
252. The process of embodiment 246, in which the authorization data comprises a message signed with a private key associated with a cryptographic wallet corresponding to the owner blockchain address.

253. The process of embodiment 246, in which the component collection storage is further structured with processor-executable instructions, comprising:
verify, via the at least one processor, that a user identifier provided by the requestor matches a user identifier associated with the authenticating NFT identifier.

254. The process of embodiment 246, in which the component collection storage is further structured with processor-executable instructions, comprising:
verify, via the at least one processor, that the authenticating NFT identifier has not been recalled.

255. The process of embodiment 246, in which the instructions to determine the master hash associated with the authenticating NFT identifier are structured as instructions to reconstruct the master hash from a plurality of master hash portions, in which one master hash portion is obtained by querying the NFT metadata datastructure associated with the authenticating NFT identifier, and in which another master hash portion is obtained by querying an NFT metadata datastructure associated with another authenticating NFT identifier.

256. The process of embodiment 246, in which a hash of source asset data associated with a source asset datastructure is retrieved from an adjunct repository.

257. The process of embodiment 246, in which a hash of source asset data associated with a source asset datastructure is recalculated via a cryptographic hash function applied to a set of constituent data elements that comprise the source asset data associated with the source asset datastructure.

258. The process of embodiment 246, in which the generated master hash is generated via a cryptographic hash function applied to the determined hashes of source asset data associated with the set of source asset datastructures.

259. The process of embodiment 246, in which the component collection storage is further structured with processor-executable instructions, comprising:
verify, via the at least one processor, that an additional predefined rule enforced via a corresponding smart contract is satisfied.

260. The process of embodiment 246, in which the authentication success indication includes an authentication token.

301. An NFT-based document publication notification message generating apparatus, comprising:
at least one memory;
a component collection stored in the at least one memory;
at least one processor disposed in communication with the at least one memory, the at least one processor executing processor-executable instructions from the component collection, the component collection storage structured with processor-executable instructions, comprising:
obtain, via the at least one processor, a document publishing request datastructure structured to specify a set of document info fields associated with a document, in which the set of document info fields includes a document identifier and document contents;
generate, via the at least one processor, a hash of the set of document info fields associated with the document;
store, via the at least one processor, a document object associated with the document in an adjunct repository, in which the document object is structured to specify the set of document info fields and the hash;
submit, via the at least one processor, a document publishing transaction to a blockchain, in which the document publishing transaction is structured to facilitate storing publication information regarding the document via the blockchain, in which the publication information includes the hash;
generate, via the at least one processor, an NFT metadata datastructure structured to specify the document identifier and an identifier of the document publishing transaction;
determine, via the at least one processor, a set of subscribers for the document;
mint, via the at least one processor, for each respective subscriber in the set of subscribers, a notification NFT by sending a blockchain transaction to a document publication notification generating smart contract deployed on the blockchain, in which the document publication notification generating smart contract is structured to associate the generated NFT metadata datastructure and a subscriber blockchain address associated with the respective subscriber with the notification NFT; and
send, via the at least one processor, for each respective subscriber in the set of subscribers, a subscriber notification message for the respective subscriber via a communication method specified for the respective subscriber, in which the subscriber notification message is structured to specify an identifier associated with a notification NFT minted for the respective subscriber.

302. The apparatus of embodiment 301, in which the document is one of: a text file, a markup language file, a data interchange file, a binary file, a database record.

303. The apparatus of embodiment 301, in which the set of document info fields includes at least one of: a current document version, a previous document version.

304. The apparatus of embodiment 303, in which the component collection storage is further structured with processor-executable instructions, comprising:
determine, via the at least one processor, a set of changes between the current document version of the document and the previous document version of the document; and
in which the hash is generated also based on the set of changes.

305. The apparatus of embodiment 301, in which the hash is generated via a cryptographic hash function applied to the set of document info fields associated with the document.

306. The apparatus of embodiment 301, in which the document object is stored in the adjunct repository such that the hash is utilized as a key to the document object in the adjunct repository.

307. The apparatus of embodiment 301, in which the document publishing transaction is sent to the blockchain.

308. The apparatus of embodiment 307, in which the document publishing transaction is sent to a document publishing smart contract deployed on the blockchain, in which the document publishing smart contract is structured to emit a document publication event upon receiving the document publishing transaction, and in which the document publication notification generating smart contract is structured to listen for document publication events from the document publishing smart contract.

309. The apparatus of embodiment 301, in which a subscriber in the set of subscribers comprises a plurality of entities.

310. The apparatus of embodiment 301, in which the set of document info fields includes a document publication state, and in which the set of subscribers is determined based on the document publication state.

311. The apparatus of embodiment 301, in which a subscriber notification message is structured to specify a link that facilitates access to the document.

312. The apparatus of embodiment 311, in which the link is structured to include the hash.

313. The apparatus of embodiment 301, in which a subscriber blockchain address is a blockchain wallet address.

314. The apparatus of embodiment 301, in which the document publication notification generating smart contract is structured as a smart contract implementing ERC-721 standard.

315. The apparatus of embodiment 301, in which the blockchain is one of: Solana, Ethereum, Polygon.

316. An NFT-based document publication notification message generating processor-readable, non-transient medium, the medium storing a component collection, the component collection storage structured with processor-executable instructions comprising:

obtain, via the at least one processor, a document publishing request datastructure structured to specify a set of document info fields associated with a document, in which the set of document info fields includes a document identifier and document contents;

generate, via the at least one processor, a hash of the set of document info fields associated with the document;

store, via the at least one processor, a document object associated with the document in an adjunct repository, in which the document object is structured to specify the set of document info fields and the hash;

submit, via the at least one processor, a document publishing transaction to a blockchain, in which the document publishing transaction is structured to facilitate storing publication information regarding the document via the blockchain, in which the publication information includes the hash;

generate, via the at least one processor, an NFT metadata datastructure structured to specify the document identifier and an identifier of the document publishing transaction;

determine, via the at least one processor, a set of subscribers for the document;

mint, via the at least one processor, for each respective subscriber in the set of subscribers, a notification NFT by sending a blockchain transaction to a document publication notification generating smart contract deployed on the blockchain, in which the document publication notification generating smart contract is structured to associate the generated NFT metadata datastructure and a subscriber blockchain address associated with the respective subscriber with the notification NFT; and send, via the at least one processor, for each respective subscriber in the set of subscribers, a subscriber notification message for the respective subscriber via a communication method specified for the respective subscriber, in which the subscriber notification message is structured to specify an identifier associated with a notification NFT minted for the respective subscriber.

317. The medium of embodiment 316, in which the document is one of: a text file, a markup language file, a data interchange file, a binary file, a database record.

318. The medium of embodiment 316, in which the set of document info fields includes at least one of: a current document version, a previous document version.

319. The medium of embodiment 318, in which the component collection storage is further structured with processor-executable instructions, comprising:

determine, via the at least one processor, a set of changes between the current document version of the document and the previous document version of the document; and in which the hash is generated also based on the set of changes.

320. The medium of embodiment 316, in which the hash is generated via a cryptographic hash function applied to the set of document info fields associated with the document.

321. The medium of embodiment 316, in which the document object is stored in the adjunct repository such that the hash is utilized as a key to the document object in the adjunct repository.

322. The medium of embodiment 316, in which the document publishing transaction is sent to the blockchain.

323. The medium of embodiment 322, in which the document publishing transaction is sent to a document publishing smart contract deployed on the blockchain, in which the document publishing smart contract is structured to emit a document publication event upon receiving the document publishing transaction, and in which the document publication notification generating smart contract is structured to listen for document publication events from the document publishing smart contract.

324. The medium of embodiment 316, in which a subscriber in the set of subscribers comprises a plurality of entities.

325. The medium of embodiment 316, in which the set of document info fields includes a document publication state, and in which the set of subscribers is determined based on the document publication state.

326. The medium of embodiment 316, in which a subscriber notification message is structured to specify a link that facilitates access to the document.

327. The medium of embodiment 326, in which the link is structured to include the hash.

328. The medium of embodiment 316, in which a subscriber blockchain address is a blockchain wallet address.

329. The medium of embodiment 316, in which the document publication notification generating smart contract is structured as a smart contract implementing ERC-721 standard.

330. The medium of embodiment 316, in which the blockchain is one of: Solana, Ethereum, Polygon.

331. An NFT-based document publication notification message generating processor-implemented system, comprising:

means to store a component collection;

means to process processor-executable instructions from the component collection, the component collection storage structured with processor-executable instructions including:

obtain, via the at least one processor, a document publishing request datastructure structured to specify a set of document info fields associated with a document, in which the set of document info fields includes a document identifier and document contents;

generate, via the at least one processor, a hash of the set of document info fields associated with the document;

store, via the at least one processor, a document object associated with the document in an adjunct repository, in which the document object is structured to specify the set of document info fields and the hash;

submit, via the at least one processor, a document publishing transaction to a blockchain, in which the document publishing transaction is structured to facilitate storing publication information regarding the document via the blockchain, in which the publication information includes the hash;

generate, via the at least one processor, an NFT metadata datastructure structured to specify the document identifier and an identifier of the document publishing transaction;

determine, via the at least one processor, a set of subscribers for the document;

mint, via the at least one processor, for each respective subscriber in the set of subscribers, a notification NFT by sending a blockchain transaction to a document publication notification generating smart contract deployed on the blockchain, in which the document publication notification generating smart contract is structured to associate the generated NFT metadata datastructure and a subscriber blockchain address associated with the respective subscriber with the notification NFT; and send, via the at least one processor, for each respective subscriber in the set of subscribers, a subscriber notification message for the respective subscriber via a communication method specified for the respective subscriber, in which the subscriber notification message is structured to specify an identifier associated with a notification NFT minted for the respective subscriber.

332. The system of embodiment 331, in which the document is one of: a text file, a markup language file, a data interchange file, a binary file, a database record.

333. The system of embodiment 331, in which the set of document info fields includes at least one of: a current document version, a previous document version.

334. The system of embodiment 333, in which the component collection storage is further structured with processor-executable instructions, comprising:

determine, via the at least one processor, a set of changes between the current document version of the document and the previous document version of the document; and in which the hash is generated also based on the set of changes.

335. The system of embodiment 331, in which the hash is generated via a cryptographic hash function applied to the set of document info fields associated with the document.

336. The system of embodiment 331, in which the document object is stored in the adjunct repository such that the hash is utilized as a key to the document object in the adjunct repository.

337. The system of embodiment 331, in which the document publishing transaction is sent to the blockchain.

338. The system of embodiment 337, in which the document publishing transaction is sent to a document publishing smart contract deployed on the blockchain, in which the document publishing smart contract is structured to emit a document publication event upon receiving the document publishing transaction, and in which the document publication notification generating smart contract is structured to listen for document publication events from the document publishing smart contract.

339. The system of embodiment 331, in which a subscriber in the set of subscribers comprises a plurality of entities.

340. The system of embodiment 331, in which the set of document info fields includes a document publication state, and in which the set of subscribers is determined based on the document publication state.

341. The system of embodiment 331, in which a subscriber notification message is structured to specify a link that facilitates access to the document.

342. The system of embodiment 341, in which the link is structured to include the hash.

343. The system of embodiment 331, in which a subscriber blockchain address is a blockchain wallet address.

344. The system of embodiment 331, in which the document publication notification generating smart contract is structured as a smart contract implementing ERC-721 standard.

345. The system of embodiment 331, in which the blockchain is one of: Solana, Ethereum, Polygon.

346. An NFT-based document publication notification message generating processor-implemented process, including processing processor-executable instructions via at least one processor from a component collection stored in at least one memory, the component collection storage structured with processor-executable instructions comprising:

obtain, via the at least one processor, a document publishing request datastructure structured to specify a set of document info fields associated with a document, in which the set of document info fields includes a document identifier and document contents;

generate, via the at least one processor, a hash of the set of document info fields associated with the document;

store, via the at least one processor, a document object associated with the document in an adjunct repository, in which the document object is structured to specify the set of document info fields and the hash;

submit, via the at least one processor, a document publishing transaction to a blockchain, in which the document publishing transaction is structured to facilitate storing publication information regarding the document via the blockchain, in which the publication information includes the hash;

generate, via the at least one processor, an NFT metadata datastructure structured to specify the document identifier and an identifier of the document publishing transaction;

determine, via the at least one processor, a set of subscribers for the document;

mint, via the at least one processor, for each respective subscriber in the set of subscribers, a notification NFT by sending a blockchain transaction to a document publication notification generating smart contract deployed on the blockchain, in which the document publication notification generating smart contract is structured to associate the generated NFT metadata datastructure and a subscriber blockchain address associated with the respective subscriber with the notification NFT; and send, via the at least one processor, for each respective subscriber in the set of subscribers, a subscriber notification message for the respective subscriber via a communication method specified for the respective subscriber, in which the subscriber notification message is structured to specify an identifier associated with a notification NFT minted for the respective subscriber.

347. The process of embodiment 346, in which the document is one of: a text file, a markup language file, a data interchange file, a binary file, a database record.

348. The process of embodiment 346, in which the set of document info fields includes at least one of: a current document version, a previous document version.

349. The process of embodiment 348, in which the component collection storage is further structured with processor-executable instructions, comprising:

determine, via the at least one processor, a set of changes between the current document version of the document and the previous document version of the document; and in which the hash is generated also based on the set of changes.

350. The process of embodiment 346, in which the hash is generated via a cryptographic hash function applied to the set of document info fields associated with the document.

351. The process of embodiment 346, in which the document object is stored in the adjunct repository such that the hash is utilized as a key to the document object in the adjunct repository.

352. The process of embodiment 346, in which the document publishing transaction is sent to the blockchain.

353. The process of embodiment 352, in which the document publishing transaction is sent to a document publishing smart contract deployed on the blockchain, in which the document publishing smart contract is structured to emit a document publication event upon receiving the document publishing transaction, and in which the document publication notification generating smart contract is structured to listen for document publication events from the document publishing smart contract.

354. The process of embodiment 346, in which a subscriber in the set of subscribers comprises a plurality of entities.

355. The process of embodiment 346, in which the set of document info fields includes a document publication state, and in which the set of subscribers is determined based on the document publication state.

356. The process of embodiment 346, in which a subscriber notification message is structured to specify a link that facilitates access to the document.

357. The process of embodiment 356, in which the link is structured to include the hash.

358. The process of embodiment 346, in which a subscriber blockchain address is a blockchain wallet address.

359. The process of embodiment 346, in which the document publication notification generating smart contract is structured as a smart contract implementing ERC-721 standard.

360. The process of embodiment 346, in which the blockchain is one of: Solana, Ethereum, Polygon.

401. A notification NFT-based document access processing apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, from a subscriber, an NFT document access request datastructure structured to specify a notification NFT identifier and authorization data;

determine, via the at least one processor, an owner blockchain address associated with the notification NFT identifier by sending a first blockchain transaction to a document publication notification generating smart contract deployed on a blockchain;

evaluate, via the at least one processor, the authorization data to verify that the authorization data establishes control over the owner blockchain address associated with the notification NFT identifier;

obtain, via the at least one processor, an NFT metadata datastructure associated with the notification NFT identifier by sending a second blockchain transaction to the document publication notification generating smart contract deployed on the blockchain;

determine, via the at least one processor, by querying the NFT metadata datastructure, a document publishing transaction identifier associated with the notification NFT identifier;

determine, via the at least one processor, by querying the blockchain, a first document hash specified via a document publishing transaction corresponding to the document publishing transaction identifier;

determine, via the at least one processor, by querying the blockchain, a document object identifier specified via the document publishing transaction corresponding to the document publishing transaction identifier;

determine, via the at least one processor, a second document hash associated with a document object corresponding to the document object identifier;

verify, via the at least one processor, that the first document hash matches the second document hash; and provide, via the at least one processor, a document corresponding to the document object to the subscriber.

402. The apparatus of embodiment 401, in which the authorization data comprises an authenticating NFT identifier and authorization data associated with the authenticating NFT identifier.

403. The apparatus of embodiment 401, in which the authorization data comprises a password to a cryptographic wallet corresponding to the owner blockchain address.

404. The apparatus of embodiment 401, in which the authorization data comprises a message signed with a private key associated with a cryptographic wallet corresponding to the owner blockchain address.

405. The apparatus of embodiment 401, in which the NFT metadata datastructure is structured to specify a set of document info fields associated with the document.

406. The apparatus of embodiment 401, in which the component collection storage is further structured with processor-executable instructions, comprising:

determine, via the at least one processor, a URI to the document object based on the document object identifier.

407. The apparatus of embodiment 406, in which the URI provides access to a set of exposed document details of the document object.

408. The apparatus of embodiment 401, in which the second document hash is retrieved from an adjunct repository.

409. The apparatus of embodiment 401, in which the second document hash is recalculated via a cryptographic hash function applied to a set of document info fields associated with the document object.

410. The apparatus of embodiment 401, in which the component collection storage is further structured with processor-executable instructions, comprising:

determine, via the at least one processor, a set of publisher info fields associated with the document object, in which the set of publisher info fields includes a publisher signature; and verify, via the at least one processor, that the publisher signature is valid.

411. The apparatus of embodiment 410, in which the set of publisher info fields includes a reviewer signature.

412. The apparatus of embodiment 411, in which the component collection storage is further structured with processor-executable instructions, comprising:

verify, via the at least one processor, that the reviewer signature is valid.

413. The apparatus of embodiment 412, in which the set of publisher info fields includes an auditor signature.

414. The apparatus of embodiment 413, in which the component collection storage is further structured with processor-executable instructions, comprising:

verify, via the at least one processor, that the auditor signature is valid.

415. The apparatus of embodiment 401, in which the component collection storage is further structured with processor-executable instructions, comprising:

generate, via the at least one processor, a document access NFT, in which the document access NFT is structured to record document access data associated with the document object.

416. A notification NFT-based document access processing processor-readable, non-transient medium, the medium storing a component collection, the component collection storage structured with processor-executable instructions comprising:

obtain, via the at least one processor, from a subscriber, an NFT document access request datastructure structured to specify a notification NFT identifier and authorization data;

determine, via the at least one processor, an owner blockchain address associated with the notification NFT identifier by sending a first blockchain transaction to a document publication notification generating smart contract deployed on a blockchain;

evaluate, via the at least one processor, the authorization data to verify that the authorization data establishes control over the owner blockchain address associated with the notification NFT identifier;

obtain, via the at least one processor, an NFT metadata datastructure associated with the notification NFT identifier by sending a second blockchain transaction to the document publication notification generating smart contract deployed on the blockchain;

determine, via the at least one processor, by querying the NFT metadata datastructure, a document publishing transaction identifier associated with the notification NFT identifier;

determine, via the at least one processor, by querying the blockchain, a first document hash specified via a document publishing transaction corresponding to the document publishing transaction identifier;

determine, via the at least one processor, by querying the blockchain, a document object identifier specified via the document publishing transaction corresponding to the document publishing transaction identifier;

determine, via the at least one processor, a second document hash associated with a document object corresponding to the document object identifier;

verify, via the at least one processor, that the first document hash matches the second document hash; and provide, via the at least one processor, a document corresponding to the document object to the subscriber.

417. The medium of embodiment 416, in which the authorization data comprises an authenticating NFT identifier and authorization data associated with the authenticating NFT identifier.

418. The medium of embodiment 416, in which the authorization data comprises a password to a cryptographic wallet corresponding to the owner blockchain address.

419. The medium of embodiment 416, in which the authorization data comprises a message signed with a private key associated with a cryptographic wallet corresponding to the owner blockchain address.

420. The medium of embodiment 416, in which the NFT metadata datastructure is structured to specify a set of document info fields associated with the document.

421. The medium of embodiment 416, in which the component collection storage is further structured with processor-executable instructions, comprising:

determine, via the at least one processor, a URI to the document object based on the document object identifier.

422. The medium of embodiment 421, in which the URI provides access to a set of exposed document details of the document object.

423. The medium of embodiment 416, in which the second document hash is retrieved from an adjunct repository.

424. The medium of embodiment 416, in which the second document hash is recalculated via a cryptographic hash function applied to a set of document info fields associated with the document object.

425. The medium of embodiment 416, in which the component collection storage is further structured with processor-executable instructions, comprising:
determine, via the at least one processor, a set of publisher info fields associated with the document object, in which the set of publisher info fields includes a publisher signature; and
verify, via the at least one processor, that the publisher signature is valid.
426. The medium of embodiment 425, in which the set of publisher info fields includes a reviewer signature.
427. The medium of embodiment 426, in which the component collection storage is further structured with processor-executable instructions, comprising:
verify, via the at least one processor, that the reviewer signature is valid.
428. The medium of embodiment 427, in which the set of publisher info fields includes an auditor signature.
429. The medium of embodiment 428, in which the component collection storage is further structured with processor-executable instructions, comprising:
verify, via the at least one processor, that the auditor signature is valid.
430. The medium of embodiment 416, in which the component collection storage is further structured with processor-executable instructions, comprising:
generate, via the at least one processor, a document access NFT, in which the document access NFT is structured to record document access data associated with the document object.
431. A notification NFT-based document access processing processor-implemented system, comprising:
means to store a component collection;
means to process processor-executable instructions from the component collection, the component collection storage structured with processor-executable instructions including:
obtain, via the at least one processor, from a subscriber, an NFT document access request datastructure structured to specify a notification NFT identifier and authorization data;
determine, via the at least one processor, an owner blockchain address associated with the notification NFT identifier by sending a first blockchain transaction to a document publication notification generating smart contract deployed on a blockchain;
evaluate, via the at least one processor, the authorization data to verify that the authorization data establishes control over the owner blockchain address associated with the notification NFT identifier;
obtain, via the at least one processor, an NFT metadata datastructure associated with the notification NFT identifier by sending a second blockchain transaction to the document publication notification generating smart contract deployed on the blockchain;
determine, via the at least one processor, by querying the NFT metadata datastructure, a document publishing transaction identifier associated with the notification NFT identifier;
determine, via the at least one processor, by querying the blockchain, a first document hash specified via a document publishing transaction corresponding to the document publishing transaction identifier;
determine, via the at least one processor, by querying the blockchain, a document object identifier specified via the document publishing transaction corresponding to the document publishing transaction identifier;
determine, via the at least one processor, a second document hash associated with a document object corresponding to the document object identifier;
verify, via the at least one processor, that the first document hash matches the second document hash; and
provide, via the at least one processor, a document corresponding to the document object to the subscriber.
432. The system of embodiment 431, in which the authorization data comprises an authenticating NFT identifier and authorization data associated with the authenticating NFT identifier.
433. The system of embodiment 431, in which the authorization data comprises a password to a cryptographic wallet corresponding to the owner blockchain address.
434. The system of embodiment 431, in which the authorization data comprises a message signed with a private key associated with a cryptographic wallet corresponding to the owner blockchain address.
435. The system of embodiment 431, in which the NFT metadata datastructure is structured to specify a set of document info fields associated with the document.
436. The system of embodiment 431, in which the component collection storage is further structured with processor-executable instructions, comprising:
determine, via the at least one processor, a URI to the document object based on the document object identifier.
437. The system of embodiment 436, in which the URI provides access to a set of exposed document details of the document object.
438. The system of embodiment 431, in which the second document hash is retrieved from an adjunct repository.
439. The system of embodiment 431, in which the second document hash is recalculated via a cryptographic hash function applied to a set of document info fields associated with the document object.
440. The system of embodiment 431, in which the component collection storage is further structured with processor-executable instructions, comprising:
determine, via the at least one processor, a set of publisher info fields associated with the document object, in which the set of publisher info fields includes a publisher signature; and
verify, via the at least one processor, that the publisher signature is valid.
441. The system of embodiment 440, in which the set of publisher info fields includes a reviewer signature.
442. The system of embodiment 441, in which the component collection storage is further structured with processor-executable instructions, comprising:
verify, via the at least one processor, that the reviewer signature is valid.
443. The system of embodiment 442, in which the set of publisher info fields includes an auditor signature.
444. The system of embodiment 443, in which the component collection storage is further structured with processor-executable instructions, comprising:
verify, via the at least one processor, that the auditor signature is valid.
445. The system of embodiment 431, in which the component collection storage is further structured with processor-executable instructions, comprising:

generate, via the at least one processor, a document access NFT, in which the document access NFT is structured to record document access data associated with the document object.

446. A notification NFT-based document access processing processor-implemented process, including processing processor-executable instructions via at least one processor from a component collection stored in at least one memory, the component collection storage structured with processor-executable instructions comprising:

obtain, via the at least one processor, from a subscriber, an NFT document access request datastructure structured to specify a notification NFT identifier and authorization data;

determine, via the at least one processor, an owner blockchain address associated with the notification NFT identifier by sending a first blockchain transaction to a document publication notification generating smart contract deployed on a blockchain;

evaluate, via the at least one processor, the authorization data to verify that the authorization data establishes control over the owner blockchain address associated with the notification NFT identifier;

obtain, via the at least one processor, an NFT metadata datastructure associated with the notification NFT identifier by sending a second blockchain transaction to the document publication notification generating smart contract deployed on the blockchain;

determine, via the at least one processor, by querying the NFT metadata datastructure, a document publishing transaction identifier associated with the notification NFT identifier;

determine, via the at least one processor, by querying the blockchain, a first document hash specified via a document publishing transaction corresponding to the document publishing transaction identifier;

determine, via the at least one processor, by querying the blockchain, a document object identifier specified via the document publishing transaction corresponding to the document publishing transaction identifier;

determine, via the at least one processor, a second document hash associated with a document object corresponding to the document object identifier;

verify, via the at least one processor, that the first document hash matches the second document hash; and provide, via the at least one processor, a document corresponding to the document object to the subscriber.

447. The process of embodiment 446, in which the authorization data comprises an authenticating NFT identifier and authorization data associated with the authenticating NFT identifier.

448. The process of embodiment 446, in which the authorization data comprises a password to a cryptographic wallet corresponding to the owner blockchain address.

449. The process of embodiment 446, in which the authorization data comprises a message signed with a private key associated with a cryptographic wallet corresponding to the owner blockchain address.

450. The process of embodiment 446, in which the NFT metadata datastructure is structured to specify a set of document info fields associated with the document.

451. The process of embodiment 446, in which the component collection storage is further structured with processor-executable instructions, comprising:

determine, via the at least one processor, a URI to the document object based on the document object identifier.

452. The process of embodiment 451, in which the URI provides access to a set of exposed document details of the document object.

453. The process of embodiment 446, in which the second document hash is retrieved from an adjunct repository.

454. The process of embodiment 446, in which the second document hash is recalculated via a cryptographic hash function applied to a set of document info fields associated with the document object.

455. The process of embodiment 446, in which the component collection storage is further structured with processor-executable instructions, comprising:

determine, via the at least one processor, a set of publisher info fields associated with the document object, in which the set of publisher info fields includes a publisher signature; and verify, via the at least one processor, that the publisher signature is valid.

456. The process of embodiment 455, in which the set of publisher info fields includes a reviewer signature.

457. The process of embodiment 456, in which the component collection storage is further structured with processor-executable instructions, comprising:

verify, via the at least one processor, that the reviewer signature is valid.

458. The process of embodiment 457, in which the set of publisher info fields includes an auditor signature.

459. The process of embodiment 458, in which the component collection storage is further structured with processor-executable instructions, comprising:

verify, via the at least one processor, that the auditor signature is valid.

460. The process of embodiment 446, in which the component collection storage is further structured with processor-executable instructions, comprising:

generate, via the at least one processor, a document access NFT, in which the document access NFT is structured to record document access data associated with the document object.

501. A transfer transaction processing apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a transfer transaction processing request datastructure structured as specifying a transaction requestor blockchain address, a transfer transaction identifier, and authorization data, in which the transfer transaction processing request datastructure corresponds to a clawback transaction associated with the transfer transaction identifier;

evaluate, via the at least one processor, the authorization data to verify that the authorization data establishes control over the transaction requestor blockchain address;

submit, via the at least one processor, a clawback post transaction to a blockchain, in which the clawback post transaction is structured to facilitate storing information regarding the clawback transaction via the blockchain, in which the information regarding the clawback transaction includes the transfer transaction identifier; and send, via the at least one processor, a clawback post transaction notification to a transfer transaction handling smart contract, in which the clawback post transaction notification is structured as specifying a transaction identifier of the clawback post transaction, in which the transfer transaction handling smart contract is structured with processor-executable instructions, comprising:

validate the clawback post transaction by checking compliance with a set of predefined clawback rules, in which the set of predefined clawback rules includes a threshold verify post transactions rule that specifies a threshold number of submitted verify post transactions associated with the transfer transaction identifier; and transfer cryptographic assets associated with the transfer transaction identifier to a blockchain address controlled by a sender of a transfer transaction associated with the transfer transaction identifier.

502. The apparatus of embodiment 501, in which the authorization data comprises an authenticating NFT identifier and authorization data associated with the authenticating NFT identifier.

503. The apparatus of embodiment 502, in which the transaction requestor blockchain address is specified as an owner blockchain address corresponding to the authenticating NFT identifier.

504. The apparatus of embodiment 501, in which the authorization data comprises a password to a cryptographic wallet corresponding to the transaction requestor blockchain address.

505. The apparatus of embodiment 501, in which the authorization data comprises a message signed with a private key associated with a cryptographic wallet corresponding to the transaction requestor blockchain address.

506. The apparatus of embodiment 501, in which the transaction requestor blockchain address associated with the clawback transaction is controlled by the sender of the transfer transaction.

507. The apparatus of embodiment 501, in which the clawback post transaction is submitted to the blockchain via a function call to the transfer transaction handling smart contract.

508. The apparatus of embodiment 501, in which the clawback post transaction is structured as specifying a submission date.

509. The apparatus of embodiment 501, in which the clawback post transaction is cryptographically signed by the sender.

510. The apparatus of embodiment 501, in which the transfer transaction handling smart contract is selected from a plurality of transfer transaction handling smart contracts by evaluating transaction details of the transfer transaction with regard to a set of smart contract selection rules.

511. The apparatus of embodiment 501, in which the transfer transaction handling smart contract is further structured with processor-executable instructions, comprising:

verify that the clawback post transaction notification was provided by an authorized node.

512. The apparatus of embodiment 501, in which compliance with the threshold verify post transactions rule is validated upon determining that a post transactions record datastructure associated with the transfer transaction identifier indicates that number of submitted verify post transactions does not exceed the threshold number of submitted verify post transactions.

513. The apparatus of embodiment 512, in which the post transactions record datastructure is structured as specifying, for each respective post transaction type, number of submitted post transactions of that respective post transaction type.

514. The apparatus of embodiment 501, in which the set of predefined clawback rules includes a clawback timer rule that specifies a threshold time period for initiating the clawback transaction associated with the transfer transaction identifier.

515. The apparatus of embodiment 514, in which the threshold time period is structured as relative to a submission date of another post transaction associated with the transfer transaction identifier.

516. A transfer transaction processing processor-readable, non-transient medium, the medium storing a component collection, the component collection storage structured with processor-executable instructions comprising:

obtain, via the at least one processor, a transfer transaction processing request datastructure structured as specifying a transaction requestor blockchain address, a transfer transaction identifier, and authorization data, in which the transfer transaction processing request datastructure corresponds to a clawback transaction associated with the transfer transaction identifier;

evaluate, via the at least one processor, the authorization data to verify that the authorization data establishes control over the transaction requestor blockchain address;

submit, via the at least one processor, a clawback post transaction to a blockchain, in which the clawback post transaction is structured to facilitate storing information regarding the clawback transaction via the blockchain, in which the information regarding the clawback transaction includes the transfer transaction identifier; and send, via the at least one processor, a clawback post transaction notification to a transfer transaction handling smart contract, in which the clawback post transaction notification is structured as specifying a transaction identifier of the clawback post transaction, in which the transfer transaction handling smart contract is structured with processor-executable instructions, comprising:

validate the clawback post transaction by checking compliance with a set of predefined clawback rules, in which the set of predefined clawback rules includes a threshold verify post transactions rule that specifies a threshold number of submitted verify post transactions associated with the transfer transaction identifier; and transfer cryptographic assets associated with the transfer transaction identifier to a blockchain address controlled by a sender of a transfer transaction associated with the transfer transaction identifier.

517. The medium of embodiment 516, in which the authorization data comprises an authenticating NFT identifier and authorization data associated with the authenticating NFT identifier.

518. The medium of embodiment 517, in which the transaction requestor blockchain address is specified as an owner blockchain address corresponding to the authenticating NFT identifier.

519. The medium of embodiment 516, in which the authorization data comprises a password to a cryptographic wallet corresponding to the transaction requestor blockchain address.

520. The medium of embodiment 516, in which the authorization data comprises a message signed with a private key associated with a cryptographic wallet corresponding to the transaction requestor blockchain address.

521. The medium of embodiment 516, in which the transaction requestor blockchain address associated with the clawback transaction is controlled by the sender of the transfer transaction.

522. The medium of embodiment 516, in which the clawback post transaction is submitted to the blockchain via a function call to the transfer transaction handling smart contract.

523. The medium of embodiment 516, in which the clawback post transaction is structured as specifying a submission date.

524. The medium of embodiment 516, in which the clawback post transaction is cryptographically signed by the sender.

525. The medium of embodiment 516, in which the transfer transaction handling smart contract is selected from a plurality of transfer transaction handling smart contracts by evaluating transaction details of the transfer transaction with regard to a set of smart contract selection rules.

526. The medium of embodiment 516, in which the transfer transaction handling smart contract is further structured with processor-executable instructions, comprising:

verify that the clawback post transaction notification was provided by an authorized node.

527. The medium of embodiment 516, in which compliance with the threshold verify post transactions rule is validated upon determining that a post transactions record datastructure associated with the transfer transaction identifier indicates that number of submitted verify post transactions does not exceed the threshold number of submitted verify post transactions.

528. The medium of embodiment 527, in which the post transactions record datastructure is structured as specifying, for each respective post transaction type, number of submitted post transactions of that respective post transaction type.

529. The medium of embodiment 516, in which the set of predefined clawback rules includes a clawback timer rule that specifies a threshold time period for initiating the clawback transaction associated with the transfer transaction identifier.

530. The medium of embodiment 529, in which the threshold time period is structured as relative to a submission date of another post transaction associated with the transfer transaction identifier.

531. A transfer transaction processing processor-implemented system, comprising:

means to store a component collection;

means to process processor-executable instructions from the component collection, the component collection storage structured with processor-executable instructions including:

obtain, via the at least one processor, a transfer transaction processing request datastructure structured as specifying a transaction requestor blockchain address, a transfer transaction identifier, and authorization data, in which the transfer transaction processing request datastructure corresponds to a clawback transaction associated with the transfer transaction identifier;

evaluate, via the at least one processor, the authorization data to verify that the authorization data establishes control over the transaction requestor blockchain address;

submit, via the at least one processor, a clawback post transaction to a blockchain, in which the clawback post transaction is structured to facilitate storing information regarding the clawback transaction via the blockchain, in which the information regarding the clawback transaction includes the transfer transaction identifier; and send, via the at least one processor, a clawback post transaction notification to a transfer transaction handling smart contract, in which the clawback post transaction notification is structured as specifying a transaction identifier of the clawback post transaction, in which the transfer transaction handling smart contract is structured with processor-executable instructions, comprising:

validate the clawback post transaction by checking compliance with a set of predefined clawback rules, in which the set of predefined clawback rules includes a threshold verify post transactions rule that specifies a threshold number of submitted verify post transactions associated with the transfer transaction identifier; and transfer cryptographic assets associated with the transfer transaction identifier to a blockchain address controlled by a sender of a transfer transaction associated with the transfer transaction identifier.

532. The system of embodiment 531, in which the authorization data comprises an authenticating NFT identifier and authorization data associated with the authenticating NFT identifier.

533. The system of embodiment 532, in which the transaction requestor blockchain address is specified as an owner blockchain address corresponding to the authenticating NFT identifier.

534. The system of embodiment 531, in which the authorization data comprises a password to a cryptographic wallet corresponding to the transaction requestor blockchain address.

535. The system of embodiment 531, in which the authorization data comprises a message signed with a private key associated with a cryptographic wallet corresponding to the transaction requestor blockchain address.

536. The system of embodiment 531, in which the transaction requestor blockchain address associated with the clawback transaction is controlled by the sender of the transfer transaction.

537. The system of embodiment 531, in which the clawback post transaction is submitted to the blockchain via a function call to the transfer transaction handling smart contract.

538. The system of embodiment 531, in which the clawback post transaction is structured as specifying a submission date.

539. The system of embodiment 531, in which the clawback post transaction is cryptographically signed by the sender.

540. The system of embodiment 531, in which the transfer transaction handling smart contract is selected from a plurality of transfer transaction handling smart contracts by evaluating transaction details of the transfer transaction with regard to a set of smart contract selection rules.

541. The system of embodiment 531, in which the transfer transaction handling smart contract is further structured with processor-executable instructions, comprising:

verify that the clawback post transaction notification was provided by an authorized node.

542. The system of embodiment 531, in which compliance with the threshold verify post transactions rule is validated upon determining that a post transactions record datastructure associated with the transfer transaction identifier indicates that number of submitted verify post transactions does not exceed the threshold number of submitted verify post transactions.

543. The system of embodiment 542, in which the post transactions record datastructure is structured as specifying, for each respective post transaction type, number of submitted post transactions of that respective post transaction type.

544. The system of embodiment 531, in which the set of predefined clawback rules includes a clawback timer rule that specifies a threshold time period for initiating the clawback transaction associated with the transfer transaction identifier.

545. The system of embodiment 544, in which the threshold time period is structured as relative to a submission date of another post transaction associated with the transfer transaction identifier.

546. A transfer transaction processing processor-implemented process, including processing processor-executable instructions via at least one processor from a component collection stored in at least one memory, the component collection storage structured with processor-executable instructions comprising:

obtain, via the at least one processor, a transfer transaction processing request datastructure structured as specifying a transaction requestor blockchain address, a transfer transaction identifier, and authorization data, in which the transfer transaction processing request datastructure corresponds to a clawback transaction associated with the transfer transaction identifier;

evaluate, via the at least one processor, the authorization data to verify that the authorization data establishes control over the transaction requestor blockchain address;

submit, via the at least one processor, a clawback post transaction to a blockchain, in which the clawback post transaction is structured to facilitate storing information regarding the clawback transaction via the blockchain, in which the information regarding the clawback transaction includes the transfer transaction identifier; and send, via the at least one processor, a clawback post transaction notification to a transfer transaction handling smart contract, in which the clawback post transaction notification is structured as specifying a transaction identifier of the clawback post transaction, in which the transfer transaction handling smart contract is structured with processor-executable instructions, comprising:

validate the clawback post transaction by checking compliance with a set of predefined clawback rules, in which the set of predefined clawback rules includes a threshold verify post transactions rule that specifies a threshold number of submitted verify post transactions associated with the transfer transaction identifier; and transfer cryptographic assets associated with the transfer transaction identifier to a blockchain address controlled by a sender of a transfer transaction associated with the transfer transaction identifier.

547. The process of embodiment 546, in which the authorization data comprises an authenticating NFT identifier and authorization data associated with the authenticating NFT identifier.

548. The process of embodiment 547, in which the transaction requestor blockchain address is specified as an owner blockchain address corresponding to the authenticating NFT identifier.

549. The process of embodiment 546, in which the authorization data comprises a password to a cryptographic wallet corresponding to the transaction requestor blockchain address.

550. The process of embodiment 546, in which the authorization data comprises a message signed with a private key associated with a cryptographic wallet corresponding to the transaction requestor blockchain address.

551. The process of embodiment 546, in which the transaction requestor blockchain address associated with the clawback transaction is controlled by the sender of the transfer transaction.

552. The process of embodiment 546, in which the clawback post transaction is submitted to the blockchain via a function call to the transfer transaction handling smart contract.

553. The process of embodiment 546, in which the clawback post transaction is structured as specifying a submission date.

554. The process of embodiment 546, in which the clawback post transaction is cryptographically signed by the sender.

555. The process of embodiment 546, in which the transfer transaction handling smart contract is selected from a plurality of transfer transaction handling smart contracts by evaluating transaction details of the transfer transaction with regard to a set of smart contract selection rules.

556. The process of embodiment 546, in which the transfer transaction handling smart contract is further structured with processor-executable instructions, comprising:

verify that the clawback post transaction notification was provided by an authorized node.

557. The process of embodiment 546, in which compliance with the threshold verify post transactions rule is validated upon determining that a post transactions record datastructure associated with the transfer transaction identifier indicates that number of submitted verify post transactions does not exceed the threshold number of submitted verify post transactions.
558. The process of embodiment 557, in which the post transactions record datastructure is structured as specifying, for each respective post transaction type, number of submitted post transactions of that respective post transaction type.
559. The process of embodiment 546, in which the set of predefined clawback rules includes a clawback timer rule that specifies a threshold time period for initiating the clawback transaction associated with the transfer transaction identifier.
560. The process of embodiment 559, in which the threshold time period is structured as relative to a submission date of another post transaction associated with the transfer transaction identifier.

NBSA Controller

Figure 27:
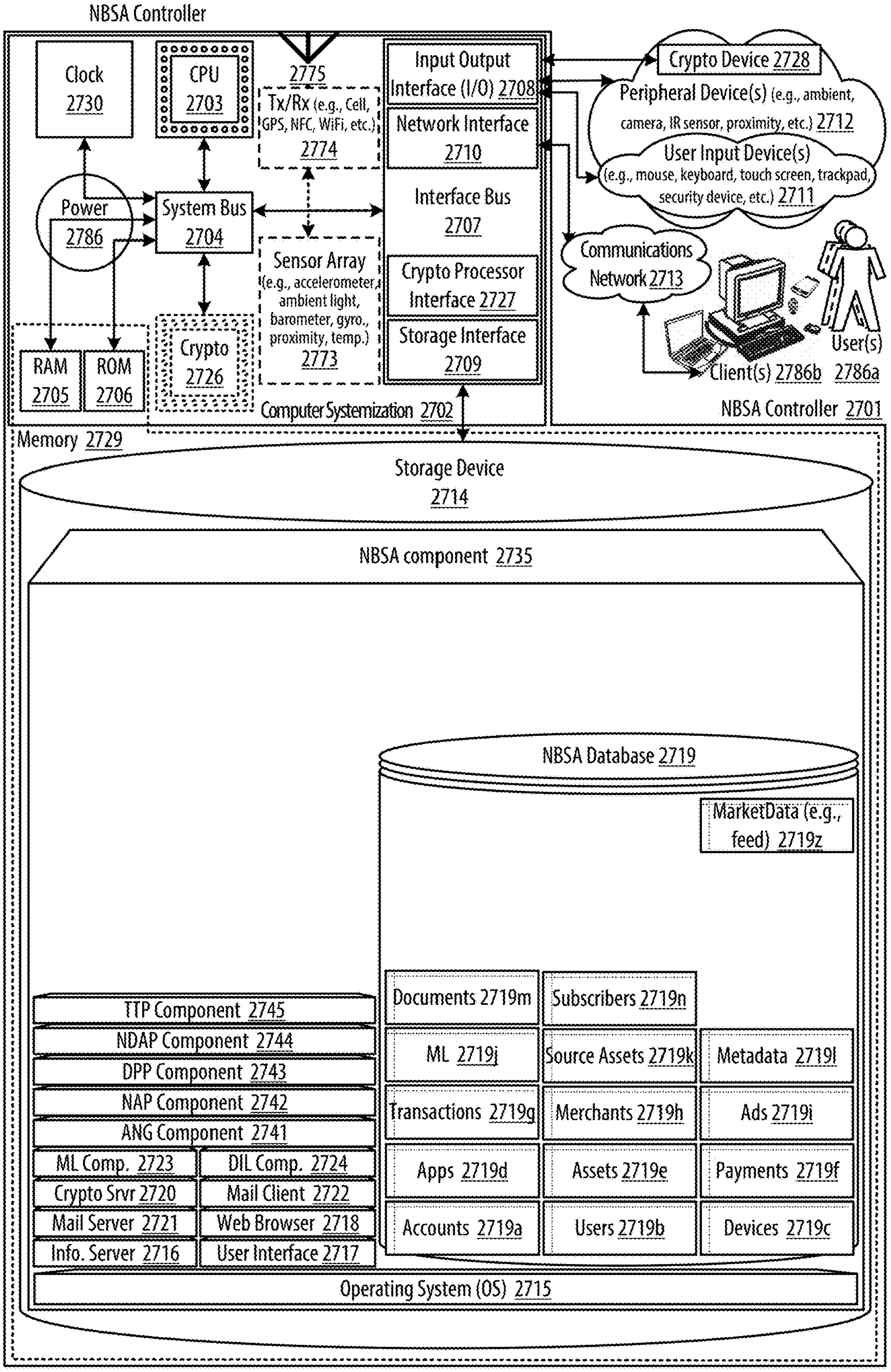
FIG. 27 shows a block diagram illustrating non-limiting, example embodiments of a NBSA controller.

FIG. 27 shows a block diagram illustrating non-limiting, example embodiments of a NBSA controller. In this embodiment, the NBSA controller 2701 may serve to aggregate, process, store, search, serve, identify, instruct, generate, match, and/or facilitate interactions with a computer through information technology technologies, and/or other related data.

Users, which may be people and/or other systems, may engage information technology systems (e.g., computers) to facilitate information processing. In turn, computers employ processors to process information; such processors 2703 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 2729 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the NBSA controller 2701 may be connected to and/or communicate with entities such as, but not limited to: one or more users from peripheral devices

2712 (e.g., user input devices 2711); an optional cryptographic processor device 2728; and/or a communications network 2713.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The NBSA controller 2701 may be based on computer systems that may comprise, but are not limited to, components such as: a computer systemization 2702 connected to memory 2729.

Computer Systemization

A computer systemization 2702 may comprise a clock 2730, central processing unit ("CPU(s)" and/or "processor (s)" (these terms are used interchangeably throughout the disclosure unless noted to the contrary)) 2703, a memory 2729 (e.g., a read only memory (ROM) 2706, a random access memory (RAM) 2705, etc.), and/or an interface bus 2707, and most frequently, although not necessarily, are all interconnected and/or communicating through a system bus 2704 on one or more (mother) board(s) 2702 having conductive and/or otherwise transportive circuit pathways through which instructions (e.g., binary encoded signals) may travel to effectuate communications, operations, storage, etc. The computer systemization may be connected to a power source 2786; e.g., optionally the power source may be internal. Optionally, a cryptographic processor 2726 may be connected to the system bus. In another embodiment, the cryptographic processor, transceivers (e.g., ICs) 2774, and/or sensor array (e.g., accelerometer, altimeter, ambient light, barometer, global positioning system (GPS) (thereby allowing NBSA controller to determine its location), gyroscope, magnetometer, pedometer, proximity, ultra-violet sensor, etc.) 2773 may be connected as either internal and/or external peripheral devices 2712 via the interface bus I/O 2708 (not pictured) and/or directly via the interface bus 2707. In turn, the transceivers may be connected to antenna(s) 2775, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that may increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves may incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2729 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPC®; IBM's® and Sony's® Cell processor; Intel's® 80X86 series (e.g., 80386, 80486), Pentium®, Celeron®, Core (2) Duo®, i series (e.g., i3, i5, 17, 19, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the NBSA controller and beyond through various interfaces. Should processing requirements dictate a greater amount speed and/or capacity, distributed processors (e.g., see Distributed NBSA below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the NBSA may be achieved by implementing a microcontroller such as CAST's® R8051XC2 microcontroller; Diligent's® Basy's 3 Artix-7, Nexys A7-100T, U192015125IT, etc.; Intel's® MCS 51 (i.e., 8051 microcontroller); and/or the like. Also, to implement certain features of the NBSA, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the NBSA component collection (distributed or otherwise) and/or features may be implemented via the microprocessor and/or via embedded components; e.g., via ASIC, coprocessor, DSP, FPGA, and/or the like. Alternately, some implementations of the NBSA may be implemented with embedded components that are configured and used to achieve a variety of features or signal processing.

Depending on the particular implementation, the embedded components may include software solutions, hardware solutions, and/or some combination of both hardware/software solutions. For example, NBSA features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the NBSA features. A hierarchy of programmable interconnects allow logic blocks to be interconnected as needed by the NBSA system designer/administrator, somewhat like a one-chip programmable breadboard. An FPGA's logic blocks can be programmed to perform the operation of basic logic gates such as AND, and NOR, or more complex combinational operators such as decoders or mathematical operations. In most FPGAs, the logic blocks also include memory elements, which may be circuit flip-flops or more complete blocks of memory. In some circumstances, the NBSA may be developed on FPGAs and then migrated into a fixed version that more resembles ASIC implementations. Alternate or coordinating implementations may migrate NBSA controller features to a final ASIC instead of or in addition to FPGAs. Depending on the implementation all of the aforementioned embedded components and microprocessors may be considered the "CPU" and/or "processor" for the NBSA.

Power Source

The power source 2786 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2786 is connected to at least one of the interconnected subsequent components of the NBSA thereby providing an electric current to all subsequent components. In one example, the power source 2786 is connected to the system bus component 2704. In an alternative embodiment, an outside power source 2786 is provided through a connection across the I/O 2708 interface. For example, Ethernet (with power on Ethernet), IEEE 1394, USB and/or the like connections carry both data and power across the connection and is therefore a suitable source of power.

Interface Adapters

Interface bus(ses) 2707 may accept, connect, and/or communicate to a number of interface adapters, variously although not necessarily in the form of adapter cards, such as but not limited to: input output interfaces (I/O) 2708, storage interfaces 2709, network interfaces 2710, and/or the like. Optionally, cryptographic processor interfaces 2727 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E) ISA), Micro Channel Architecture (MCA), NuBus, Peripheral Component Interconnect (Extended) (PCI (X)), PCI Express, Personal Computer Memory Card International Association (PCMCIA), and/or the like.

Storage interfaces 2709 may accept, communicate, and/or connect to a number of storage devices such as, but not limited to: (removable) storage devices 2714, removable disc devices, and/or the like. Storage interfaces may employ connection protocols such as, but not limited to: (Ultra) (Serial) Advanced Technology Attachment (Packet Interface) ((Ultra) (Serial) ATA (PI)), (Enhanced) Integrated Drive Electronics ((E) IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 2710 may accept, communicate, and/or connect to a communications network 2713. Through a communications network 2713, the NBSA controller is accessible through remote clients **2733*b* (e.g., computers with web browsers) by users 2733*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed NBSA below), architectures may similarly be employed to pool, load balance, and/or otherwise decrease/increase the communicative bandwidth required by the NBSA controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2710 may be used to engage with various communications network types 2713**. For example, multiple network interfaces may be employed to allow for the communication over broadcast, multicast, and/or unicast networks.

Input Output interfaces (I/O) 2708 may accept, communicate, and/or connect to user, peripheral devices 2712 (e.g., input devices 2711), cryptographic processor devices 2728, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus(USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 2712 may be connected and/or communicate to I/O and/or other facilities of the like such as network interfaces, storage interfaces, directly to the interface bus, system bus, the CPU, and/or the like. Peripheral devices may be external, internal and/or part of the NBSA controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2711 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the NBSA controller may be embodied as an embedded, dedicated, and/or monitor-less (i.e., headless) device, and access may be provided over a network interface connection.

Cryptographic units such as, but not limited to, microcontrollers, processors 2726, interfaces 2727, and/or devices 2728 may be attached, and/or communicate with the NBSA controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® Crypto.NetX and other Security Processors; nCipher's® nShield; Safe Net's® Luna PCI (e.g., 7100) series; Semaphore Communications'® 40) MHz Roadrunner 184; Sun's® Cryptographic Accelerators (e.g., Accelerator 6000 PCIe Board, Accelerator 500 Daughtercard); Via Nano® Processor (e.g., L2100, L2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 2729. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the NBSA controller and/or a computer systemization may employ various forms of memory 2729. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 2729 may include ROM 2706, RAM 2705, and a storage device 2714. A storage device 2714 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; register memory (e.g., in a CPU), solid state memory devices (USB memory, solid state drives (SSD)), etc.); other processor-readable storage mediums; and/or other devices of the like. Thus, a computer systemization generally employs and makes use of memory.

Component Collection

The memory 2729 may contain a collection of processor-executable application/library/program and/or database components (e.g., including processor-executable instructions) and/or data such as, but not limited to: operating system component(s) 2715 (operating system); information server component(s) 2716 (information server); user interface component(s) 2717 (user interface); Web browser component(s) 2718 (Web browser); database(s) 2719; mail server component(s) 2721; mail client component(s) 2722; cryptographic server component(s) 2720 (cryptographic server); machine learning component 2723; distributed immutable ledger component 2724; the NBSA component(s) 2735 (e.g., which may include ANG, NAP, DPP, NDAP, TTP 2741-2745, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 2714, they may also be loaded and/or stored in memory such as: cache, peripheral devices, processor registers, RAM, remote storage facilities through a communications network, ROM, various forms of memory, and/or the like.

Operating System

The operating system component 2715 is an executable program component facilitating the operation of the NBSA controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® Jul. 8, 2010; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the NBSA controller to communicate with other entities through a communications network 2713. Various communication protocols may be used by the NBSA controller as a subcarrier transport mechanism for interaction, such as, but not limited to: multicast, TCP/IP, UDP, unicast, and/or the like.

Information Server

An information server component 2716 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C(++), C# and/or .NET, Common Gateway Interface (CGI) scripts, dynamic (D) hypertext markup language (HTML), FLASH, Java, JavaScript, Practical Extraction Report Language (PERL.), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); Hyper Text Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the NBSA controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the NBSA database 2719, operating systems, other program components, user interfaces, Web browsers, and/or the like.

Access to the NBSA database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the NBSA. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the NBSA as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 2717 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2718 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the NBSA enabled nodes. The combined application may be nugatory on systems employing Web browsers.

Mail Server

A mail server component 2721 is a stored program component that is executed by a CPU 2703. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the NBSA. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the NBSA mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2722 is a stored program component that is executed by a CPU 2703. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2720 is a stored program component that is executed by a CPU 2703, cryptographic processor 2726, cryptographic processor interface 2727, cryptographic processor device 2728, and/or the like. Cryptographic processor interfaces may allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the NBSA may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the NBSA component to engage in secure transactions if so desired. The cryptographic component facilitates the secure accessing of resources on the NBSA and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Machine Learning (ML)

In one non limiting embodiment, the NBSA includes a machine learning component 2723, which may be a stored program component that is executed by a CPU 2703. The machine learning component, alternatively, may run on a set of specialized processors, ASICs, FPGAS, GPU's, and/or the like. The machine learning component may be deployed to execute serially, in parallel, distributed, and/or the like, such as by utilizing cloud computing. The machine learning component may employ an MI, platform such as Amazon Sage Maker, Azure Machine Learning, DataRobot AI Cloud, Google AI Platform, IBM Watson® Studio, and/or the like. The machine learning component may be implemented using an MI, framework such as PyTorch, Apache MANet, MathWorks Deep Learning Toolbox, scikit-learn, TensorFlow, XGBoost, and/or the like. The machine learning component facilitates training and/or testing of MI, prediction logic data structures (e.g., models) and/or utilizing MI, prediction logic data structures (e.g., models) to output MI, predictions by the NBSA. The machine learning component may employ various artificial intelligence and/or learning mechanisms such as Reinforcement Learning, Supervised Learning, Unsupervised Learning, and/or the like. The machine learning component may employ MI, prediction logic data structure (e.g., model) types such as Bayesian Networks, Classification prediction logic data structures (e.g., models), Decision Trees, Neural Networks (NNs), Regression prediction logic data structures (e.g., models), and/or the like.

Distributed Immutable Ledger (DIL)

In one non limiting embodiment, the NBSA includes a distributed immutable ledger component 2724, which may be a stored program component that is executed by a CPU 2703. The distributed immutable ledger component, alternatively, may run on a set of specialized processors, ASICs, FPGAs, GPUs, and/or the like. The distributed immutable ledger component may be deployed to execute serially, in parallel, distributed, and/or the like, such as by utilizing a peer-to-peer network. The distributed immutable ledger component may be implemented as a blockchain (e.g., public blockchain, private blockchain, hybrid blockchain) that comprises cryptographically linked records (e.g., blocks). The distributed immutable ledger component may employ a platform such as Bitcoin, Bitcoin Cash, Dogecoin, Ethereum, Litecoin, Monero, Zcash, and/or the like. The distributed immutable ledger component may employ a consensus mechanism such as proof of authority, proof of space, proof of steak, proof of work, and/or the like. The distributed immutable ledger component may be used to provide functionality such as data storage, cryptocurrency, inventory tracking, non-fungible tokens (NFTs), smart contracts, and/or the like.

The NBSA Database

The NBSA database component 2719 may be embodied in a database and its stored data. The database is a stored program component, which is executed by the CPU; the stored program component portion configuring the CPU to process the stored data. The database may be a fault tolerant, relational, scalable, secure database such as Claris File Maker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the NBSA database may be implemented using various other data-structures, such as an array, hash, (linked) list, struct, structured text file (e.g., XML.), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the NBSA database is implemented as a data-structure, the use of the NBSA database 2719 may be integrated into another component such as the NBSA component 2735. Also, the database may be implemented as a mix of data structures, objects, programs, relational structures, scripts, and/or the like. Databases may be consolidated and/or distributed in countless variations (e.g., see Distributed NBSA below). Portions of databases, e.g., tables, may be exported and/or imported and thus decentralized and/or integrated.

In another embodiment, the database component (and/or other storage mechanism of the NBSA) may store data immutably so that tampering with the data becomes physically impossible and the fidelity and security of the data may be assured. In some embodiments, the database may be stored to write only or write once, read many (WORM) mediums. In another embodiment, the data may be stored on distributed ledger systems (e.g., via blockchain) so that any tampering to entries would be readily identifiable. In one embodiment, the database component may employ the distributed immutable ledger component DIL, 2724 mechanism.

In one embodiment, the database component 2719 includes several tables representative of the schema, tables, structures, keys, entities and relationships of the described database 2719*a-z:*

An accounts table 2719*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, account Number, routing Number, link WalletsID, accountPrioritAccountRatio, account Address, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2719*b* includes fields such as, but not limited to: a userID, userSSN, taxID, userContactID, accountID), assetIDs, deviceIDs, paymentIDs, transactionIDs, user Type (e.g., agent, entity (e.g., corporate, non-profit, partnership, etc.), individual, etc.), namePrefix, firstName, middle Name, lastName, nameSuffix, DateOfBirth, user Age, userName, userEmail, userSocial AccountID, contactType, contactRelationship, userPhone, user Address, userCity, userState, userZIPCode, userCountry, user AuthorizationCode, user AccessPrivilges, userPreferences, userRestrictions, and/or the like (the user table may support and/or track multiple entity accounts on a NBSA);

An devices table 2719*c* includes fields such as, but not limited to: deviceID, sensorIDs, accountID, assetIDs, paymentIDs, deviceType, deviceName, deviceManufacturer, deviceModel, device Version, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, device AccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2719*d* includes fields such as, but not limited to: appID, appName, appType, appDependencies, accountID, deviceIDs, transactionID, userID, appStoreAuthKey, appStore AccountID, appStoreIPaddress, appStoreURLaccessCode, appStorePortNo, app AccessPrivileges, appPreferences, appRestrictions, portNum, access_API_call, linked_wallets_list, and/or the like;

An assets table 2719*e* includes fields such as, but not limited to: assetID, accountID, userID, distributor AccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, asset TargetChannelName, assetName, assetSeries Name, assetSeriesSeason, assetSeriesEpisode, assetCode, assetQuantity, assetCost, assetPrice, asset Value, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnection Address, and/or the like;

A payments table 2719*f* includes fields such as, but not limited to: paymentID, accountID, userID, couponID, coupon Value, couponConditions, couponExpiration, paymentType, payment AccountNo, payment AccountName, paymentAccountAuthorizationCodes, paymentExpirationDate, paymentCCV, paymentRouting No, paymentRouting Type, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2719*g* includes fields such as, but not limited to: transactionID, accountID, assetIDs, deviceIDs, paymentIDs, transactionIDs, userID, merchantID), transaction Type, transactionDate, transaction Time, transaction Amount, transaction Quantity, transactionDetails, productsList, product Type, productTitle, productsSummary, productParamsList, transaction No, transaction AccessPrivileges, transaction Preferences, transactionRestrictions, merchant AuthKey, merchant AuthCode, and/or the like;

An merchants table 2719*h* includes fields such as, but not limited to: merchantID, merchantTaxID, merchante Name, merchantContactUserID, accountID), issuerID, acquirerID, merchantEmail, merchant Address, merchantState, merchantZIPcode, merchantCountry, merchant AuthKey, merchantIPaddress, portNum, merchantURLaccessCode, merchantPortNo, merchantAccessPrivileges, merchantPreferences, merchantRestrictions, and/or the like;

An ads table 2719*i* includes fields such as, but not limited to: adID, advertiserID, adMerchantID, adNetworkID, adName, adTags, advertiser Name, adSponsor, adTime, adGeo, adAttributes, adFormat, adProduct, adText, ad.Media, ad.MediaID, adChannelID, adTagTime, adAudioSignature, adHash, adTemplateID, adTemplateData, adSourceID, adSource Name, adSourceServerIP, adSourceURL, adSourceSecurity Protocol, adSourceFTP, ad AuthKey, adAccessPrivileges, adPreferences, adRestrictions, adNetworkXchangeID, adNetworkXchange Name, adNetwork XchangeCost, adNetworkXchange.MetricType (e.g., CPA, CPC, CPM, CTR, etc.), adNetworkXchange.Metric Value, adNetworkXchangeServer, adNetworkXchangePort Number, publisherID, publisher Address, publisher URL, publisher Tag, publisher Industry, publisher Name, publisherDescription, siteDomain, siteURL, siteContent, siteTag, siteContext, siteImpression, site Visits, sitel leadline, sitePage, site AdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impression Action, impression Type, impression PublisherID, impressionPublisherURL, and/or the like;

An ML table **2719*j*** includes fields such as, but not limited to: MLID, prediction LogicStructureID, prediction-LogicStructureType, prediction LogicStructureConfiguration, prediction LogicStructureTrainedStructure, prediction LogicStructureTrainingData, predictionLogicStructureTrainingDataConfiguration, prediction LogicStructureTestingData, prediction LogicStructureTestingDataConfiguration, prediction LogicStructureOutputData, prediction LogicStructure-OutputDataConfiguration, and/or the like;

A source assets table **2719*k*** includes fields such as, but not limited to: source AssetID, source AssetName, source-AssetDescription, sourceAssetType, source AssetData, sourceAssetOwner, sourceAssetHash, and/or the like;

A metadata table 27191 includes fields such as, but not limited to: NFT_metadata_ID, NFT_metadata_name, NFT_metadata_description, NFT_metadata_image, NFT_metadata_properties, associated_NFT_ID, and/or the like;

A documents table **2719*m*** includes fields such as, but not limited to: documentID, documentName, document-Contents, documentDescription, documentType, documentVersion, documentPrevious Version, documentChanges, documentCreationDate, documentPublicationDate, documentPublicationState, documentOwner, documentPublisherID, document-PublisherSignature, documentReviewerID, document-ReviewerSignature, documentHash, and/or the like;

A subscribers table **2719*n*** includes fields such as, but not limited to: subscriberID, subscriberUserID, subscriber-WalletAddress, subscriberType, subscribedToDocumentID, subscribedToDocumentName, subscriberPreferences, subscriberNotificationData (e.g., email address, Slack ID, etc.), and/or the like;

A market_data table **2719*z*** includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, U'S equity trade and quote market Data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt. Multi.

In one embodiment, the NBSA database may interact with other database systems. For example, employing a distributed database system, queries and data access by search NBSA component may treat the combination of the NBSA database, an integrated data security layer database as a single database entity (e.g., see Distributed NBSA below).

In one embodiment, user programs may contain various user interface primitives, which may serve to update the NBSA. Also, various accounts may require custom database tables depending upon the environments and the types of clients the NBSA may need to serve. It should be noted that any unique fields may be designated as a key field throughout. In an alternative embodiment, these tables have been decentralized into their own databases and their respective database controllers (i.e., individual database controllers for each of the above tables). The NBSA may also be configured to distribute the databases over several computer systemizations and/or storage devices. Similarly, configurations of the decentralized database controllers may be varied by consolidating and/or distributing the various database components **2719*a-z***. The NBSA may be configured to keep track of various settings, inputs, and parameters via database controllers.

The NBSA database may communicate to and/or with other components in a component collection, including itself, and/or facilities of the like. Most frequently, the NBSA database communicates with the NBSA component, other program components, and/or the like. The database may contain, retain, and provide information regarding other nodes and data.

The NBSAs

The NBSA component 2735 is a stored program component that is executed by a CPU via stored instruction code configured to engage signals across conductive pathways of the CPU and ISICI controller components. In one embodiment, the NBSA component incorporates any and/or all combinations of the aspects of the NBSA that were discussed in the previous figures. As such, the NBSA affects accessing, obtaining and the provision of information, services, transactions, and/or the like across various communications networks. The features and embodiments of the NBSA discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., may reduce the capacity and structural infrastructure requirements to support the NBSA's features and facilities, and in many cases reduce the costs, energy consumption/requirements, and extend the life of NBSA's underlying infrastructure; this has the added benefit of making the NBSA more reliable. Similarly, many of the features and mechanisms are designed to be easier for users to use and access, thereby broadening the audience that may enjoy/employ and exploit the feature sets of the NBSA; such case of use also helps to increase the reliability of the NBSA. In addition, the feature sets include heightened security as noted via the Cryptographic components 2720, 2726, 2728 and throughout, making access to the features and data more reliable and secure The NBSA transforms authenticating NFT generation input, NFT authentication input, document publishing input, NFT document access input, transfer transaction input, clawback transaction input datastructure/inputs, via NBSA components (e.g., ANG, NAP, DPP, NDAP, TTP), into authenticating NFT generation output, NFT authentication output, document publishing output, NFT document access output, transfer transaction output, clawback transaction output outputs.

The NBSA component facilitates access of information between nodes may be developed by employing various development tools and languages such as, but not limited to: Apache® components, Assembly, ActiveX, binary executables, (ANSI) (Objective-) C (++), C# and/or NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the NBSA server employs a cryptographic server to encrypt and decrypt communications. The NBSA component may communicate to and/or with other components in a component collection, including itself, and/or facilities of the like. Most frequently, the NBSA component communicates with the NBSA database, operating systems, other program components, and/or the like. The NBSA may contain, communicate, generate, obtain, and/or provide program component, system, user, and/or data communications, requests, and/or responses.

Distributed NBSAs

The structure and/or operation of any of the NBSA node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques. Furthermore, any part of sub parts of the NBSA node controller's component collection may be executed on at least one processing unit, where that processing unit may be a sub-unit of a CPU, a core, an entirely different CPU and/or sub-unit at the same location or remotely at a different location, and/or across many multiple such processing units. For example, for load-balancing reasons, parts of the component collection may start to execute on a given CPU' core, then the next execution element of the component collection may be moved to execute on another CPU core, on the same, or completely different CPU at the same or different location, e.g., because the CPU may become over taxed with instruction executions, and as such, a scheduler may move instructions at the taxed CPU and/or CPU sub-unit to another CPU and/or CPU sub-unit with a lesser instruction execution load. As such, it may be difficult to predict on which CPU and/or processing sub-unit a process instruction begins to execute and where it will continue and/or conclude execution, as it may be on the same or completely different CPU and/or processing sub-unit.

The configuration of the NBSA controller may depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for NBSA controller and/or NBSA component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)) COM), (Distributed) Object Linking and Embedding ((D) OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

*w3c* –post http://... Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration may depend upon the context, environment, and requirements of system deployment.

For example, in some implementations, the NBSA controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<?PHP
header( 'Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die( 'Could not bind to address') ;
socket_listen($sock);
$client = socket_accept($sock);
// read input data from client device in 1024 byte blocks until end of message
do {
   $input = "";
   $input = socket_read($client, 1024);
   $data .= $input;
} while($input != "");
// parse data to extract variables
$obj = json_decode($data, true);
// store input data in a database
mysql_connect("201.408.185.132", $DBserver, $password); // access database server
mysql_select ("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Transfer Transaction Blockchain with Clawback Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It may be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a NBSA individual and/or enterprise user, database configuration and/or relational model, data type, data transmission and/or network framework, library, syntax structure, and/or the like, various embodiments of the NBSA, may be implemented that allow a great deal of flexibility and customization. For example, aspects of the NBSA may be adapted for serving legal documents such as subpoenas. While various embodiments and discussions of the NBSA have included information technology, however, it is to be understood that the embodiments described herein may be readily configured and/or customized for a wide variety of other applications and/or implementations.

What is claimed is:

1. A transfer transaction processing apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a transfer transaction processing request datastructure structured as specifying a transaction requestor blockchain address, a transfer transaction identifier, and authorization data, in which the transfer transaction processing request datastructure corresponds to a clawback transaction associated with the transfer transaction identifier;

evaluate, via the at least one processor, the authorization data to verify that the authorization data establishes control over the transaction requestor blockchain address;

submit, via the at least one processor, a clawback post transaction to a blockchain, in which the clawback post transaction is structured to facilitate storing information regarding the clawback transaction via the blockchain, in which the information regarding the clawback transaction includes the transfer transaction identifier; and send, via the at least one processor, a clawback post transaction notification to a transfer transaction handling smart contract, in which the clawback post transaction notification is structured as specifying a transaction identifier of the clawback post transaction, in which the transfer transaction handling smart contract is structured with processor-executable instructions, comprising:

validate the clawback post transaction by checking compliance with a set of predefined clawback rules, in which the set of predefined clawback rules includes a threshold verify post transactions rule that specifies a threshold number of submitted verify post transactions associated with the transfer transaction identifier; and transfer cryptographic assets associated with the transfer transaction identifier to a blockchain address controlled by a sender of a transfer transaction associated with the transfer transaction identifier.

2. The apparatus of claim 1, in which the authorization data comprises an authenticating NFT identifier and authorization data associated with the authenticating NFT identifier.

3. The apparatus of claim 2, in which the transaction requestor blockchain address is specified as an owner blockchain address corresponding to the authenticating NFT identifier.

4. The apparatus of claim 1, in which the authorization data comprises a password to a cryptographic wallet corresponding to the transaction requestor blockchain address.

5. The apparatus of claim 1, in which the authorization data comprises a message signed with a private key associated with a cryptographic wallet corresponding to the transaction requestor blockchain address.

6. The apparatus of claim 1, in which the transaction requestor blockchain address associated with the clawback transaction is controlled by the sender of the transfer transaction.

7. The apparatus of claim 1, in which the clawback post transaction is submitted to the blockchain via a function call to the transfer transaction handling smart contract.

8. The apparatus of claim 1, in which the clawback post transaction is structured as specifying a submission date.

9. The apparatus of claim 1, in which the clawback post transaction is cryptographically signed by the sender.

10. The apparatus of claim 1, in which the transfer transaction handling smart contract is selected from a plurality of transfer transaction handling smart contracts by evaluating transaction details of the transfer transaction with regard to a set of smart contract selection rules.

11. The apparatus of claim 1, in which the transfer transaction handling smart contract is further structured with processor-executable instructions, comprising:

verify that the clawback post transaction notification was provided by an authorized node.

12. The apparatus of claim 1, in which compliance with the threshold verify post transactions rule is validated upon determining that a post transactions record datastructure associated with the transfer transaction identifier indicates that number of submitted verify post transactions does not exceed the threshold number of submitted verify post transactions.

13. The apparatus of claim 12, in which the post transactions record datastructure is structured as specifying, for each respective post transaction type, number of submitted post transactions of that respective post transaction type.

14. The apparatus of claim 1, in which the set of predefined clawback rules includes a clawback timer rule that specifies a threshold time period for initiating the clawback transaction associated with the transfer transaction identifier.

15. The apparatus of claim 14, in which the threshold time period is structured as relative to a submission date of another post transaction associated with the transfer transaction identifier.

16. A transfer transaction processing processor-readable, non-transient medium, the medium storing a component collection, the component collection storage structured with processor-executable instructions comprising:

obtain, via the at least one processor, a transfer transaction processing request datastructure structured as specifying a transaction requestor blockchain address, a transfer transaction identifier, and authorization data, in which the transfer transaction processing request datastructure corresponds to a clawback transaction associated with the transfer transaction identifier;

evaluate, via the at least one processor, the authorization data to verify that the authorization data establishes control over the transaction requestor blockchain address;

submit, via the at least one processor, a clawback post transaction to a blockchain, in which the clawback post transaction is structured to facilitate storing information regarding the clawback transaction via the blockchain, in which the information regarding the clawback transaction includes the transfer transaction identifier; and send, via the at least one processor, a clawback post transaction notification to a transfer transaction handling smart contract, in which the clawback post transaction notification is structured as specifying a transaction identifier of the clawback post transaction, in which the transfer transaction handling smart contract is structured with processor-executable instructions, comprising:

validate the clawback post transaction by checking compliance with a set of predefined clawback rules, in which the set of predefined clawback rules includes a threshold verify post transactions rule that specifies a threshold number of submitted verify post transactions associated with the transfer transaction identifier; and transfer cryptographic assets associated with the transfer transaction identifier to a blockchain address controlled by a sender of a transfer transaction associated with the transfer transaction identifier.

17. A transfer transaction processing processor-implemented system, comprising:

means to store a component collection;

means to process processor-executable instructions from the component collection, the component collection storage structured with processor-executable instructions including:

obtain, via the at least one processor, a transfer transaction processing request datastructure structured as specifying a transaction requestor blockchain address, a transfer transaction identifier, and authorization data, in which the transfer transaction processing request datastructure corresponds to a clawback transaction associated with the transfer transaction identifier;

evaluate, via the at least one processor, the authorization data to verify that the authorization data establishes control over the transaction requestor blockchain address;

submit, via the at least one processor, a clawback post transaction to a blockchain, in which the clawback post transaction is structured to facilitate storing information regarding the clawback transaction via the blockchain, in which the information regarding the clawback transaction includes the transfer transaction identifier; and send, via the at least one processor, a clawback post transaction notification to a transfer transaction handling smart contract, in which the clawback post transaction notification is structured as specifying a transaction identifier of the clawback post transaction, in which the transfer transaction handling smart contract is structured with processor-executable instructions, comprising:

validate the clawback post transaction by checking compliance with a set of predefined clawback rules, in which the set of predefined clawback rules includes a threshold verify post transactions rule that specifies a threshold number of submitted verify post transactions associated with the transfer transaction identifier; and transfer cryptographic assets associated with the transfer transaction identifier to a blockchain address controlled by a sender of a transfer transaction associated with the transfer transaction identifier.

18. A transfer transaction processing processor-implemented process, including processing processor-executable instructions via at least one processor from a component collection stored in at least one memory, the component collection storage structured with processor-executable instructions comprising:

obtain, via the at least one processor, a transfer transaction processing request datastructure structured as specifying a transaction requestor blockchain address, a transfer transaction identifier, and authorization data, in which the transfer transaction processing request datastructure corresponds to a clawback transaction associated with the transfer transaction identifier;

evaluate, via the at least one processor, the authorization data to verify that the authorization data establishes control over the transaction requestor blockchain address;

submit, via the at least one processor, a clawback post transaction to a blockchain, in which the clawback post transaction is structured to facilitate storing information regarding the clawback transaction via the blockchain, in which the information regarding the clawback transaction includes the transfer transaction identifier; and send, via the at least one processor, a clawback post transaction notification to a transfer transaction handling smart contract, in which the clawback post transaction notification is structured as specifying a transaction identifier of the clawback post transaction, in which the transfer transaction handling smart contract is structured with processor-executable instructions, comprising:

validate the clawback post transaction by checking compliance with a set of predefined clawback rules, in which the set of predefined clawback rules includes a threshold verify post transactions rule that specifies a threshold number of submitted verify post transactions associated with the transfer transaction identifier; and transfer cryptographic assets associated with the transfer transaction identifier to a blockchain address controlled by a sender of a transfer transaction associated with the transfer transaction identifier.

* * * * *